US 8,199,805 B2
// Numata et al.
// (45) Date of Patent: Jun. 12, 2012

(54) IMAGE PROCESSING APPARATUS AND IMAGE PROCESSING METHOD

(75) Inventors: Satoshi Numata, Kanagawa (JP); Tohru Kurata, Saitama (JP); Kimitaka Wada, Kanagawa (JP)

(73) Assignee: Sony Corporation, Tokyo (JP)

( * ) Notice: Subject to any disclaimer, the term of this patent is extended or adjusted under 35 U.S.C. 154(b) by 891 days.

(21) Appl. No.: 12/243,567

(22) Filed: Oct. 1, 2008

(65) Prior Publication Data

US 2009/0103621 A1 Apr. 23, 2009

(30) Foreign Application Priority Data

Oct. 22, 2007 (JP) ................................. 2007-273606

(51) Int. Cl.
 *H04N 7/26* (2006.01)
 *G06K 9/00* (2006.01)
 *G06K 9/62* (2006.01)

(52) U.S. Cl. ........ 375/240; 382/189; 382/209; 348/335; 348/581; 348/715

(58) Field of Classification Search .................... 375/240
 See application file for complete search history.

(56) References Cited

U.S. PATENT DOCUMENTS

| | | | | |
|---|---|---|---|---|
| 5,696,848 A | * | 12/1997 | Patti et al. ....................... | 382/254 |
| 5,825,929 A | * | 10/1998 | Chen et al. ...................... | 382/236 |
| 6,023,301 A | * | 2/2000 | Katata et al. .................... | 348/586 |
| 6,075,557 A | * | 6/2000 | Holliman et al. ................ | 348/51 |
| 6,343,156 B1 | * | 1/2002 | Yamaguchi et al. ........... | 382/243 |
| 7,889,886 B2 | * | 2/2011 | Matsugu et al. ............... | 382/103 |
| 2007/0165931 A1 | * | 7/2007 | Higaki ........................... | 382/128 |

FOREIGN PATENT DOCUMENTS

| | | |
|---|---|---|
| JP | 05-091492 | 4/1993 |
| JP | 07-095585 | 4/1995 |
| JP | 2006-160829 | 6/2006 |

OTHER PUBLICATIONS

Noh, J.-Y, et al, 'A survey of facial modeling and animation techniques', 1999, Tech. Rep. USC-TR-99-705, Univ. S. Calf., entire document, http://run.usc.edu/cs520-s12/facial/facial-survey.pdf.*

* cited by examiner

*Primary Examiner* — Edan Orgad
*Assistant Examiner* — Ronald Baum
(74) *Attorney, Agent, or Firm* — K&L Gates LLP

(57) ABSTRACT

Described herein is an image processing apparatus for calculating a motion vector between two screen images including a target screen image and a reference screen image, including: a base face motion vector calculation section; a high-accuracy base face motion vector calculation section; a reduction face motion vector calculation section; a high-accuracy reduction face motion vector calculation section; first and second base face search range determination sections; and a selection section configured to select a calculation section to be used from among the base face motion vector calculation section, high-accuracy base face motion vector calculation section, reduction face motion vector calculation section and high-accuracy reduction face motion vector calculation section and select whether the first or second base face search range determination section should be used and then select, where use of any of the determination sections is determined, a determination section to be used from between the determination sections.

9 Claims, 48 Drawing Sheets

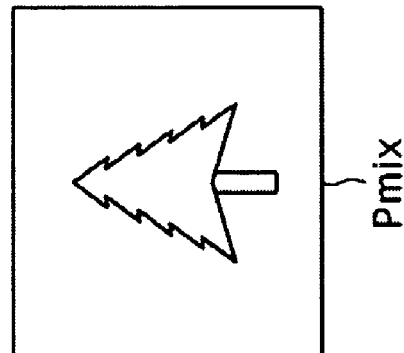
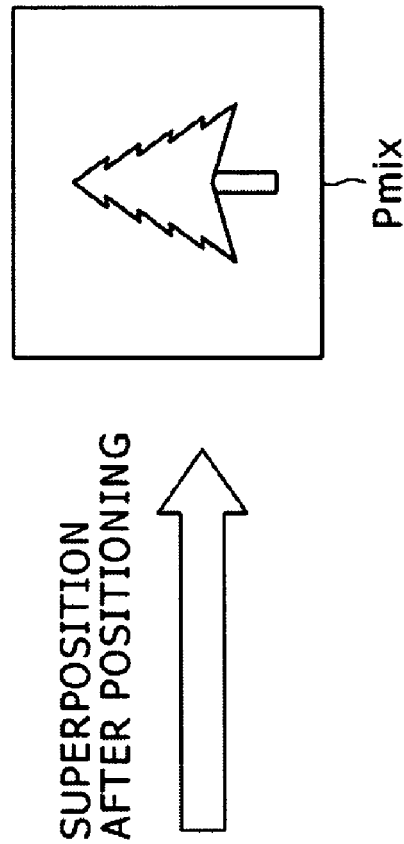
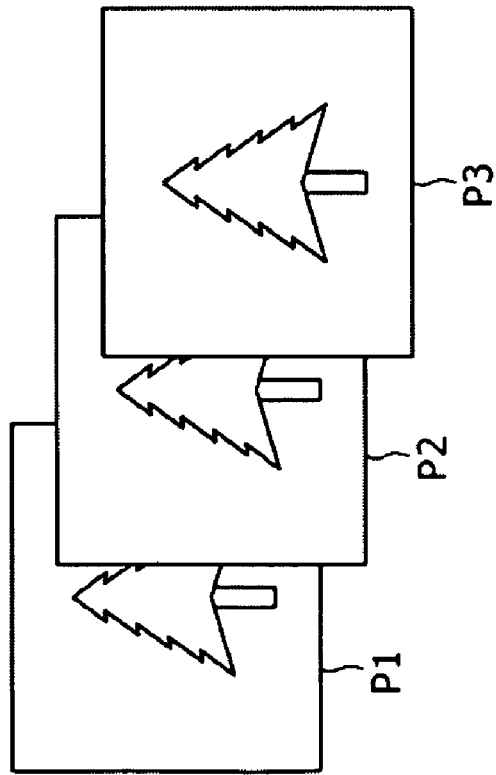
FIG.2B IMAGE WHOSE NOISE IS REDUCED — Pmix
SUPERPOSITION AFTER POSITIONING
FIG.2A SUCCESSIVELY PICKED UP IMAGE — P1, P2, P3

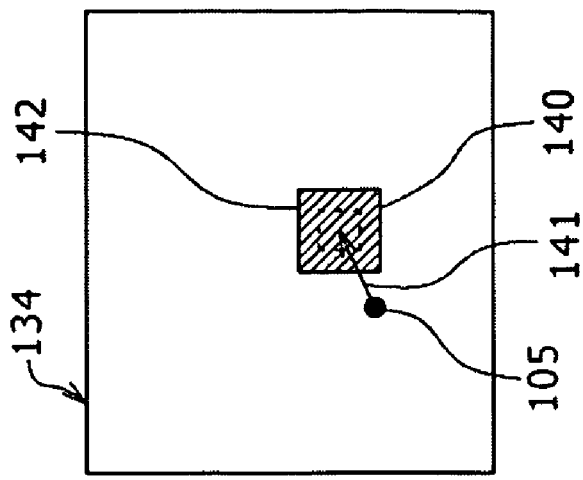
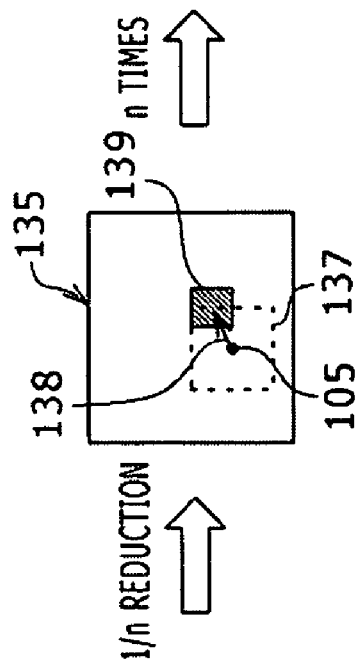
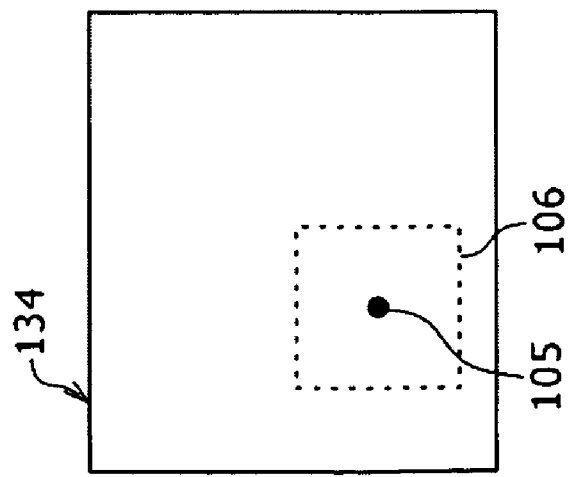

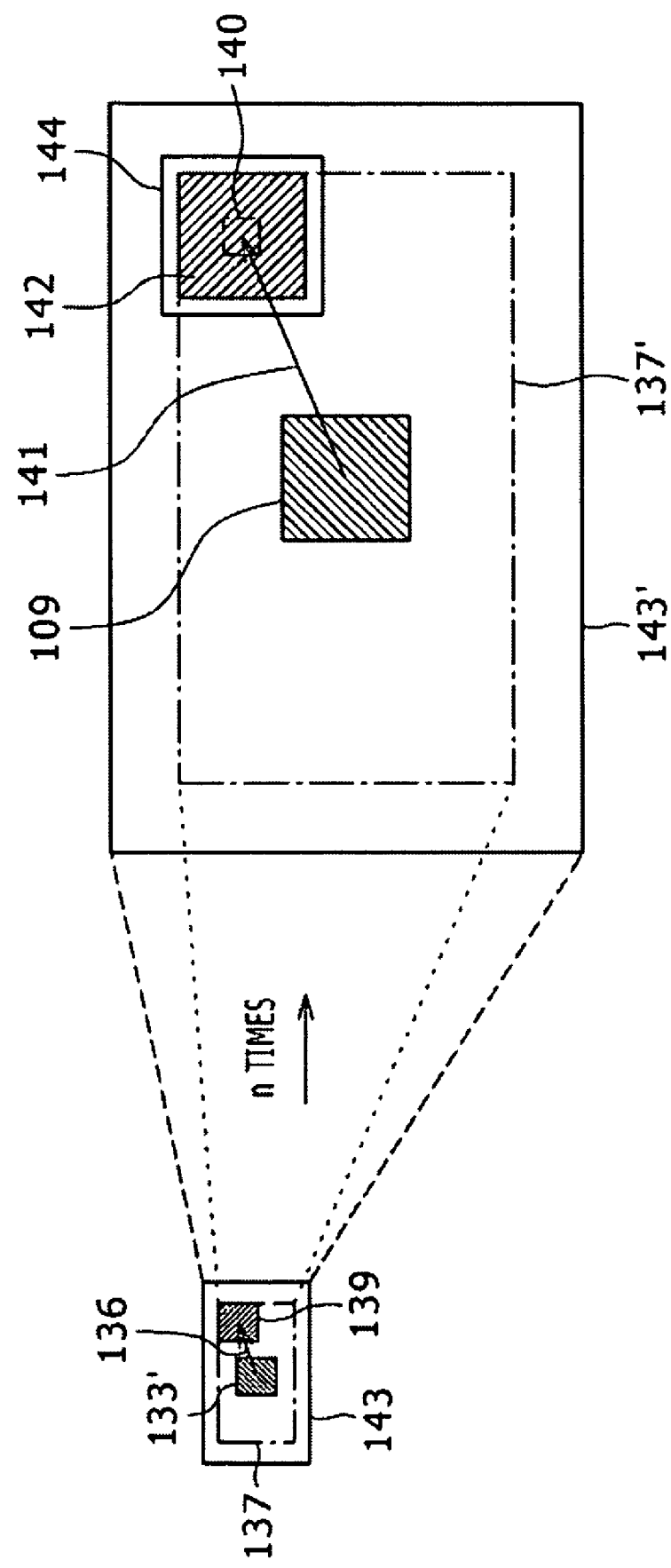

REDUCTION FACE

BASE FACE

REDUCTION FACE

136'  163

BASE FACE

| OPERATION MODE | | MOVEMENT VECTOR ACCURACY |
|---|---|---|
| CAMERA EE | POWER SAVING MODE | REDUCTION FACE MOTION VECTOR (n-PIXEL ACCURACY) |
| | NORMAL MODE | HIGH-ACCURACY REDUCTION FACE MOTION VECTOR (PIXEL ACCURACY) |
| IMAGE PICKUP RECORDING EXECUTION | POWER SAVING MODE | BASE FACE MOTION VECTOR (PIXEL ACCURACY) |
| | NORMAL MODE | HIGH-ACCURACY BASE FACE MOTION VECTOR (SUB PIXEL ACCURACY) |

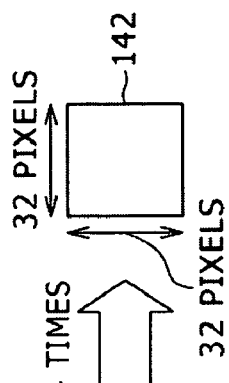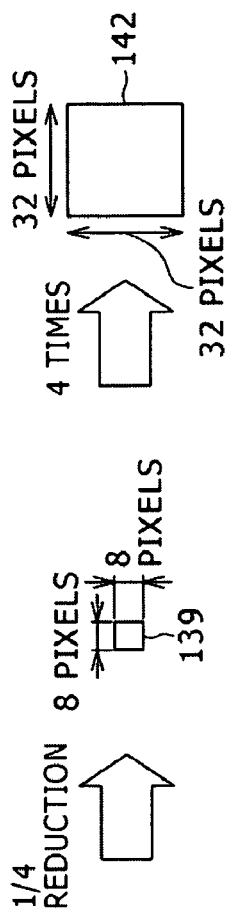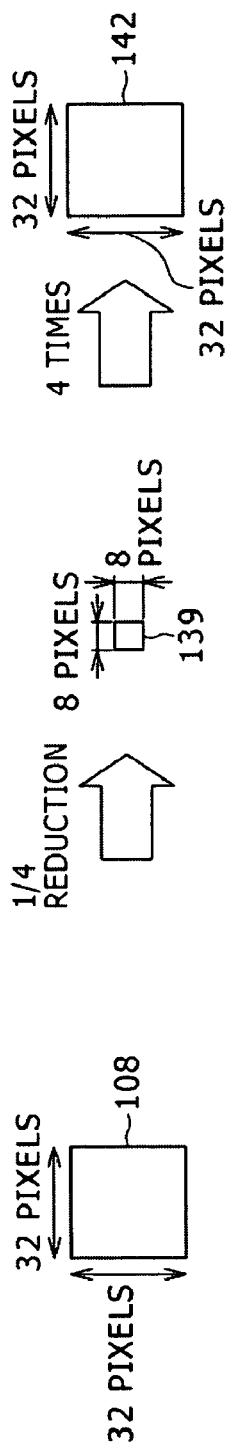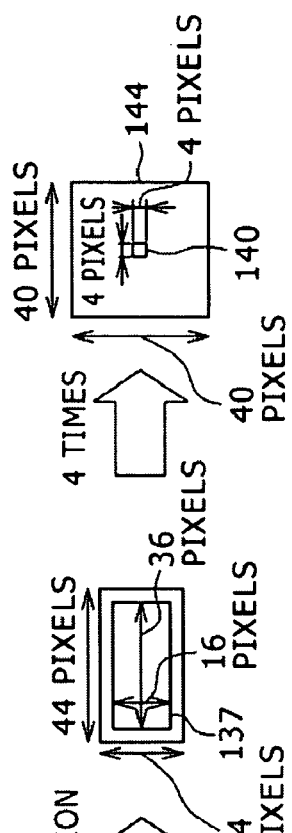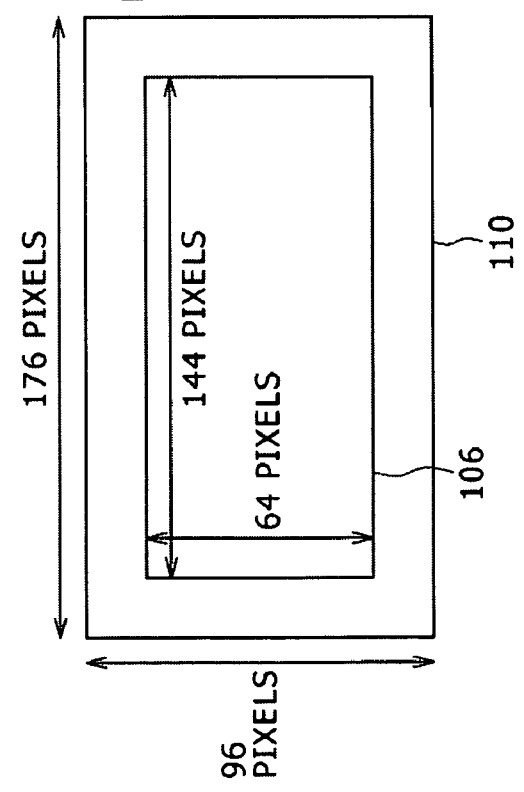

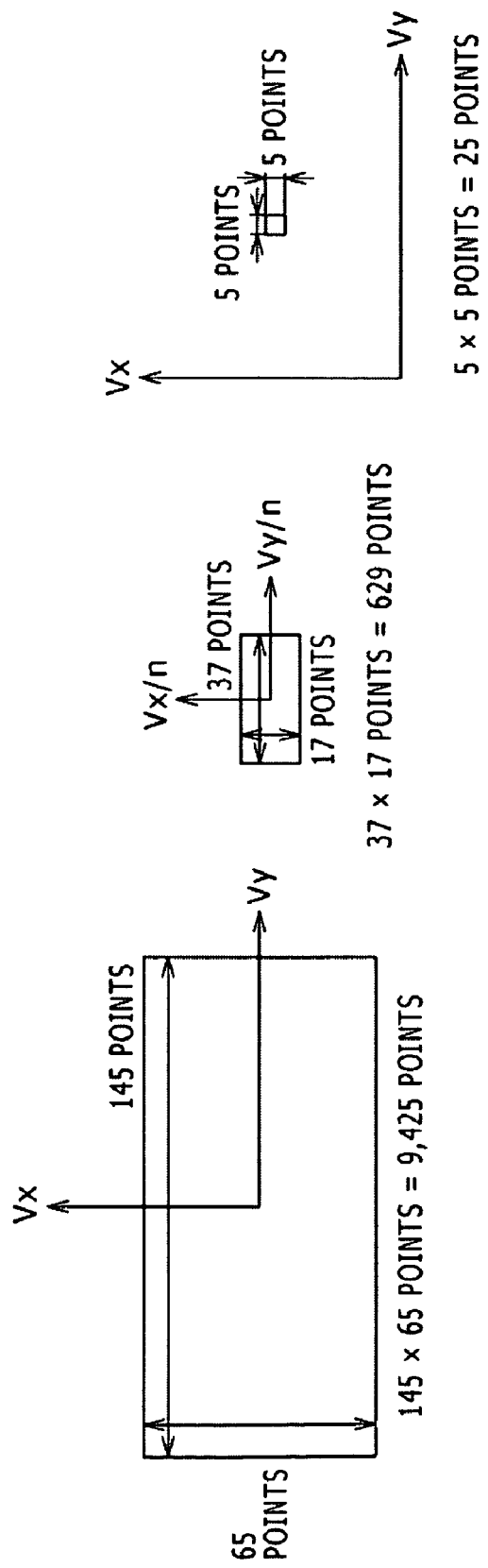

IMAGE PROCESSING APPARATUS AND IMAGE PROCESSING METHOD

CROSS REFERENCES TO RELATED APPLICATIONS

The present application claims priority to Japanese Patent Application JP 2007-273606 filed in the Japan Patent Office on Oct. 22, 2007, the entire contents of which being incorporated herein by reference.

BACKGROUND

This present application relates to an image processing apparatus and an image processing method for detecting a motion vector between two different screens or screen images. In the present specification, the term "screen" or "screen image" signifies an image formed from image data for one frame or one field and displayed as an image on a display apparatus.

A block matching method of determining a motion vector between two screen images from the image information itself is a technique having a long history. The block matching method has been developed principally in connection with pan-tilt detection or image pickup object tracking of a television camera, dynamic picture coding of the MPEG (Moving Picture Experts Group) method and so forth. After the 1990s are entered, the block matching method is directed to various applications such as sensorless camera shake correction and noise reduction upon low illuminance image pickup through superposition of images.

The block matching is a method wherein a motion vector between two images including a reference screen image which is a noticed screen image and a basic screen image (hereinafter referred to as target screen image) based on which a motion in the reference screen image is to be determined is calculated by calculating a correlation between the reference screen image and the target screen image in regard to blocks of a rectangular region of a predetermined size. The reference screen image and the target screen image may have such a temporal relationship that the target screen image temporally precedes to the reference screen image as in the case of, for example, motion detection by the MPEG method or another temporal relationship that the reference screen image temporally precedes to the target screen image as in the case of, for example, noise reduction by superposition of image frames hereinafter described.

It is to be noted that, while, in the present specification, the screen or screen image signifies an image formed from image data for one frame or one field as described hereinabove, the following description is given assuming that a screen image is formed from one frame and is hereinafter referred to as frame for the convenience of description. Accordingly, a reference screen image is hereinafter referred to as reference frame, and a target screen image is hereinafter referred to as target frame.

FIGS. 51A to 56 illustrate an outline of related-art block matching. In the block matching method described here, as shown in FIG. 51A, for example, a target frame or basic frame 100 is divided into a plurality of rectangular regions called blocks having a predetermined size including a plurality of pixels in a horizontal direction and a predetermined lines in a vertical direction. Each of the plural blocks 102 in a target frame is hereinafter referred to as target block.

In the block matching, a block having a high correlation with a target block 102 is searched for from within the reference frame 101. A block 103 (refer to FIG. 51B) detected as a block which has the highest correlation in the reference frame 101 as a result of the search is called motion compensation block. Further, a positional displacement amount between the target block 102 and the motion compensation block 103 is called motion vector (refer to reference numeral 104 in FIG. 51B).

The motion vector 104 corresponding to the positional displacement between the target block 102 and the motion compensation block 103 including both of a positional displacement amount and a positional displacement direction corresponds to positional displacement between the position (for example, the position of the center) of a projection image block 109 of each target block 102 of the target frame 100 and the position (for example, the position of the center) of the motion compensation block 103 where the projection image block 109 of the target block 102 is supposed to be at a position same as the position of the target block 102 in the reference frame 101. Further, the positional displacement in this instance has a positional displacement amount and a directional component of the displacement.

An outline of a block matching process is described. Referring to FIG. 52, as indicated by a broken line, a projection image block 109 of a target block is supposed to be at a position in the reference frame 101 same as the position of a target block 102 of the target frame 100, and the coordinates of the center of the projection image block 109 of the target block are defined as the origin 105 for motion detection. Then, assuming that the motion vector 104 exists within a range including the origin 105 for motion detection, a predetermined range centered at the origin 105 is set as a predetermined search range 106 (refer to an alternate long and short dash line in FIG. 52).

Then, a block (reference block) 108 of a size same as that of the target block 102 is set on the reference screen image. Then, the position of the reference block 108 is moved in a unit of one pixel distance or of a distance of a plurality of pixels, for example, in a horizontal direction and a vertical direction in the search range 106. Accordingly, in the search range 106, a plurality of reference blocks 108 are set.

Here, to move the reference block 108 in the search range 106 signifies to move the center position of the reference block 108 in the search range 106 because, in the present example, the origin 105 is the center position of the target block. Therefore, some of pixels which compose the reference block 108 sometimes protrude from the search range 106.

Then, for each of the reference blocks 108 set in the search range 106, a vector 107 (refer to FIG. 52) hereinafter referred to as reference vector is set which represents a positional displacement amount and a positional displacement direction between the reference block 108 and the target block 102. Then, the correlation between the image contents of the reference block 108 at the position indicated by each reference vector 107 and the image contents of the target block 102 is evaluated.

Referring to FIG. 53, where the positional displacement amount of the reference block 108 in the horizontal direction or X direction is represented by Vx and the positional displacement amount of the reference block 108 in the vertical direction or Y direction is represented by Vy, the reference vector 107 can be represented as vector (Vx, Vy). When the positional coordinates such as, for example, the center position coordinates of the reference block 108 and the positional coordinates such as, for example, the center position coordinates of the target block 102 are same as each other, the reference vector 107 is represented as vector (0, 0).

For example, if the reference block 108 is at a position displaced by a one-pixel distance in the X direction from the position of the target block 102 as seen in FIG. 53, then the reference vector 107 is vector (1, 0). Meanwhile, if the reference block 108 is at a position displaced by a three-pixel distance in the X direction and by a two-pixel distance in the Y direction from the position of the target block 102 as seen in FIG. 54, then the reference vector 107 is vector (3, 2).

In particular, where the positions of the target block 102 and the reference block 108 are defined as the center positions of the blocks as in the example of FIG. 54, the reference vector 107 signifies positional displacement between the center position of the reference block 108 and the center position of the target block 102, that is, a vector having a positional displacement amount and the direction of the displacement.

While the reference block 108 moves in the search range 106, the center position of the reference block 108 moves in the search range 106. As described hereinabove, since the reference block 108 is composed of a plurality of pixels in the horizontal direction and the vertical direction, the maximum range of the movement of the reference block 108 which is an object of a block matching process with the target block 102 is a matching processing range 110 which is greater than the search range 106 as seen in FIG. 54.

Then, the position of the reference block 108 detected as a block having the maximum correlation with the image contents of the target block 102 is determined as the position after the movement of the target block 102 of the target frame 100 on the reference frame 101, and the detected reference block is determined as the motion compensation block 103 described hereinabove. Then, the positional displacement amount between the detected position of the motion compensation block 103 and the position of the target block 102 is detected as the motion vector 104 as an mount including a directional component (refer to FIG. 51B).

Here, the correlation value representative of the magnitude of the correlation between the target block 102 and the reference block 108 which moves in the search range 106 is calculated basically using corresponding pixel values of the target block 102 and the reference block 108. For the calculation, various methods have been proposed, and one of such methods uses the root-mean-square.

As a correlation value which is popularly used in calculation of a motion vector, for example, the sum total of absolute values of differences between luminance values of pixels in the target block 102 and luminance values of corresponding pixels in the search range 106 in regard to all pixels in the blocks is used (refer to FIG. 55). The sum total of absolute values of differences is called difference absolute value sum and hereinafter referred to as SAD (Sum of Absolute Difference).

Where an SAD value is used as a correlation value, the lower the SAD value, the higher the correlation. Accordingly, the reference block 108 which moves in the search range 106 becomes a highest correlation reference block when it is positioned at a position at which the SAD value exhibits the lowest value. Thus, the highest correlation reference block is detected as the motion compensation block 103, and the positional displacement amount of the detected motion compensation block 103 with respect to the position of the target block 102 is detected as a motion vector.

As described hereinabove, in the block matching, the positional displacement amount of each of the plural reference blocks 108 set in the search range 106 with respect to the position of the target block 102 is represented as a reference vector 107 as an amount including a directional component. The reference vector 107 of each reference block 108 has a value based on the position of the reference block 108 on the target block 102. As described hereinabove, in the block matching, the reference vector of the reference block 108 which exhibits the minimum value of the SAD value as a correlation value is detected as the motion vector 104.

Therefore, in the block matching, as shown in FIG. 56, generally such a detection method as described in the following is adopted. In particular, SAD values between a plurality of reference blocks 108 set in the search range 106 and a target block 102 (such SAD values are hereinafter referred to as SAD values of the reference blocks 108 for simplified description) are stored in a corresponding relationship to reference vectors 107 corresponding to the positions of the reference blocks 108 (such reference vectors 107 corresponding to the positions of the reference blocks 108 are hereinafter referred to as reference vectors 107 of the reference blocks 108 for simplified description) into a memory. Then, that one of the reference blocks 108 which exhibits a minimum SAD value from among the SAD values of all of the reference blocks 108 stored in the memory is detected to detect the motion vector 104.

A memory or memory area in which correlation values such as SAD values of the reference blocks 108 are stored in an individually corresponding relationship to the reference vectors 107 corresponding to the positions of the reference blocks 108 set in the search range 106 is called correlation value table. In the present example, since the SAD value which is a difference absolute value sum is used as the correlation value, the correlation value table is formed as a difference absolute value sum table which is hereinafter referred to as SAD table.

The SAD table is represented as an SAD table TBL in FIG. 56. Referring to FIG. 56, in the SAD table TBL shown, the correlation value, in the example shown, the SAD value, of each reference block 108 is called correlation value table element. In the example of FIG. 56, the SAD value denoted by reference numeral 111 is an SAD value where the reference vector is vector (0, 0). Further, in the example of FIG. 56, since the minimum value of the SAD value is "7" where the reference vector is vector (3, 2), the motion vector 104 to be determined naturally is vector (3, 2).

It is to be noted that the position of any of the target block 102 and the reference blocks 108 signifies an arbitrary particular position in the block, for example, the position of the center of the block, and the reference vector 107 indicates a displacement amount including a direction between the position of the projection image block 109 of the target block 102 and the position of the reference block 108 in the reference frame 101.

Then, the reference vector 107 corresponding to each reference block 108 is a positional displacement of the reference block 108 from the position of the projection image block 109 corresponding to the target block 102 on the reference frame 101, and therefore, if the position of the reference block 108 is specified, then also the value of the reference vector is specified in accordance with the position of the reference block 108. Accordingly, if the address of a correlation value table element of a reference block in the memory of the SAD table TBL is specified, then the corresponding reference vector is specified.

It is to be noted that the SAD value may be calculated simultaneously for two or more target blocks. If the number of target blocks to be processed simultaneously increases, then the speed of processing increases. However, since the scale of hardware for calculating the SAD value increases, the increase of the speed of processing and the increase of the circuit scale have a trade-off relationship to each other.

Incidentally, in the block matching method described above, as the resolution of an image of an object of processing increases, the number of pixels with regard to which a motion is detected between two images or two screen images increases. Therefore, in order to follow up the motion, it is necessary to use a wider search range for a motion vector, that is, to increase the number of pixels to be included in a search range.

However, where a wider search range is used in this manner, the number of times by which pixel information is to be read in from a frame memory per one block of an object of processing increases, resulting in a problem that increased processing time is required.

On the other hand, where the resolution of an image of an object of processing is low, or where the frame rate is high, since the motion between pixels is small, it is necessary to detect a small motion of a sub pixel accuracy smaller than one pixel. Therefore, it is necessary to use an oversampled image to detect a motion vector thereby to detect a motion vector smaller than one pixel. However, employment of this method gives rise to a problem that the circuit scale is increased and also the processing time is increased by the oversampling.

As described above, the block matching method indicates a tendency that the processing time and the circuit scale increase in response to the requirement for a wide search range and a very small motion less than one pixel. Thus, it is demanded to eliminate such increase of the processing time and the circuit scale.

Meanwhile, in recent years, development of images of high definition dynamic pictures has progressed, and a demand for a higher resolution and higher picture quality of images is increasing. Together with this, a demand for a block matching method which implements both of a wider search range and detection of a very small motion of a sub pixel accuracy less than one pixel is increasing.

In order to solve such problems as described above, various methods have been proposed in the past. For example, a method for achieving efficient processing in detection of a very small motion less than one pixel has been proposed and is disclosed in Japanese Patent Laid-Open No. Hei 7-95585. Another method for reducing a frame memory and the calculation amount by sampling out reference images is disclosed in Japanese Patent Laid-Open No. 2006-160829.

A further method which is considered most practical is disclosed in Japanese Patent Laid-Open No. Hei 5-91492. According to the method, a minimum SAD value in an SAD table and a plurality of SAD tables at neighboring positions with the position of the minimum SAD value in the SAD table are used to carry out an interpolation process so that a minimum value of the SAD value is calculated in a high accuracy lower than the accuracy of the SAD table, that is, the pixel pitch accuracy of a target frame and a reference frame. With the method described, the reference image need not be pre-processed and also the impact of the circuit scale is small.

SUMMARY

As described above, the block matching method is applied in different manners depending upon the resolution or the frame rate of an image of an object of processing. In particular, it is sufficient for the block matching method to detect a motion of the one-pixel accuracy, or it is necessary for the block matching method to detect a very small motion of a sub pixel accuracy less then one pixel.

Further, for example, in the case of a still picture, motion detection of the sub pixel accuracy is desirable, but in the case of a dynamic picture, motion detection of the one-pixel accuracy (pixel accuracy) may be used. Further, while, in the case of a dynamic picture, importance is attached to the processing speed because the real time property is demanded, in the case of a sill picture, the accuracy should take precedence.

For example, in a camera system, as higher-functioning progresses, various applications have been proposed, and therefore, such various situations as described above occur in regard to an image of an object of processing or to processing of an image. However, block matching which is ready for such various demands as described above cannot be implemented by a single kind of block matching.

Therefore, it is demanded to provide an image processing apparatus and an image processing method by which an appropriate block matching process can be carried out in response to various situations regarding an image of an object of processing or a process for the image.

According to an embodiment, there is provided an image processing apparatus for calculating a motion vector between two screen images including a target screen image and a reference screen image. The image processing apparatus includes following sections:

a base face motion vector calculation section configured to detect a maximum correlation base face reference block having a high correlation with a target block of a predetermined size which is set at a predetermined position on the target screen image from among a plurality of reference blocks which individually have a size same as that of the target block and which are set in a first search range set on the reference screen image and calculate a base face motion vector based on a position displacement amount of the detected maximum correlation base face reference block on the screen image with respect to the target block;

a high-accuracy base face motion vector calculation section configured to carry out an interpolation process using a correlation value of the maximum correlation base face reference block and correlation values of the plural reference blocks positioned at neighboring positions with the maximum correlation base face reference block to detect a position of a high-accuracy maximum correlation base face reference block and calculate a high-accuracy base face motion vector based on a position displacement amount of the high-accuracy maximum correlation base face reference block on the screen image with respect to the target block;

a reduction face motion vector calculation section configured to reduce the target screen image and the reference screen image by a predetermined reduction ratio to produce a reduction target screen image and a reduction reference screen image, detect a maximum correlation reduction face reference block having a high correlation with a reduction face target block which has a predetermined size and is set at a predetermined position on the reduction target screen image from among a plurality of reduction face reference blocks which individually have a size same as that of the reduction face target block and which are set in a second search range set on the reduction reference screen image and calculate a reduction face motion vector based on a position displacement amount of the detected maximum correlation reduction face reference block on the screen image with respect to the reduction face target block;

a high-accuracy reduction face motion vector calculation section configured to carry out an interpolation process using the correlation value of the maximum correlation reduction face reference block and the correlation values of the plural reduction face reference blocks positioned at the neighboring positions with the maximum correlation reduction face reference block to detect a position of a high-accuracy maximum correlation reduction face reference block and calculate a high-accuracy reduction face motion vector based on a position displacement amount of the high-accuracy maximum correlation reduction face reference block on the screen image with respect to the target block;

a first base face search range determination section configured to determine the first search range based on the reduction face motion vector calculated by the reduction face motion vector calculation section;

a second base face search range determination section configured to determine the second search range based on the high-accuracy reduction face motion vector calculated by the high-accuracy reduction face motion vector calculation section; and a selection section configured to select a calculation section to be used from among the base face motion vector calculation section, high-accuracy base face motion vector calculation section, reduction face motion vector calculation section and high-accuracy reduction face motion vector calculation section and select whether or not the first or second base face search range determination section should be used and then select, where use of any of the determination sections is determined, a determination section to be used from between the first and second base face search range determination sections.

According to another embodiment, there is provided an image processing method for calculating a motion vector between two screen images including a target screen image and a reference screen image, the image processing method being executed by an image processing apparatus including a base face motion vector calculation means, a high-accuracy base face motion vector calculation means, a reduction face motion vector calculation means, a high-accuracy reduction face motion vector calculation means, a first base face search range determination means and a second base face search range determination means. The image processing method includes following steps:

a base face motion vector calculation step, carried out by the base face motion vector calculation means, of setting a plurality of reference blocks which individually have a size same as that of a target block which has a predetermined size and is set at a predetermined position on the target screen image in a first search range set on the reference screen image to detect a maximum correlation base face reference block having a high correlation with the target block from among the plural reference blocks and calculating a base face motion vector based on a position displacement amount of the detected maximum correlation base face reference block on the screen image with respect to the target block;

a high-accuracy base face motion vector calculation step, carried out by the high-accuracy base face motion vector calculation means, of carrying out an interpolation process using a correlation value of the maximum correlation base face reference block and correlation values of the plural reference blocks positioned at neighboring positions with the maximum correlation base face reference block to detect a position of a high-accuracy maximum correlation base face reference block and calculating a high-accuracy base face motion vector based on a position displacement amount of the high-accuracy maximum correlation base face reference block on the screen image with respect to the target block;

a reduction face motion vector calculation step, carried out by the reduction face motion vector calculation means, of reducing the target screen image and the reference screen image by a predetermined reduction ratio to produce a reduction target screen image and a reduction reference screen image, setting a plurality of reduction face reference blocks which individually have a size same as that of a reduction face target block which has a predetermined size and is set at a predetermined position on the reduction target screen image in a second search range set on the reduction reference screen image, detecting a maximum correlation reduction face reference block having a high correlation with the reduction face target block from among the plural reduction face reference blocks and calculating a reduction face motion vector based on a position displacement amount of the detected maximum correlation reduction face reference block on the screen image with respect to the reduction face target block;

a high-accuracy reduction face motion vector calculation step, carried out by the high-accuracy reduction face motion vector calculation means, of carrying out an interpolation process using a correlation value of the maximum correlation reduction face reference block and correlation values of the plural reduction face reference blocks positioned at the neighboring positions with the maximum correlation reduction face reference block to detect a position of a high-accuracy maximum correlation reduction face reference block to calculate a high-accuracy reduction face motion vector based on a position displacement amount of the high-accuracy maximum correlation reduction face reference block on the screen image with respect to the target block;

a first base face search range determination step, carried out by the first base face search range determination means, of determining the first search range based on the reduction face motion vector calculated by the reduction face motion vector calculation means;

a second base face search range determination step, carried out by the second base face search range determination means, of determining the second search range based on the high-accuracy reduction face motion vector calculated by the high-accuracy reduction face motion vector calculation means; and a selection step of selecting, when the motion vector between the two screen images is to be calculated, a calculation step to be used from among the reduction face motion vector calculation step, high-accuracy reduction face motion vector calculation step, base face motion vector calculation step and high-accuracy base face motion vector calculation step, selecting whether or not the first or second base face search range determination step should be used and then selecting, where use of any of the determination steps is determined, a determination means to be used from between the first and second base face search range determination steps.

In the image processing apparatus, a plurality of different block matching methods are prepared, and an appropriate block matching method is selected from among the prepared block matching methods in response to a situation of an image of an object of processing or a process for the image by the selection section.

In summary, with the image processing apparatus, an appropriate block matching method is selected from among the prepared block matching methods in response to a situation of an image of an object of processing or a process for the image.

Additional features and advantages are described herein, and will be apparent from the following Detailed Description and the figures.

BRIEF DESCRIPTION OF THE FIGURES

FIG. 2 is a schematic view illustrating production of a reduced-noise image from picked up images by the image pickup apparatus of FIG. 1;

FIGS. 6, 7, 8A to 8C, 9 to 12, 13A to 13C, 14, 15A and 15B, and 16A and 16B are diagrammatic views illustrating several image processing methods by the image pickup apparatus of FIG. 1;

FIG. 35 is a view illustrating operation modes and motion vector accuracies used in the process illustrated in FIG. 34;

FIGS. 49A to 49F are schematic views illustrating an effect of a hierarchical block matching process used in the image processing method according to an embodiment; and FIGS. 50A to 50C, 51A and 51B, and 52 to 56 are diagrammatic views illustrating a block matching process.

DETAILED DESCRIPTION

In the following, an image processing apparatus which uses an image processing method according to an embodiment is described below with reference to the accompanying drawings taking an image pickup apparatus as an example. Further, in the image processing method, a process carried out using a detected motion vector is described taking a process wherein a plurality of images are superposed to reduce noise as an example.

[Image Processing Apparatus According to Embodiments]

In the image pickup apparatus according an embodiment, a plurality of images picked up successively such as, for example, images P1, P2 and P3 shown in FIG. 2 are relatively positioned using motion detection and motion compensation and then are superposed with one another to obtain an image Pmix having reduced noise. In particular, since noise is included at random in a plurality of images, if images of like contents are superposed one on another, then noise is reduced with a resulting image.

In the following description, to superpose a plurality of images using motion detection and motion compensation to reduce noise is referred to as noise reduction (NR), and an image having noise reduced by such noise reduction is referred to as reduced noise image.

In the present specification, a screen image to which noise reduction is to be applied is referred to as target screen image or target frame, and screen images to be superposed are defined as reference screen images or reference images. Images picked up successively are displaced in position by camera shake of the image pickup person, and in order to superpose the two images, positioning of the images is significant. What should be taken into consideration here is that a motion of an image pickup object in the screen exists in addition to a camera shake of the entire screen image like a camera shake by hand.

Figure 3:
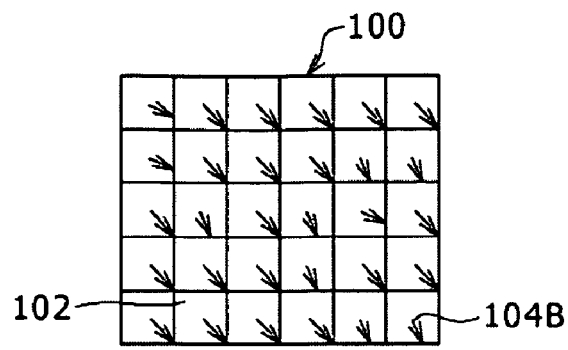
FIG. 3 is a schematic view illustrating a block matching process by the image pickup apparatus of FIG. 1.

Therefore, in order to enhance the noise reduction effect also in regard to the image pickup object, it is necessary to divide a target frame 100 into a plurality of target blocks 102 as seen in FIG. 3 and carry out positioning in a unit of a target block 102. Here, each of the target blocks 102 includes a plurality of pixels in a horizontal direction x a plurality of lines in a vertical direction.

In the present embodiment, a motion vector (hereinafter referred to as block motion vector) 104B in a unit of a block is detected from all of the target blocks 102 such that positioning for the target blocks 102 is carried out using the block motion vectors 104B to superpose images.

The image pickup apparatus of the present embodiment has a mode for picking up a still picture and another mode for picking up dynamic pictures.

Figure 4:
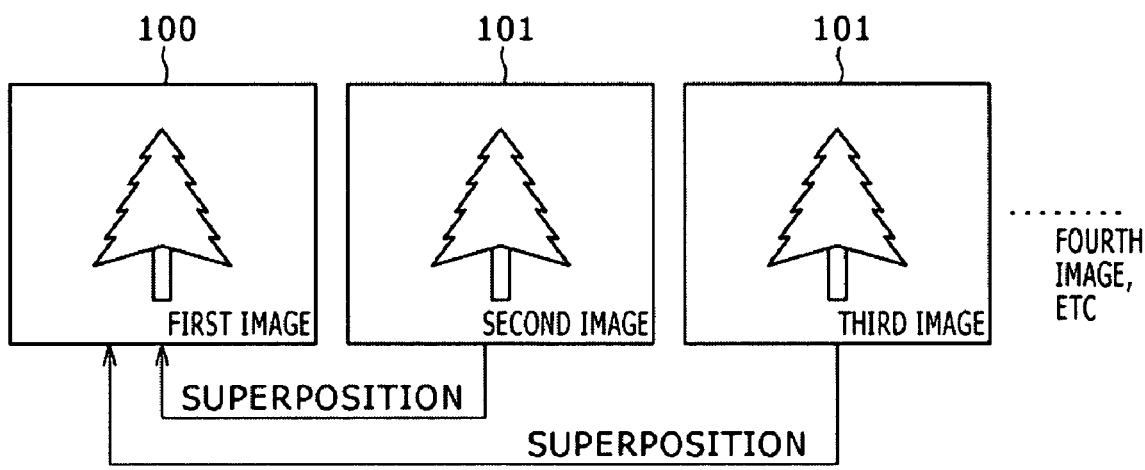
FIGS. 4 and 5 are schematic views illustrating different noise reduction processes by the image pickup apparatus of FIG. 1.

When the image pickup apparatus is in the still picture pickup mode, a plurality of images are picked up successively at a high speed and are superposed setting the first picked up image as a target frame 100 and setting a predetermined number of succeeding picked up images including the second and succeeding picked up images as reference frames 101 as seen in FIG. 4, and each resulting image is recorded at a still picture picked up image. In particular, if the image pickup person depresses the shutter button of the image pickup apparatus, then the predetermined number of images are picked up successively at a high speed, and on the image or frame picked up first, a plurality of images or frames picked up later in time are superposed.

Figure 5:
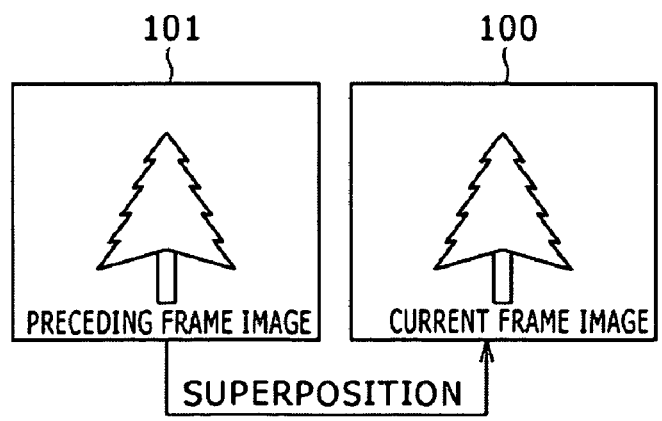

On the other hand, when the image pickup apparatus is in the dynamic picture image pickup mode, an image of a frame being currently outputted from the image pickup device is determined as an image of a target frame 100, and an image in the past of the immediately preceding frame is determined as a reference frame 101 as seen in FIG. 5. Accordingly, in order to carry out noise reduction of the image of the current frame, the image of the preceding frame is superposed on the image of the current frame.

It is to be noted that, in the description of the methods of superposition of images in FIGS. 4 and 5, when the frame rate of dynamic picture images to be recorded is 60 fps (frame/second), two image frames at the frame rate of 60 fps from the image pickup device are superposed to obtain a picked up image signal of the frame rate of 60 fps having reduced noise.

However, also where picked up images are outputted at a higher frame rate of, for example, 240 fps from the image pickup device, it is possible to obtain a picked up image signal of the frame rate of 60 fps by superposing every four images to produce one dynamic picture frame. Naturally, by superposing every two picked up dynamic picture images of 240 fps in a similar manner, it is possible to obtain a picked up image signal of the frame rate of 240 fps having reduced noise.

In this manner, the image pickup apparatus of the present embodiment is ready for noise reduction by image superposition for both of still pictures and dynamic pictures. Generally, while high accuracy is required for noise reduction by image superposition of still images, a real-time property, that is, a high speed processing speed, is required for noise reduction by image superposition of dynamic pictures.

Therefore, for example, for noise reduction of still pictures, motion detection of a sub pixel accuracy over a wide search range is required. Meanwhile, for noise reduction of dynamic pictures, it is necessary that motion detection of a pixel accuracy can be carried out at a high speed and the load for a bus band be low. Here, the bus band is a data rate at which data can be transferred on a path for transmission of data while preventing congestion.

Accordingly, a block matching method for motion detection preferably prepares at least two different operation modes including an operation mode for still picture noise reduction in the still picture image pickup mode and another operation mode for dynamic picture noise reduction in the dynamic picture image pickup mode.

In recent years, together with progresses of high-functioning of a camera system, various applications have been proposed and incorporated in image pickup devices actually. Therefore, preferably the block matching technique for motion detection in the noise reduction system prepares not only the two operation modes for still picture noise reduction and dynamic picture noise reduction but also a plurality of additional operation modes in accordance with a processing speed, a bus band, a pixel size, a search range, a frame rate, a detection accuracy of a motion vector and so forth.

Taking the foregoing into consideration, the image pickup apparatus of the present embodiment has more than two operation modes as operation modes for block matching for carrying out motion detection and automatically selects an appropriate block matching operation mode in response to a selection operation of an image pickup mode between the still picture image pickup mode and the dynamic picture image pickup mode, carried out, for example, through a user operation inputting unit 3, and also to a processing speed, a bus band, a selective designation operation of a detection accuracy for a motion vector and so forth.

[Example of a Hardware Configuration of the Image Pickup Apparatus]

Figure 1:
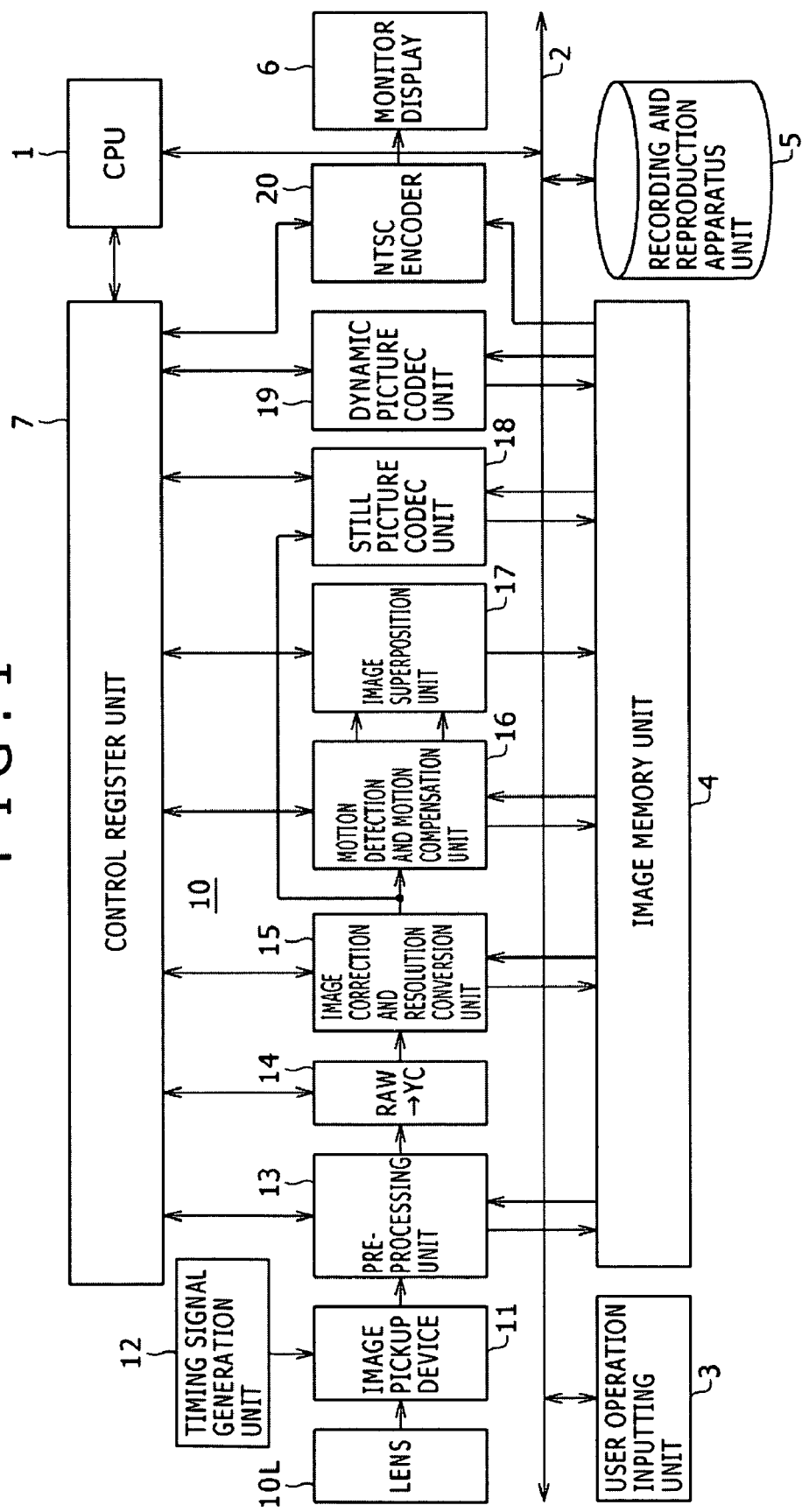
FIG. 1 is a block diagram showing an example of a configuration of an image pickup apparatus as an image processing apparatus according to embodiments.

FIG. 1 shows an example of the image pickup apparatus as an embodiment of the image processing apparatus according to an embodiment.

Referring to FIG. 1, the image pickup apparatus shown includes a central process unit (CPU) 1 connected to a system bus 2. The image pickup apparatus further includes a picked up image signal processing system 10, a user operation inputting unit 3, an image memory unit 4 and a recording and reproduction apparatus unit 5 connected to the system bus 2. It is to be noted that, though not shown, the CPU 1 includes a ROM (Read Only Memory) in which programs for carrying out various software processes are stored, a RAM (Random Access Memory) for a working area, and so forth.

The picked up image signal processing system 10 of the image pickup apparatus of FIG. 1 receives an image pickup recording starting operation through the user operation inputting unit 3 and carries out such a picked up image data recording process as hereinafter described. Further, the picked up image signal processing system 10 of the image pickup apparatus of FIG. 1 receives a reproduction starting operation of picked up recorded images through the user operation inputting unit 3 and carries out a reproduction process for picked up image data recorded in a recording medium of the recording and reproduction apparatus unit 5. It is to be noted that components hereinafter described of the picked up image signal processing system 10 receive a control command from the CPU 1 through a control register unit 7 and execute individual processes under the control of the CPU 1.

As seen in FIG. 1, in the picked up image signal processing system 10, incoming light from an image pickup object through a camera optical system not shown including an image pickup lens 10L is irradiated upon an image pickup device 11, by which an image is picked up. In the present example, the image pickup device 11 is formed from a CCD (Charge Coupled Device) imager. It is to be noted that the image pickup device 11 may otherwise be formed from a CMOS (Complementary Metal Oxide Semiconductor) imager.

In the image pickup apparatus, if an image recording starting operation is carried out, then an image inputted through the image pickup lens 10L is converted into a picked up image signal by the image pickup device 11. Consequently, an analog picked up image signal as a raw signal of the Bayer array composed of signal components of three primary colors of red (R), green (G) and blue B is outputted from the image pickup device 11 in synchronism with a timing signal from a timing signal generation unit 12. The outputted analog picked up image signal is supplied to a pre-processing unit 13, by which it is subjected to pre-processes such as defect correction and γ correction. Then, a resulting signal is supplied to a data conversion unit 14.

The data conversion unit 14 converts an analog picked up image signal in the form of a raw signal inputted thereto into a digital picked up image signal or YC data composed of a luminance signal component Y and color difference signal components Cb/Cr, and supplies the digital picked up image signal to an image correction and resolution conversion unit 15. The image correction and resolution conversion unit 15 converts the digital picked up image signal into a signal of a resolution designated through the user operation inputting unit 3 and supplies the resulting digital picked up image signal to the image memory unit 4 through the system bus 2.

If an image pickup instruction received through the user operation inputting unit 3 is a still picture image pickup instruction originating from depression of the shutter button, then the digital picked up image signal having a resolution converted by the image correction and resolution conversion unit 15 is written for a plurality of frames mentioned hereinabove into the image memory unit 4. After images for the plural frames are written into the image memory unit 4, image data of a target frame and image data of reference frames are read in by a motion detection and motion compensation unit 16, by which such a block matching process as hereinafter described is carried out to detect motion vectors. Then, an image superposition unit 17 carries out such an image superposition process as hereinafter described based on the thus detected motion vectors. Image data of a reduced noise image which has reduced noise as a result of the superposition are stored into the image memory unit 4.

Then, the image data of the reduced noise image of the superposition result stored in the image memory unit 4 are codec converted by a still picture codec unit 18 and then recorded on a recording medium of the recording and reproduction apparatus unit 5 such as, for example, a DVD (Digital Versatile Disc) or a hard disk through the system bus 2. In the present embodiment, the still picture codec unit 18 carries out an image compression coding process for still pictures of the JPEG (Joint Photographic Experts Group) system.

Further, when the image pickup apparatus is in the still picture image pickup mode, before the shutter button is depressed, image data from the image correction and resolution conversion unit 15 are supplied through the image memory unit 4 to an NTSC (National Television System Committee) encoder 20, by which they are converted into a standard color video signal of the NTSC system. The standard color video signal is supplied to a monitor display 6 which may be, for example, an LCD (Liquid Crystal Display) apparatus, and an monitor image in the still picture image pickup mode is displayed on the display screen of the monitor display 6.

On the other hand, if the image pickup instruction inputted through the user operation inputting unit 3 is a dynamic picture image pickup instruction originating from depression of a dynamic picture recording button, then image data after resolution conversion are written into the image memory unit 4 and simultaneously sent to the motion detection and motion compensation unit 16. Thus, such a block matching process as hereinafter described is carried out for the image data by the motion detection and motion compensation unit 16 to detect motion vectors, and the image superposition unit 17 carries out such a superposition process of images as hereinafter described based on the detection motion vectors. Thus, image data of a reduced noise image having reduced noise as a result of the superposition are stored into the image memory unit 4.

The image data of such reduced noise images of the result of superposition stored in the image memory unit 4 are outputted to the display screen of the monitor display 6 through the NTSC encoder 20 and are simultaneously codec converted by a dynamic picture codec unit 19. Then, the codec-converted image data are supplied through the system bus 2 to the recording and reproduction apparatus unit 5, by which they are recorded on a recording medium such as a DVD or a hard disk. In the present embodiment, the dynamic picture codec unit 19 carries out an image compression coding process for dynamic pictures in accordance with the MPEG (Dynamic picture Experts Group) system.

The picked up image data recorded on the recording medium of the recording and reproduction apparatus unit 5 are read out in response to a reproduction starting operation carried out through the user operation inputting unit 3 and supplied to and decoded for reproduction by the dynamic picture codec unit 19. Then, the decoded image data are supplied through the NTSC encoder 20 to the monitor display 6, by which a reproduction image is displayed on the display screen based on the image data. It is to be noted that, though not shown in FIG. 1, an output video signal from the NTSC encoder 20 can be led out to the outside through a video output terminal.

The motion detection and motion compensation unit 16 described above may be configured by hardware or may be configured using a DSP (Digital Signal Processor). Alternatively, the motion detection and motion compensation unit 16 may be configured as a software process by the CPU 1.

Similarly, also the image superposition unit 17 described above may be configured by hardware or may be configured using a DSP. Alternatively, the image superposition unit 17 may be configured as a software process by the CPU 1. This similarly applies also to the still picture codec unit 18 and the dynamic picture codec unit 19.

[Motion Detection and Motion Compensation Unit 16]

The motion detection and motion compensation unit 16 basically carries out a block matching process using an SAD value described hereinabove with reference to FIGS. 51 to 56 to carry out motion vector detection. However, in the present embodiment, the motion detection and motion compensation unit 16 is configured from such hardware as hereinafter described such that two or more operation modes of a block matching process can be executed by the common hardware. A plurality of different operation modes for a block matching process used in the present embodiment are described first.

<Reduction Face Matching Processing Mode>

A motion vector detection process in popular related-art block matching includes movement of a reference block in a unit of a pixel or pixels, that is, in a unit of one pixel or in a unit of a plurality of pixels, calculation of an SAD value of the reference block at each of the movement positions, detection of that one of the SAD values which exhibits a minimum value from among the calculated SAD values and detection of a motion vector based on the reference block position at which the minimum SAD value is indicated.

However, with such a related-art motion vector detection process, since the reference block is moved in a unit of a pixel or pixels within a search range, the number of times of the matching process for calculating an SAD value increases in proportion to the search range. This gives rise to a problem that increased time is required for the matching process and also an increased capacity is required for an SAD table. Further, also the number of times for accessing an image memory through the system bus 2 increases, and this requires increase of the bus band.

In the dynamic picture noise reduction process, a method superior in the processing speed and in reduction of the bus band is demanded even if the detection accuracy of a motion vector is sacrificed. It is to be noted that the bus band which becomes a problem here is a bus band when the motion detection and motion compensation unit 16 accesses the image memory unit 4 through the system bus 2.

Taking the foregoing into consideration, in the present embodiment, a reduction face matching processing mode is provided wherein a reduced image is produced for a target image or target frame and a reference image or reference frame and block matching is carried out using the produced reduced images. It is to be noted that, in the description given below, a reduced image is referred to as reduction face, and an original image which is not reduced is referred to as base face.

Figure 6:
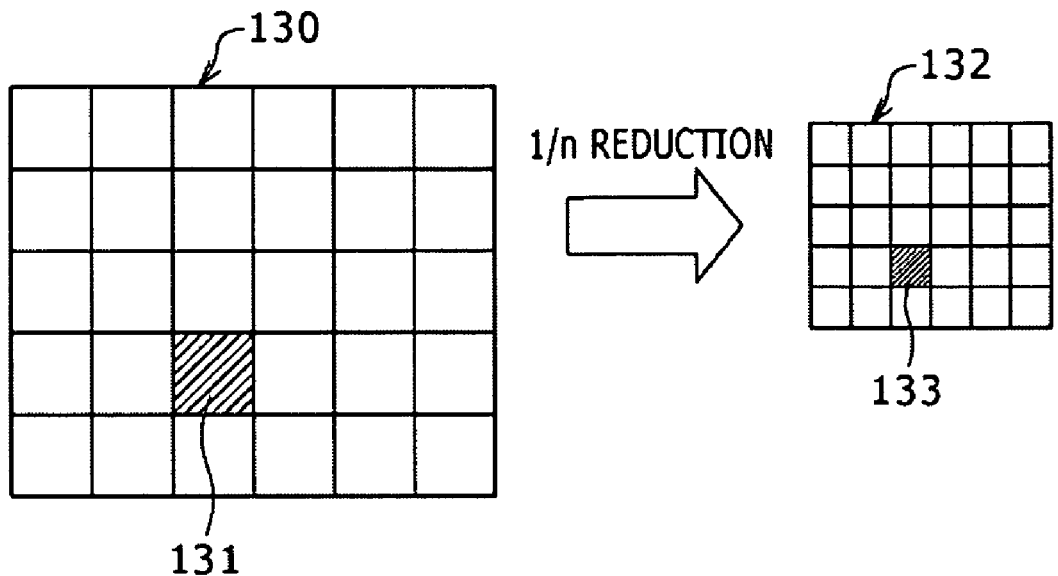
Figure 7:
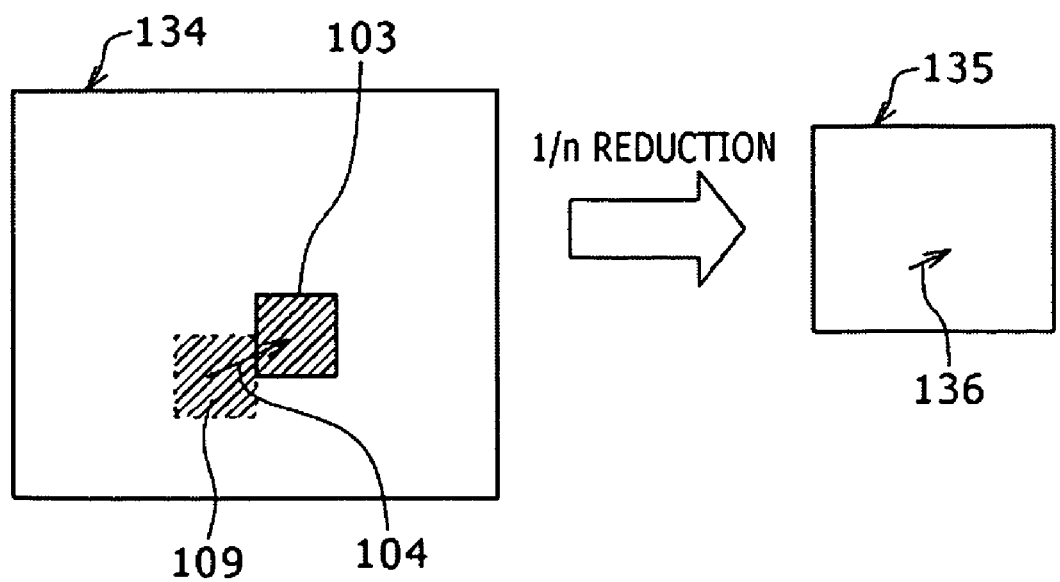

FIGS. 6 and 7 illustrate image reduction of a target frame or screen image and a reference frame or screen image, respectively. In particular, in the present embodiment, for example, as seen in FIG. 6, a base face target frame 130 is reduced to 1/n (n is a positive number) in both of a horizontal direction and a vertical direction to produce a reduction face target frame 132. Accordingly, base face target blocks 131 produced by dividing the base face target frame 130 into a plurality of portions are converted into reduction face target blocks 133 which are reduced to 1/n in both of the horizontal direction and the vertical direction.

Then, a reference frame is reduced in accordance with the image reduction ratio 1/n of the target frame. In particular, as seen in FIG. 7, a base face reference frame 134 is reduced to 1/n in both of the horizontal and vertical directions to produce a reduction face reference frame 135. Then, a base face motion vector 104 of a motion compensation block 103 detected on the base face reference frame 134 is detected, on the reduction face reference frame 135, as a reduction face motion vector 136 reduced to 1/n×1/n.

It is to be noted that, while, in the example described above, the image reduction ratios of the target frame and the reference frame are equal to each other, different image reduction ratios may be used for the target frame or image and the reference frame or image, for reduction of the calculation amount such that the pixel numbers of both frames may be made equal to each other by a process of pixel interpolation or the like to carry out matching.

Further, while the reduction ratios in the horizontal direction and the vertical direction are equal to each other, different reduction ratios may be applied to the horizontal and vertical directions. For example, if a reduction ratio of 1/n is applied to the horizontal direction and another reduction ratio of 1/m (m is a positive number, and n≠m) is applied to the vertical direction, then the reduced image has a size of 1/n×1/m that of the original screen image.

Figure 8A:
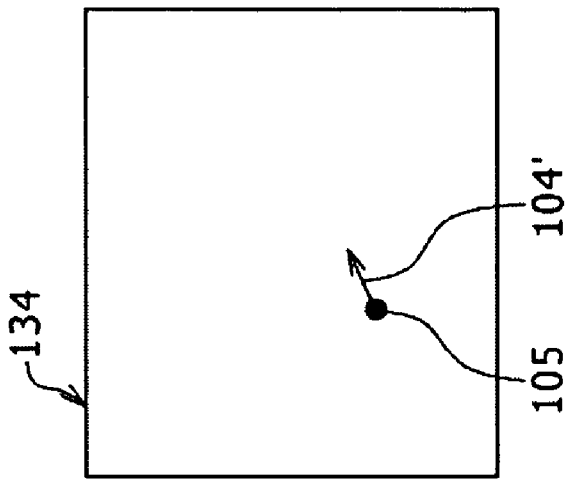
Figure 8B:
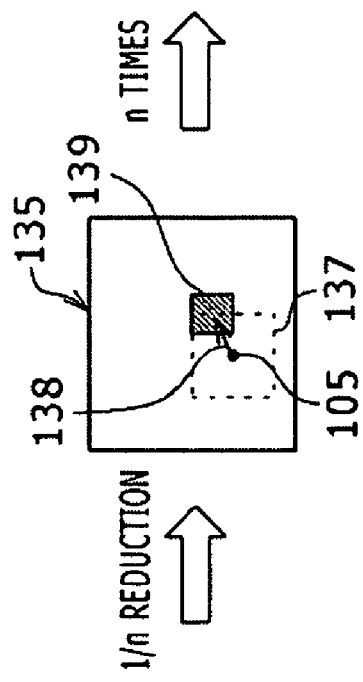
Figure 8C:
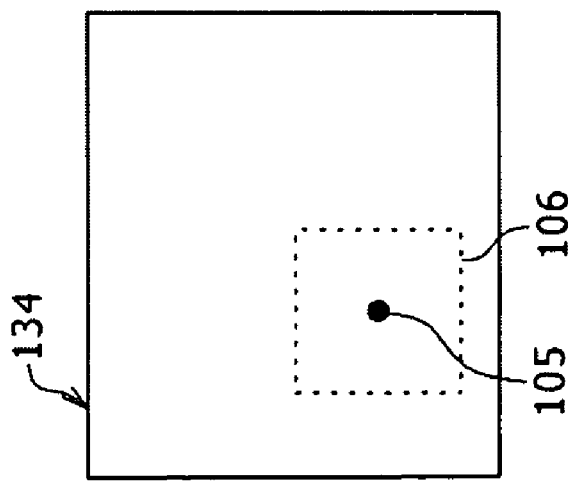

FIGS. 8A, 8B and 8C illustrate a relationship between a reduction face reference vector 138 and a base face reference vector. If a motion detection origin 105 and a search range 106 are determined on the base face reference frame 134 as seen in FIG. 8A, then on the reduction face reference frame 135 reduced to 1/n×1/n, the search range is a reduction face search range 137 reduced to 1/n×1/n as seen in FIG. 8B.

Further, in the present embodiment, a reduction face reference vector 138 representative of a positional displacement amount from the motion detection origin 105 on the reduction face reference frame 135 is set within the reduction face search range 137 to evaluate the correlation between a reduction face reference block 139 at the position indicated by the reduction face reference vector 138 and a reduction face target block 133 not shown in FIG. 8B.

In this instance, since block matching is carried out on the reduced image, the number of reduction face reference block positions or reduction face reference vectors 138 with regard to which an SAD value is to be calculated in the reduction face reference frame 135 can be reduced. Thus, as the number of times of calculation of an SAD number, that is, the number of times of matching processing, decreases, the processing speed can be raised and the ratio of the SAD table can be reduced.

By correlation evaluation by block matching between a plurality of reduction face reference blocks 139 and a reduction face target block 133 set in the reduction face matching processing range defined by the reduction face search range 137, reduction face motion vectors 136 not shown in FIG. 8B on the reduction face reference frame 135 are calculated. The accuracy of the reduction face motion vectors 136 is reduced to a low accuracy equal to n times that of one pixel because the image is reduced to 1/n×1/n.

If the reduction face motion vector 136 determined in this manner is multiplied by a reciprocal number to the image reduction ratio as seen in FIG. 8C, then a motion vector on the base face (hereinafter referred to as motion vector 104') can be obtained. However, the accuracy of the base face motion vector 104' becomes an accuracy corresponding to the image reduction ratio. For example, if block matching is carried out on the reduction face reduced to 1/4 in both of the vertical and horizontal directions, then the base face motion vector 104' becomes a motion vector of an accuracy of four pixels.

However, it is apparent that, in the base face reference frame 134, the base face motion vector 104 of the accuracy of one pixel exists in the proximity of the base face motion vector 104' obtained by increasing the reduction face motion vector 136 to n times.

In the noise reduction system for dynamic pictures, the real time performance, that is, the speed, is required together with the accuracy. In such a system wherein various processing sections are connected to the system bus 2 and carry out various processes in parallel as described hereinabove with reference to FIG. 1, importance is attached also to the bus band.

The speed and bus band and the accuracy in motion detection have a trade-off relationship, and if it is tried to achieve speeding up of processing or reduction of the bus band while also the accuracy in motion detection is demanded, then also the cost vs. effect problem must be taken into consideration. This reduction face matching processing mode is a processing mode suitable for a case wherein it is tried to achieve, for example, in a dynamic picture noise reduction process, speeding up of processing or reduction of the bus band even if the motion detection accuracy is disregarded.

<Reduction Face Matching+Interpolation Processing Mode>

In the reduction face matching processing mode, the detection accuracy of a motion vector has a value according to the image reduction ratio. A mode wherein reduction of the processing speed or the bus band is maintained as far as possible to raise the accuracy of a motion vector is this reduction face matching+interpolation processing mode.

In the present reduction face matching+interpolation processing mode, an interpolation process is carried out using SAD values of reduction face reference blocks 139 in the proximity of a reduction face reference block position indicated by a calculated reduction face motion vector 136 after block matching is carried out on a reduction face and position information of the SAD values to carry out reduction face motion vector detection of the pixel accuracy.

Figure 9:
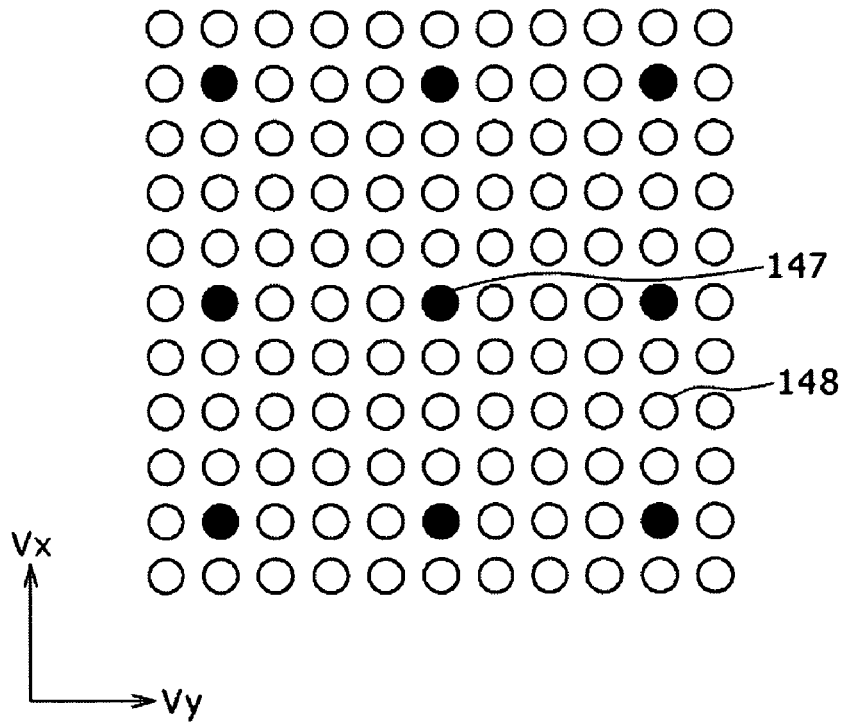

For example, if block matching is carried on a reduction face reduced to 1/4 in both of the vertical and horizontal directions as seen in FIG. 9, then a reduction face motion vector 136 has a four-pixel accuracy. However, it is apparent that, in the base face reference frame 134, the base face motion vector 104 of the one-pixel accuracy exists in the proximity of the base face motion vector 104' obtained by multiplying the reduction face motion vector 136 by n.

Figure 10:
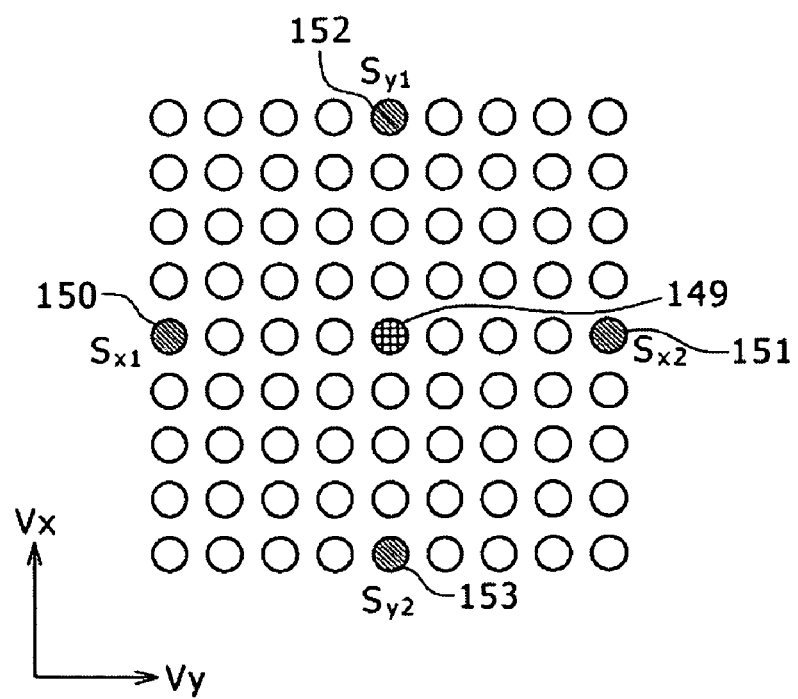

Accordingly, where a minimum SAD value 149 on a reduction face is determined as seen in FIG. 10, it seems possible to use a plurality of neighboring SAD values such as, for example, four SAD values 150, 151, 152 and 153 neighboring in the upward, downward, leftward and rightward directions to carry out an interpolation process to detect a motion vector of the pixel accuracy. In this instance, an interpolation magnification of four times is required.

For example, it seems a possible idea to use a quadratic curve to interpolate an SAD table to calculate a motion vector of the pixel accuracy from a reduction face SAD table obtained by carrying out a matching process in a unit of, for example, n pixels. In this example, although not quadratic curve approximation interpolation but linear interpolation or approximation curve interpolation of a higher order equal to or higher than the third order may be used. However, in the present example, quadratic curve approximation interpolation is used from the equilibrium between the accuracy and hardware configuration.

As seen in FIG. 10, in the present quadratic curve approximation interpolation, a minimum SAD value Smin (refer to reference numeral 149 of FIG. 10) of the SAD value of the reduction face SAD table indicated by the reduction face motion vector 136 of the n-pixel accuracy and a plurality of SAD values (hereinafter referred to as neighboring reduction face SAD values) at neighboring positions around the position of the minimum SAD value Smin, in the present example, four neighboring SAD values Sx1, Sx2 and Sy1, Sy2 (refer to reference numerals 150, 151, 152 and 153) in the neighborhood of the position of the minimum SAD value Smin in the X direction or horizontal direction and the Y direction or vertical direction, are used.

Figure 11:
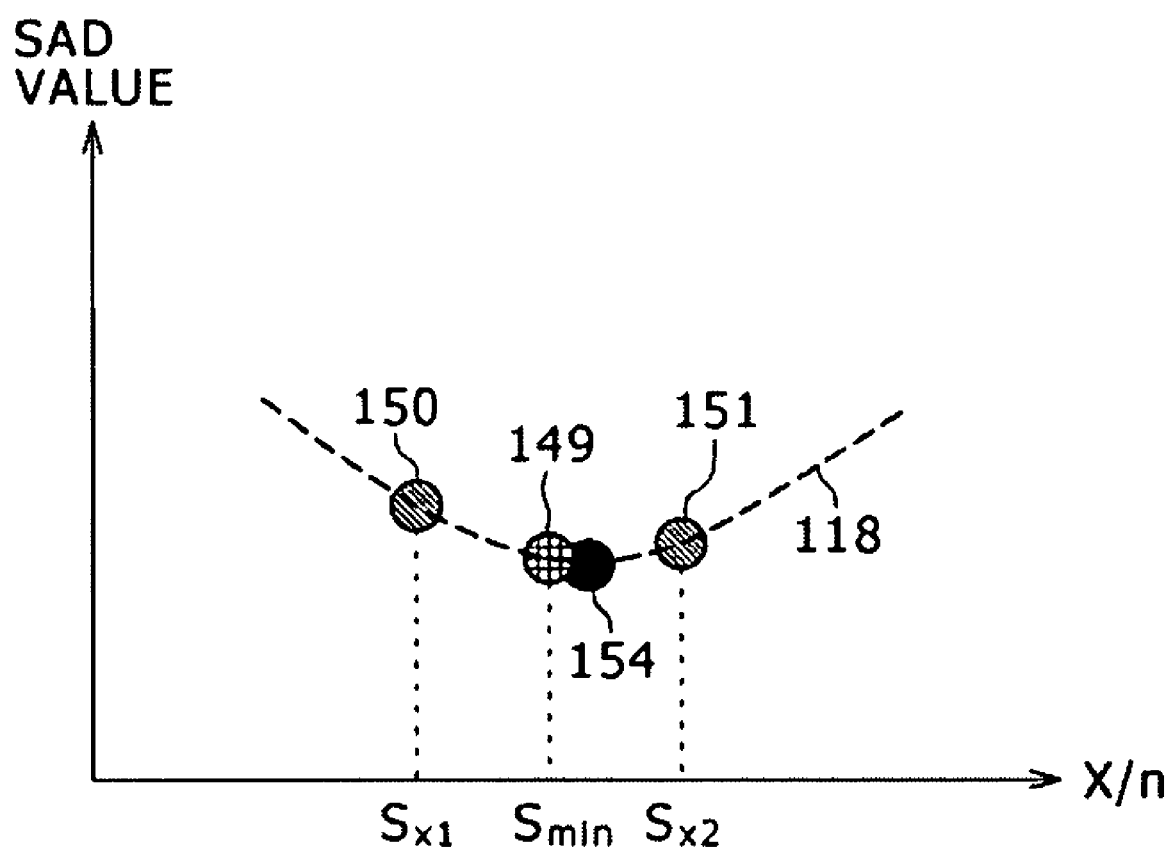

If the minimum SAD value Smin of the reduction face SAD value and the neighboring reduction face SAD values Sx1 and Sx2 at two neighboring points in the X direction or horizontal direction are used to apply a quadratic approximation curve 118 as seen in FIG. 11, then the X coordinate at which the quadratic approximation curve 118 assumes a minimum value becomes an X coordinate Vx of a reduction face motion vector, that is, a high-accuracy reduction face motion vector, at which the SAD value of a pixel accuracy assumes a minimum value SXmin. An expression of quadratic curve approximation interpolation in this instance is represented by the following expression (1):

$$SX\min = 1/2 \times (Sx2 - Sx1)/(Sx2 - 2S\min + Sx1) \quad (1)$$

The X coordinate which the minimum value SXmin of the SAD value of the pixel accuracy determined in accordance with the calculation expression (1) assumes on the SAD table is the X coordinate Vx which is a minimum value of the reduction face SAD value of the pixel accuracy.

The division of the calculation expression (1) can be implemented by subtraction carried out by a plural number of times. If the pixel accuracy to be determined is, for example, an accuracy of a pixel pitch of 1/4 that of a reduction face, then since it can be determined by two times of subtraction, the circuit ratio is low and the calculation time is short, and a performance which is little different from that by cubic curve interpolation which is considerably more complicated than that by quadratic approximate curve interpolation can be implemented.

Similarly, if the minimum SAD value Smin of the reduction face SAD value and the neighboring reduction face SAD values Sy1 and Sy2 of the two neighboring points in the Y direction or vertical direction are used to apply a quadratic approximate curve, then the Y coordinate at which the quadratic curve assumes the minimum value SYmin becomes an Y coordinate Vy, at which the SAD value of the pixel accuracy assumes the minimum value. An expression of quadratic curve approximation interpolation in this instance is represented by the following expression (2):

$$SY\min = 1/2 \times (Sy2 - Sy1)/(Sy2 - 2S\min + Sy1) \quad (2)$$

By carrying out approximation of a quadratic curve twice in the X direction and the Y direction in such a manner as described above, a high-accuracy reduction face motion vector (Vx, Vy) of the pixel accuracy is determined.

While, in the foregoing description, a minimum value of the reduction face SAD value and reduction face SAD values of two neighboring points of the minimum value point in each of the X or horizontal direction and the Y or vertical direction, the number of reduction face SAD values in each of the directions may otherwise be more than two. Further, a quadratic curve may not be applied to the X direction and the Y direction but an approximation curve may be applied in oblique directions. Further, an approximation curve may be applied to oblique directions in addition to the X and Y directions.

Figure 12:
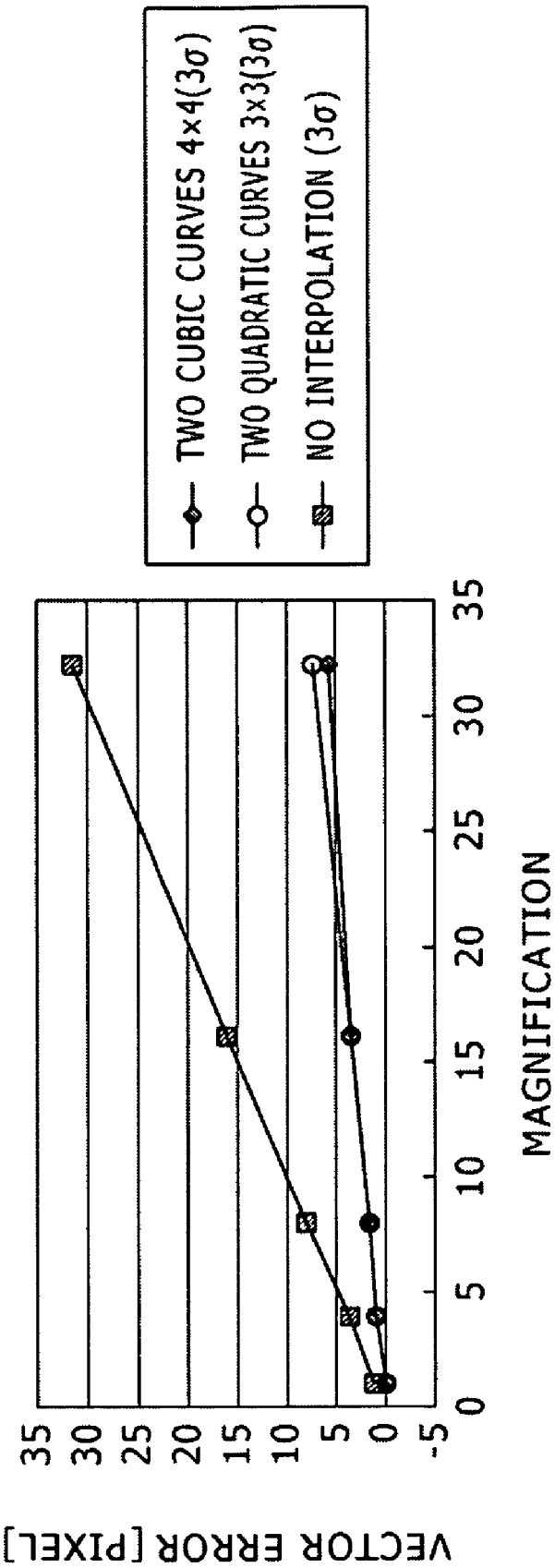

It is illustrated in FIG. 12 that, by employing such means and procedure as described above, a vector detection result of the pixel accuracy is obtained from values of the SAD table of an accuracy of a unit of n pixels in FIG. 12. The axis of abscissa of FIG. 12 indicates the interpolation magnification and represents which magnification should be applied to the resolution in a one-dimensional direction. Since the SAD table is a two-dimensional table, the table area decreases at a squared ratio, but since the error by interpolation increases linearly or substantially linearly, the practicality of the interpolation described above can be recognized.

The reduction face matching+interpolation processing mode is a processing mode suitable where it is tried to apply, for example, in a dynamic picture noise reduction process, the pixel accuracy as a motion detection accuracy while it is tried to achieve speeding up of processing or reduction of the bus band.

<Hierarchical Matching Processing Mode 1>

With the reduction face matching+interpolation processing mode, it is possible to apply the pixel accuracy as a motion detection accuracy while achieving speeding up of processing or reduction of the bus band. However, since the pixel accuracy is determined by an interpolation process, it relies more upon the interpolation magnification and the approximation curve used for the interpolation.

Therefore, as a processing mode wherein the motion detection accuracy is set to the pixel accuracy of a higher accuracy, a hierarchical matching processing mode 1 is provided in the present embodiment.

In this hierarchical matching processing mode 1, as shown in FIGS. 13A and 13B, a base face target image and a base face reference image are first reduced at a predetermined reduction ratio, and then the reduction face matching process described hereinabove is executed to carry out detection of a reduction face motion vector 136.

As seen in FIG. 14, a plurality of reduction face motion vectors 136 in a reduction face reference frame 135 are calculated by correlation evaluation by block matching between the reduction face target block 133 and a plurality of reduction face reference blocks 139 set in a reduction face matching processing range 143 which depends upon the reduction face search range 137.

As described hereinabove, since each reduction face motion vector 136 has a low accuracy equal to n times the one pixel accuracy because an image is reduced to $1/n \times 1/n$. Therefore, even if the calculated reduction face motion vectors 136 are multiplied by n, a base face motion vector 104 of the one-pixel accuracy cannot be obtained in the base face reference frame 134. However, it is apparent that, in the base face reference frame 134, the base face motion vector 104 of the one-pixel accuracy exists in the proximity of a motion vector obtained by increasing the reduction face motion vector 136 to n times.

Therefore, in the hierarchical matching processing mode 1, as seen in FIGS. 13C and 14, a base face search range 140 is set within a small range in which the base face motion vector 104 is estimated to exist around a position indicated by a motion vector (base face reference vector 141) obtained by increasing the reduction face motion vector 136 to n times, and a base face matching processing range 144 is set in response to the thus set base face search range 140.

Then, as seen in FIGS. 13C and 14, the base face reference vector 141 in the base face reference frame 134 is set as an indication element which indicates a position in the base face search range 140 while a base face reference block 142 is set to a position indicated by each of the base face reference vectors 141 to carry out block matching of the base face reference frame 134. Here, it is a matter of course that the accuracy of the base face motion vectors detected here is the pixel accuracy.

The base face search range 140 and the base face matching processing range 144 set in this manner may be very small ranges when compared with a search range 137' and a matching processing range 143' obtained by increasing the reduction face search range 137 and the reduction face matching processing range 143 to n times which is a number of times reciprocal to the reduction ratio.

Accordingly, if a block matching process is carried out only on the base face without carrying out hierarchical matching, then it is necessary to set, on the base face, a plurality of reference blocks in the search range 137' and the matching processing range 143' to carry out calculation for determining a correlation value with the target block. However, in the hierarchical matching process, matching may be carried out only within a very small range as seen in FIGS. 13C and 14.

Therefore, the number of base face reference blocks 142 set in the base face search range 140 and the base face matching processing range 144 which are such small ranges as described above is very small, and the number of times of execution of the matching process, that is, the number of times of correlation value calculation, and the SAD values to be retained can be reduced significantly. Consequently, an effect that the processing speed can be raised and the SAD table can be reduced in scale can be achieved.

This hierarchical matching processing mode 1 is a processing mode suitable, for example, where the motion detection accuracy is set to the pixel accuracy even if increase of the speed of processing or reduction of the bus band is sacrificed to some degree in the dynamic picture noise reduction process.

<Hierarchical Matching Processing Mode 2>

In the hierarchical matching processing mode 1 described above, the search range in the base face matching process, that is, the base face search range, is determined based on reduction face motion vectors 136 of the accuracy of n pixels reciprocal to the reduction ratio 1/n. However, since the accuracy of the reduction face reference vectors 142 is lower than the pixel accuracy, even if the base face motion vectors can be detected in the pixel accuracy, there is the following problem.

Figure 15A:
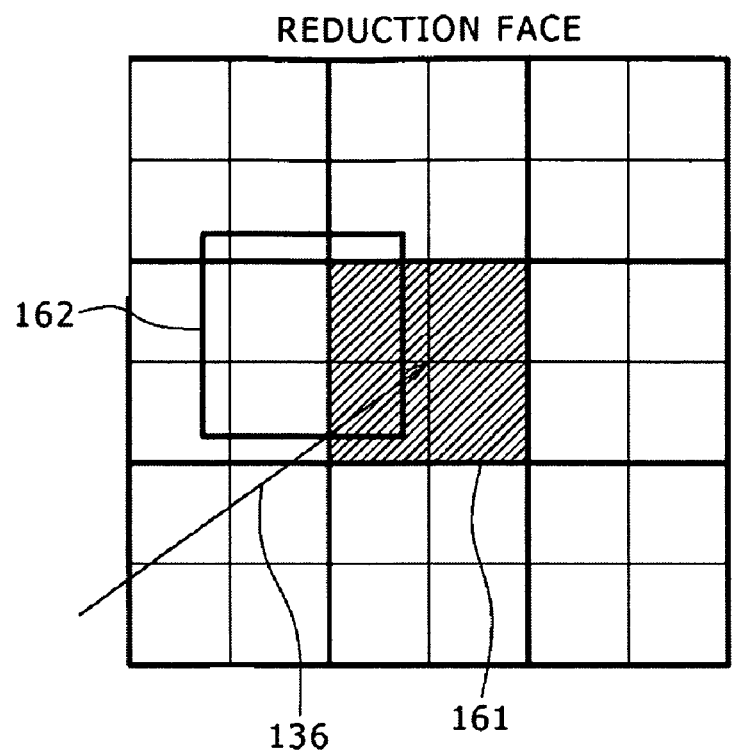
Figure 15B:
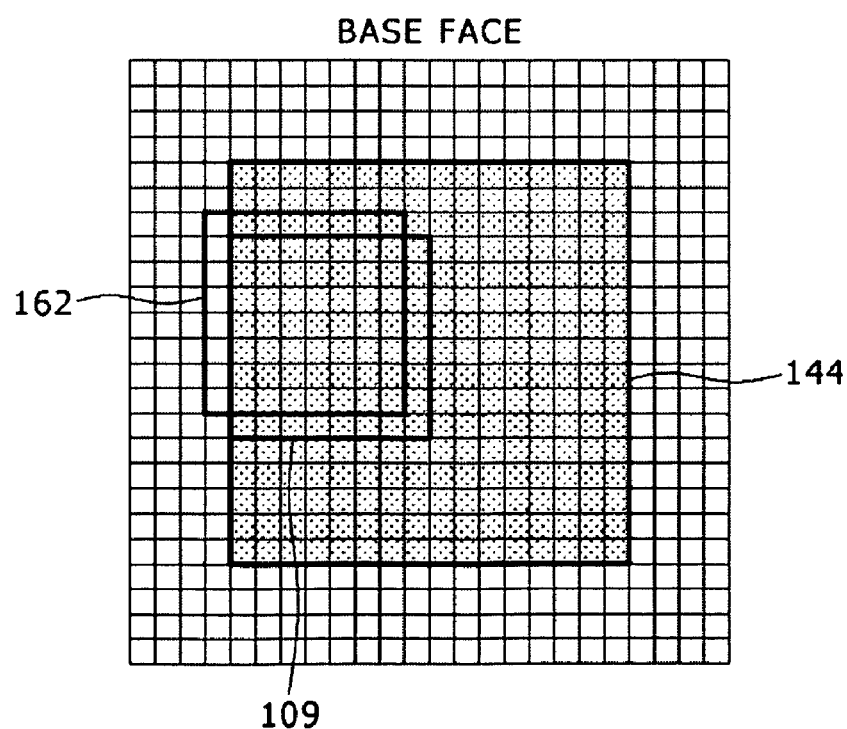

In particular, for example, if the reduction ratio is 1/4, the base face search range is determined based on the reduction face motion vectors 136 of the four-pixel accuracy detected in the reduction face matching processing mode. Accordingly, the center coordinate of the base face search range can be determined only for every four pixels. This is illustrated in FIGS. 15A and 15B. In FIGS. 15A and 15B, the size of a target block is 8 pixels×8 lines, and the reduction ratio is 1/4.

A reduction face motion compensation block 161, that is, a reduction face reference block 139, determined based on a reduction face motion vector 136 may be such as indicated by slanting lines in FIG. 15A. In particular, since a reduction face motion compensation block 161 is determined around the center at a position indicated by the reduction face motion vector 136, the base face search range is set so as to include the reduction face motion compensation block 161 at the center thereof. Here, one cell in FIG. 15A represents one cell on the reduction face and has a size equal to four times that of one pixel on the base face of FIG. 15B.

If the base face matching processing range determined from the base face search range is set greater by four pixels on the base face than the range of the reduction face motion compensation block 161, the base face matching processing range 144 in the search range base face matching process can be determined as such a range as indicated by a thick line frame work blotted out as seen from FIG. 15B.

However, in such a case that a portion 162 in which an actual base face motion vector is detected with a high degree of possibility is positioned intermediately of a reduction face reference block 139, that is, a reduction face motion compensation block 161, on a reduction face as seen in FIG. 15A, the portion 162 in which the base face motion vector is detected with a high degree of possibility is displaced to a position rather near to an end of the set base face matching processing range 144 as seen in FIG. 15B but is not positioned within a search range.

If this situation occurs, then the base face motion vector corresponds to a reference block which has the highest correlation in the set base face matching processing range 144, resulting in a problem that a base face motion vector having a high accuracy cannot be calculated.

The hierarchical matching processing mode 2 is a processing mode which is improved in regard to the problem described above and determines a base face search range in a base face matching process using a high-accuracy reduction face motion vector 136' of the pixel accuracy determined in the reduction face matching+interpolation processing mode.

Figure 16A:
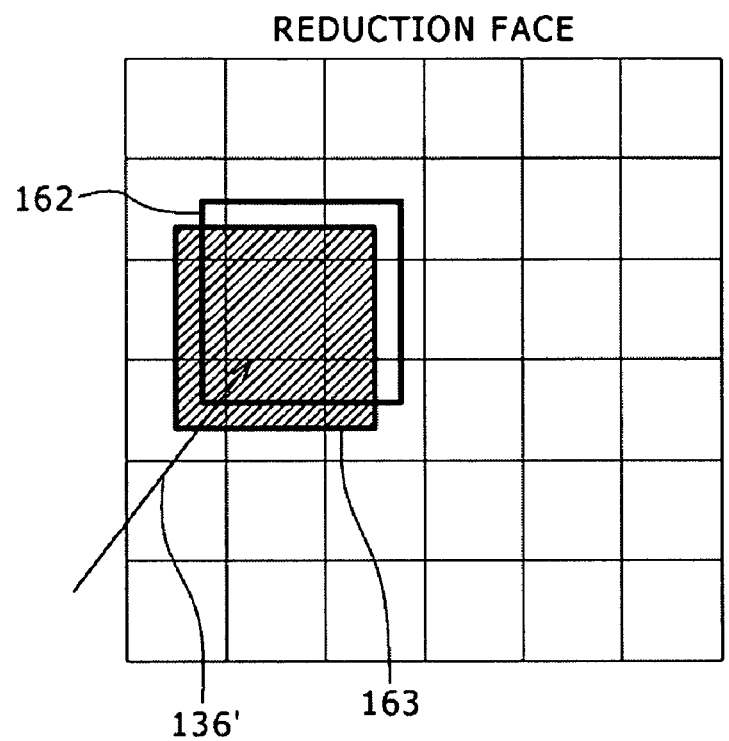

In this instance, since the center coordinate of a base face search range can be determined for every one pixel, if the portion 162 at which a base face motion vector is determined in a high degree of possibility is such a position as seen in FIG. 16A, such a high-accuracy reduction face motion vector 136' as seen in FIG. 16A is obtained. Thus, the position of a reduction face motion compensation block 161 is displaced by a one-pixel distance on the base face from the portion 162 at which a base face motion vector is detected in high possibility.

Figure 16B:
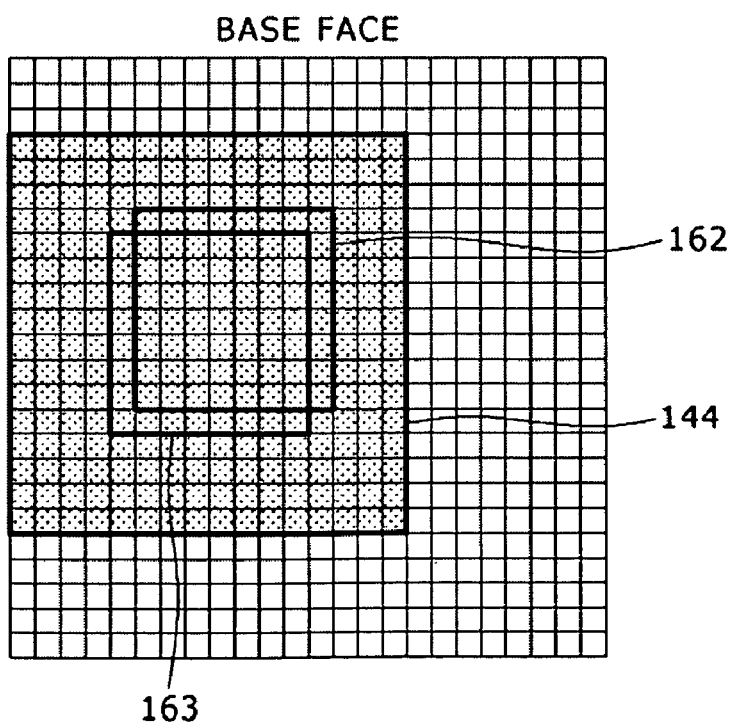

Then, in the present processing mode, the base face matching processing range 144 determined from the high-accuracy reduction face motion vector 136' becomes such a range as indicated by blotting out in FIG. 16B, and such a situation that the portion 162 at which a base face motion vector is detected in high possibility deviates from the base face matching processing range 144 is eliminated.

This hierarchical matching processing mode 2 is a processing mode suitable where the motion detection accuracy is set to the pixel accuracy even if the speeding up of processing or reduction of the bus band is sacrificed to some degree, for example, in a dynamic picture noise reduction process and it is intended to carry out motion detection with a higher degree of accuracy than in the hierarchical matching processing mode 1.

<Hierarchical Matching+Interpolation Processing Modes 1 and 2>

As described above, according to the hierarchical matching processing mode 1 or the hierarchical matching processing mode 2, detection of a base face motion vector of the pixel accuracy can be carried out. However, as described hereinabove, in a still picture noise reduction process, it is demanded to carry out motion detection of the sub-pixel accuracy higher than the pixel accuracy.

Therefore, in the present embodiment, the hierarchical matching+interpolation processing mode is used as a processing mode of the sub pixel accuracy. Here, since the hierarchical matching processing mode 1 and the hierarchical matching processing mode 2 are proposed for hierarchical matching in the present embodiment, also with regard to the hierarchical matching+interpolation processing mode, a hierarchical matching+interpolation processing mode 1 and another hierarchical matching+interpolation processing mode 2 are prepared.

In the hierarchical matching+interpolation processing mode 1, if a base face motion vector 104 of the pixel accuracy is successfully detected in the hierarchical matching processing mode 1, then a quadratic curve approximation interpolation process is carried out also in this instance using the SAD value of a reference block indicated by the base face motion vector 104, that is, using a base face minimum SAD value and neighboring SAD values to calculate a high-accuracy motion vector of the sub pixel accuracy.

A high accuracy motion vector of the sub pixel accuracy is described. Since, in the block matching method described hereinabove, block matching is carried out in a unit of a pixel, a motion vector is calculated only in the pixel accuracy. As described hereinabove with reference to FIG. 56, the point at which a matching process is carried out, that is, the position of a reference block, exists in the pixel accuracy, and in order to calculate a motion vector of a higher accuracy, a matching process in a unit of a sub pixel is required.

If a matching process is carried out in a unit of N pixels in order to calculate a motion vector of the pixel accuracy higher by N times (pixel pitch of 1/N), then the size of the SAD table becomes approximately $N^2$*times, and a memory of a great capacity is required. Further, in order to carry out a block matching process, an upper-sampled image increased to N times must be produced, and therefore, the ratio of the hardware increases tremendously.

Therefore, it is tried to interpolate an SAD table using a quadratic curve such that a motion vector of the sub pixel accuracy is calculated from the SAD table for which a matching process is carried out in a unit of a pixel. Also in this instance, although not quadratic curve approximation interpolation but linear interpolation or third or higher order approximation curve interpolation may be used, in the present example, quadratic curve approximation interpolation is used from the equilibrium between the accuracy and the hardware implementation.

Figure 17:
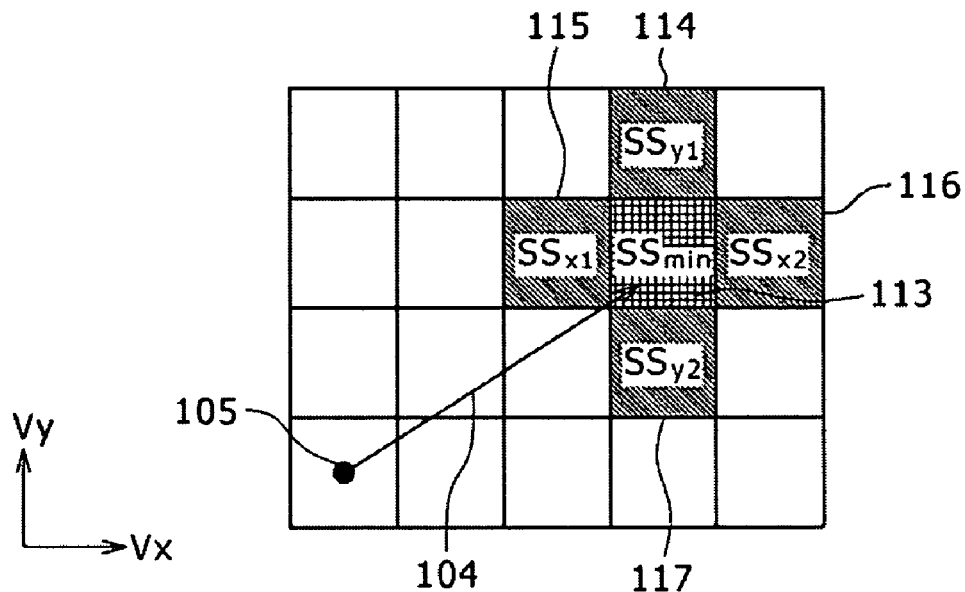
FIGS. 17 and 18 are diagrammatic views illustrating operation of a motion detection and motion compensation unit of the image pickup apparatus of FIG. 1.

In the quadratic curve approximation interpolation in the present example, as seen in FIG. 17, a minimum SAD value SSmin (base face minimum SAD value; refer to reference numeral 113 in FIG. 17) of the SAD value of the base face SAD table indicated by a base face motion vector 104 of the pixel accuracy and a plurality of SAD values (hereinafter referred to as base face neighboring SAD values) at neighboring positions with the position of the base face minimum SAD value SSmin, in the present example, four base face neighboring SAD values SSx1, SSx2 and SSy1, SSy2 (refer to reference numerals 114, 115, 116 and 117) neighboring in the X or horizontal direction and the Y or vertical direction with the position of the base face minimum SAD value SSmin, are used.

Figure 18:
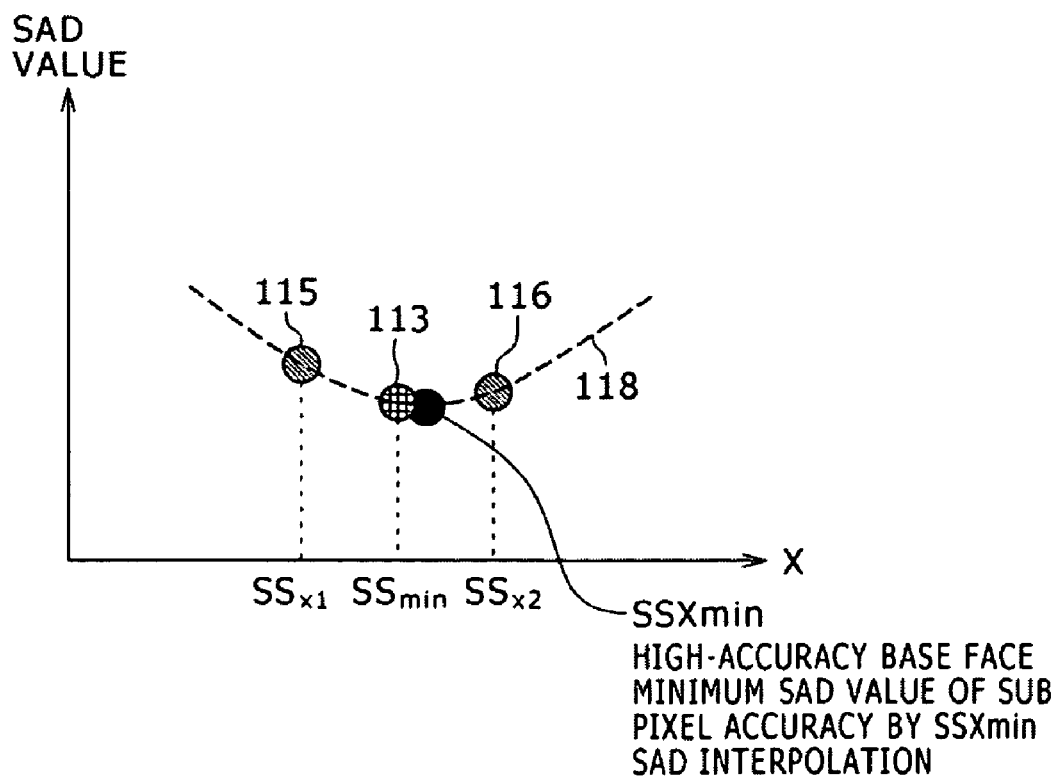

As shown in FIG. 18, if the base face minimum SAD value SSmin and the base face neighboring SAD values SSx1 and SSx2 of the two neighboring points in the X direction are used to apply a quadratic approximation curve 118, then the X coordinate at which the quadratic approximation curve 118 assumes a minimum value is the X coordinate Vx of a motion vector, that is, a high accuracy motion vector with which the minimum value SSXmin of the SAD value of the sub pixel accuracy. The expression for the quadratic curve approximation interpolation in this instance is similar to the calculation expression (1) given hereinabove and is represented by the following expression (3):

$$SSX\text{min}=1/2\times(SSx2-SSx1)/(SSx2-2SS\text{min}+SSx1) \quad (3)$$

The X coordinate which the minimum value SSXmin of the SAD value of the sub pixel accuracy determined in accordance with the calculation expression (3) assumes on the SAD table is the X coordinate Vx at which the minimum value of the SAD value of the sub pixel accuracy is provided.

The division of the calculation expression (3) can be implemented by subtraction carried out by a plural number of times. If the pixel accuracy to be determined is, for example, an accuracy of a pixel pitch of 1/4 the original pixel pitch, then since it can be determined only by two times of subtraction, the circuit ratio is small and the calculation time is short, and a performance which is little different from that by cubic curve interpolation which is considerably more complicated than that by quadratic approximate curve interpolation can be implemented.

Similarly, if the base face minimum SAD value SSmin and the base face neighboring SAD values SSy1 and SSy2 of the two neighboring points in the Y direction or vertical direction are used to apply a quadratic approximate curve, then the Y coordinate at which the quadratic curve assumes the minimum value SSYmin becomes an Y coordinate Vy, at which the SAD value of the sub pixel accuracy assumes the minimum value. An expression of quadratic curve approximation interpolation in this instance is similar to the calculation expression (2) given hereinabove and represented by the following expression (4):

$$SSY\text{min}=1/2\times(SSy2-SSy1)/(SSy2-2SS\text{min}+SSy1) \quad (4)$$

By carrying out approximation of a quadratic curve twice in the X direction and the Y direction in such a manner as described above, a high-accuracy motion vector (Vx, Vy) of the sub pixel accuracy is determined.

While, in the foregoing description, the base face minimum SAD value and base face neighboring SAD values of four neighboring points of the minimum value point in the X or horizontal direction and the Y or vertical direction are used, the number of neighboring SAD values in each of the directions may otherwise be more than two. Further, a quadratic curve may not be applied to the X direction and the Y direction but an approximation curve may be applied in oblique directions. Further, an approximation curve may be applied to oblique directions in addition to the X and Y directions.

By employing such means and procedure as described above, a vector detection result of the sub pixel accuracy is obtained from values of the SAD table of the accuracy of a unit of a pixel can be obtained apparently from the description given hereinabove with reference to FIG. 12.

In the present embodiment, the plural block matching methods described hereinabove are executed by software processing using hardware which includes the motion detection and motion compensation unit 16, image superposition unit 17 and image memory unit 4 which is connected to the motion detection and motion compensation unit 16 and the image superposition unit 17 through the system bus 2. Now, an example of a hardware configuration of the motion detection and motion compensation unit 16 and the image superposition unit 17 is described.

<Example of a Hardware Configuration of the Motion Detection and Motion Compensation Unit 16>

Figure 19:
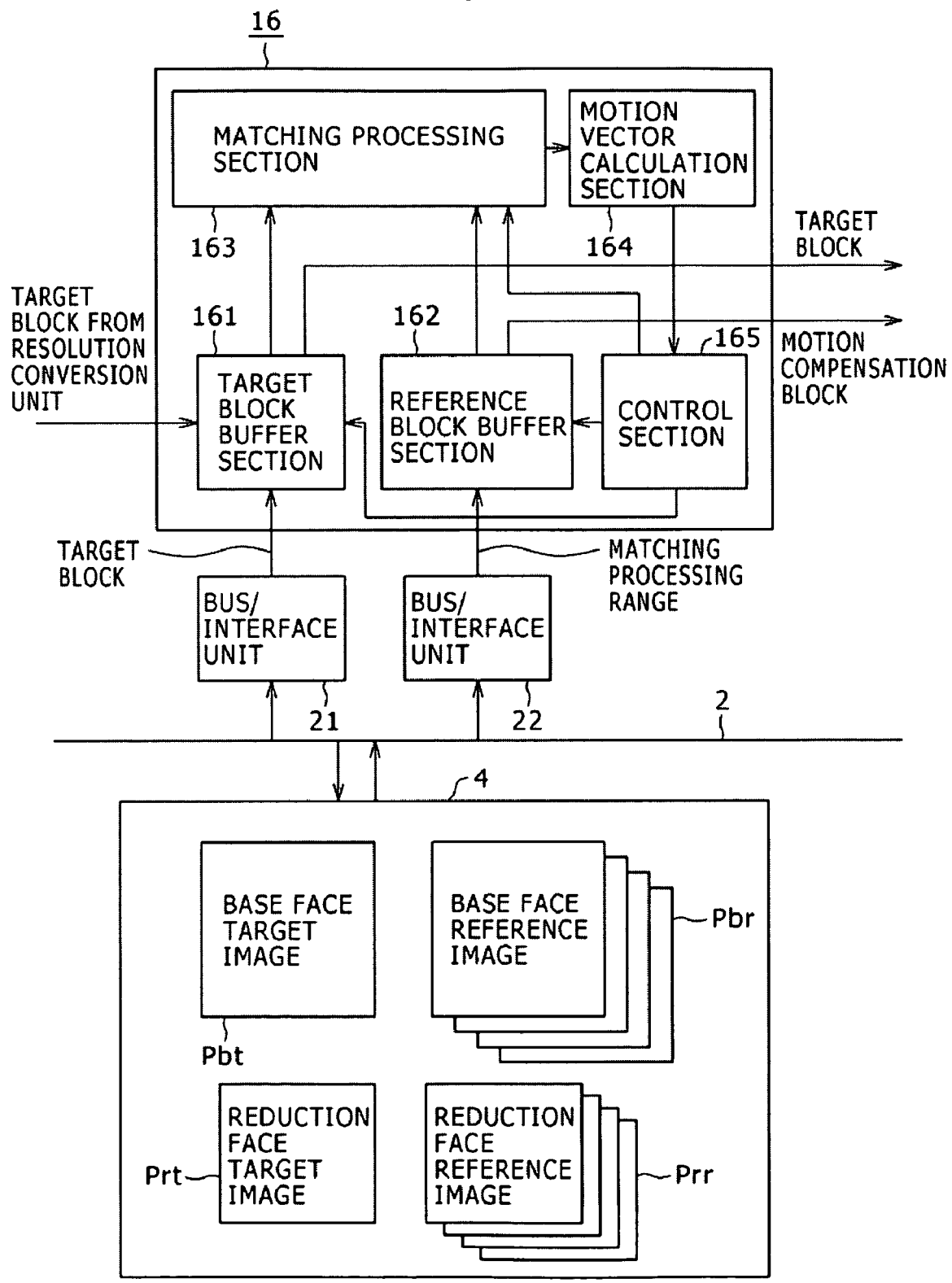
FIG. 19 is a block diagram showing an example of a configuration of the motion detection and motion compensation unit shown in FIG. 1.

FIG. 19 shows an example of a hardware configuration of the motion detection and motion compensation unit 16. Referring to FIG. 19, the motion detection and motion compensation unit 16 shown includes a target block buffer section 161 for retaining pixel data of a target block 102, a reference block buffer section 162 for retaining pixel data of a reference block 108, and a matching processing section 163 for calculating the SAD value of corresponding pixels of the target block 102 and the reference block 108. The motion detection and motion compensation unit 16 further includes a motion vector calculation section 164 for calculating a motion vector from SAD value information outputted from the matching processing section 163, and a control section 165 for controlling the component blocks of the motion detection and motion compensation unit 16.

The motion detection and motion compensation unit 16 and the image memory unit 4 are connected to each other by the system bus 2. In particular, in the present example, an bus interface unit 21 and another bus interface unit 22 are connected between the system bus 2 and the target block buffer section 161 and reference block buffer section 162, respectively. Here, the system bus 2 uses the AXI (Advanced eXtensible Interface) Interconnect as a protocol thereof.

Upon still picture image pickup, a reduction face target block or a base face target block from an image frame of a reduction face target image Prt or a base face target image Pbt stored in the image memory unit 4 is written into the target block buffer section 161. Where the reduction face target image Prt or the base face target image Pbt is a first one, an image of a first picked up image frame after depression of the shutter button is written as the target frame 102 into the target block buffer section 161. After image superposition is carried out based on block matching with a reference image, a reduced noise image after the superposition of the image is written into the image memory unit 4, and the target block 102 of the target block buffer section 161 is rewritten into the reduced noise image.

Image data within a reduction face matching processing range or a base face matching processing range from an image frame of a reduction face reference image Prr or a base face reference image Pbr stored in the image memory unit 4 are read out from the image memory unit 4 and written into the reference block buffer section 162. As the reduction face reference image Prr or the base face reference image Pbr, an image frame after the first image frame described above is written as a reference frame 101 into the image memory unit 4.

In this instance, if an image superposition process is carried out while a plurality of picked up images picked up successively are fetched (such superposition is hereinafter referred to as addition during image pickup), as the base face reference image and the reduction face reference image, then picked up image frames after the first picked up image frame are successively fetched one by one into the image memory unit 4. Accordingly, the image memory unit 4 may normally retain only one base face reference image and one reduction face reference image.

However, where, after a plurality of picked up images picked up successively are fetched into the image memory unit 4, the motion detection and motion compensation unit 16 and the image superposition unit 17 carry out motion vector detection and execute image superposition (such superposition is hereinafter referred to as addition after image pickup), it is necessary to store and retain, as the base face reference image and the reduction face reference image, all of a plurality of picked up image frames following the first picked up image frame into and in the image memory unit 4.

Although the image pickup apparatus can use any of the addition during image pickup and the addition after image pickup, in the present embodiment, the process of the addition after image pickup is adopted taking it into consideration that a clear image in which noise is reduced is demanded although somewhat long processing time is required. Operation of the still picture noise reduction process in the present embodiment is hereinafter described in detail.

On the other hand, in the dynamic picture image pickup mode, a picked up image frame from the image correction and resolution conversion unit 15 is inputted as a target block 102 into the motion detection and motion compensation unit 16. Into the target block buffer section 161, a target block extracted from a target frame is written from the image correction and resolution conversion unit 15. Meanwhile, a picked up image frame stored in the image memory unit 4 and immediately preceding to the target frame is determined as a reference frame 101, and a base face matching processing range or a reduction face matching processing range from the reference frame 101 which is a base face reference image Pbr or a reduction face reference image Prr is written into the reference block buffer section 162.

In the dynamic picture image pickup mode, only it is necessary to retain a picked up image frame immediately preceding to the current picked up image frame, with which block matching of the target frame from the image correction and resolution conversion unit 15 should be carried out, as a base face reference image Pbr and a reduction face reference image Prr, and image information to be retained in the image memory unit 4 may be only for one image or one frame. Therefore, in the present example, the base face reference image Pbr and the reduction face reference image Prr are not in the form of compressed image data.

The matching processing section 163 carries out the reduction face matching process and the base face matching process for a target block stored in the target block buffer section 161 and a reference block stored in the reference block buffer section 162.

Here, where image data of a reduction face target block are stored in the target block buffer section 161 and image data within a reduction face matching processing range extracted from a reduction face reference screen are stored in the reference block buffer section 162, the matching processing section 163 executes the reduction face matching process. On the other hand, where image data of a base face target block are stored in the target block buffer section 161 and image data within a base face matching processing range extracted from a base face reference screen are stored in the reference block buffer section 162, the matching processing section 163 executes the base face matching process.

In order for the matching processing section 163 to detect the strength of the correlation between a target block and a reference block in block matching, in the present embodiment, luminance information of image data is used to carry out SAD value calculation to detect a minimum SAD value, and a reference block which exhibits the minimum SAD value is detected as the highest correlation reference block.

It is to be noted that the calculation of the SAD value may naturally be carried out not using luminance information but using color difference signals or information of three primary color signals red (R), green (G) and blue (B). Further, in the calculation of the SAD value, although normally all pixels in a block are used, for reduction of the calculation amount, only the pixel values of limited pixels at intermittent positions may be used by sampling out or the like.

The motion vector calculation section 164 detects a motion vector of a reference block with respect to a target block from a result of a matching process of the matching processing section 163. In the present embodiment, when a reduction face matching process is carried out by the matching processing section 163, a reduction face motion vector is detected by the motion vector calculation section 164, but when a base face matching process is carried out by the matching processing section 163, a base face motion vector is detected by the motion vector calculation section 164.

Further, in the present embodiment, the motion vector calculation section 164 has the following functions. In particular, the motion vector calculation section 164 retains a minimum value of the SAD value and further retains a plurality of SAD values of reference vectors in the proximity of the reference vector which indicates the minimum SAD value to carry out such a quadratic curve approximation interpolation process. Then, in the reduction face matching process, the motion vector calculation section 164 detects a high-accuracy reduction face motion vector of the pixel accuracy, and in the base face matching process, the motion vector calculation section 164 detects a high-accuracy base face motion vector of the sub pixel accuracy.

The control section 165 controls the motion detection and motion compensation unit 16 under the control of the CPU 1 to determine which one of the plural block matching processing modes should be executed. Then, the control section 165 controls the processing operation of the determined block matching processing mode.

<Example of a Configuration of the Target Block Buffer Section 161>

Figure 20:
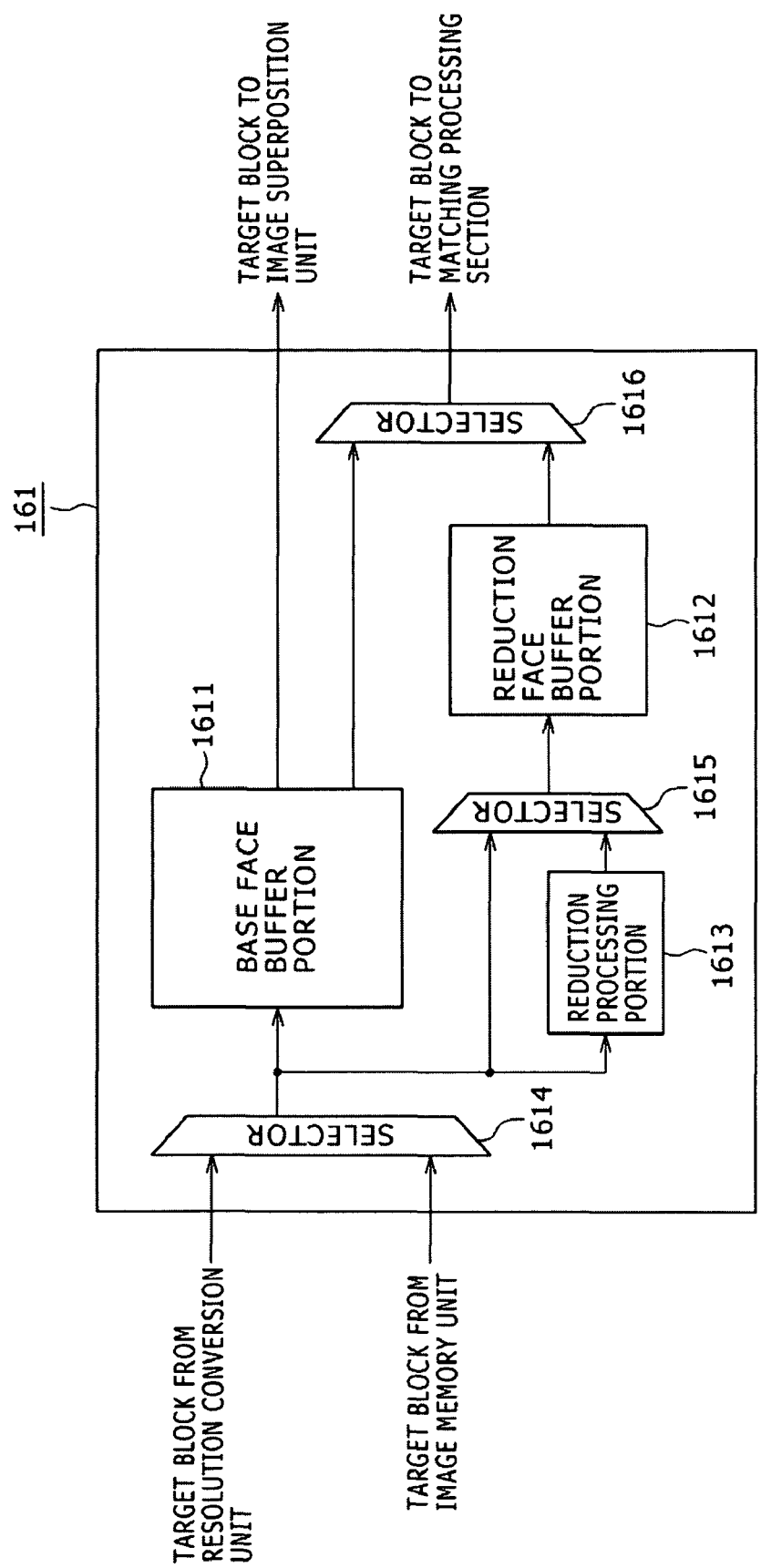
FIGS. 20 and 21 are block diagrams showing an example of a detailed configuration of different portions of the motion detection and motion compensation unit of FIG. 19.

An example of a configuration of the target block buffer section 161 is shown in FIG. 20. Referring to FIG. 20, the target block buffer section 161 shown includes a base face buffer portion 1611, a reduction face buffer portion 1612, a reduction processing portion 1613, and selectors 1614, 1615 and 1616. Though not shown in FIG. 20, the selectors 1614, 1615 and 1616 are selectively controlled by a selection control signal from the control section 165.

The base face buffer portion 1611 is used to temporarily store a base face target block. The base face buffer portion 1611 supplies a base face target block not only to the image superposition unit 17 but also to the selector 1616.

The reduction face buffer portion 1612 is used to temporarily store a reduction face target block. The reduction face buffer portion 1612 supplies a reduction face target block to the selector 1616.

The reduction processing portion 1613 is provided to produce a reduction face target block from a target block sent thereto from the image correction and resolution conversion unit 15 in the dynamic picture image pickup mode as described hereinabove. The reduction face target block from the reduction processing portion 1613 is supplied to the selector 1615.

The selector 1614 selects, in the dynamic picture image pickup mode, a target block from the image correction and resolution conversion unit 15, that is, a base face target block, but selects, in the still picture image pickup mode, a base face target block or a reduction face target block from the image memory unit 4 in accordance with a selection control signal from the control section 165. Then, the selector 1614 outputs and supplies the selected block to the base face buffer portion 1611, reduction processing portion 1613 and selector 1615.

The selector 1615 selects, in the dynamic picture image pickup mode, a reduction face target block from the image correction and resolution conversion unit 15, but selects, in the still picture image pickup mode, a reduction face target block from the image memory unit 4 in accordance with a selection control signal from the control section 165. Then, the selector 1615 outputs and supplies the selected block to the reduction face buffer portion 1612.

The selector 1616 selects, in the block matching on the reduction face, a reduction face target block from the reduction face buffer portion 1612, but selects, in the block matching on the base face, a base face target block from the base face buffer portion 1611 in accordance with a selection control signal from the control section 165. Then, the selector 1616 outputs and sends the selected reduction face target block or base face target block to the matching processing section 163.

<Example of a Configuration of the Reference Block Buffer Section 162>

Figure 21:
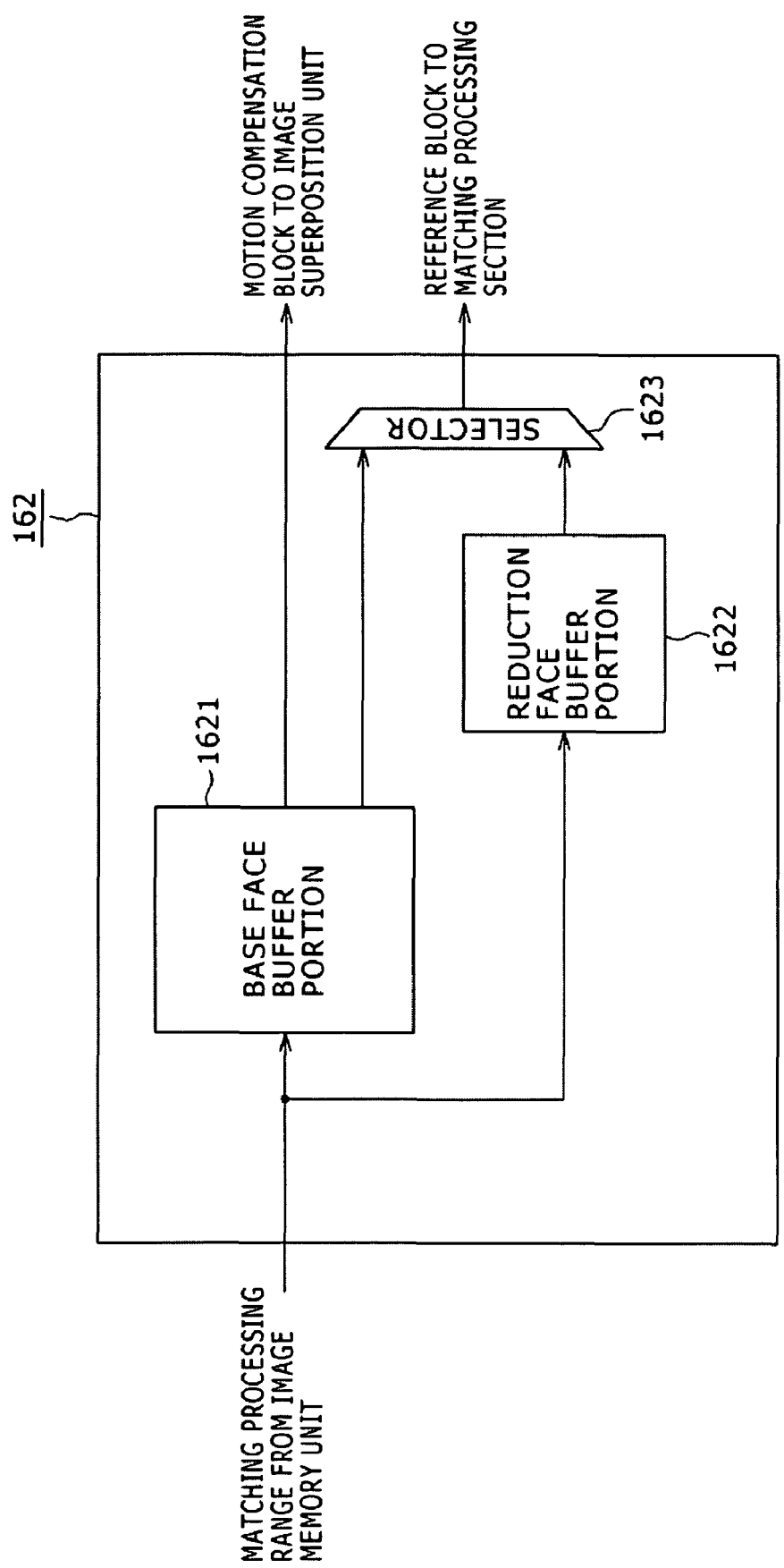

FIG. 21 shows an example of a configuration of the reference block buffer section 162. Referring to FIG. 21, the reference block buffer section 162 includes a base face buffer portion 1621, a reduction face buffer portion 1622, and a selector 1623. Though not shown in FIG. 21, the selector 1623 is selectively controlled by a selection control signal from the control section 165.

The base face buffer portion 1621 temporarily stores a base face reference block from the image memory unit 4 and supplies the base face reference block to the selector 1623. The base face buffer portion 1621 further sends the base face reference block as a motion compensation block to the image superposition unit 17.

The reduction face buffer portion 1622 is used to temporarily store a reduction face reference block from the image memory unit 4. The reduction face buffer portion 1622 supplies the reduction face reference block to the selector 1623.

The selector 1623 selectively outputs, upon block matching on the reduction face, a reduction face reference block from the reduction face buffer portion 1622 but, upon block matching on the base face, a base face reference block from the base face buffer portion 1621, in accordance with a selection control signal from the control section 165. The selectively outputted reduction face reference block or base face reference block is sent to the matching processing section 163.

<Example of Configuration of the Image Superposition Unit 17>

Figure 22:
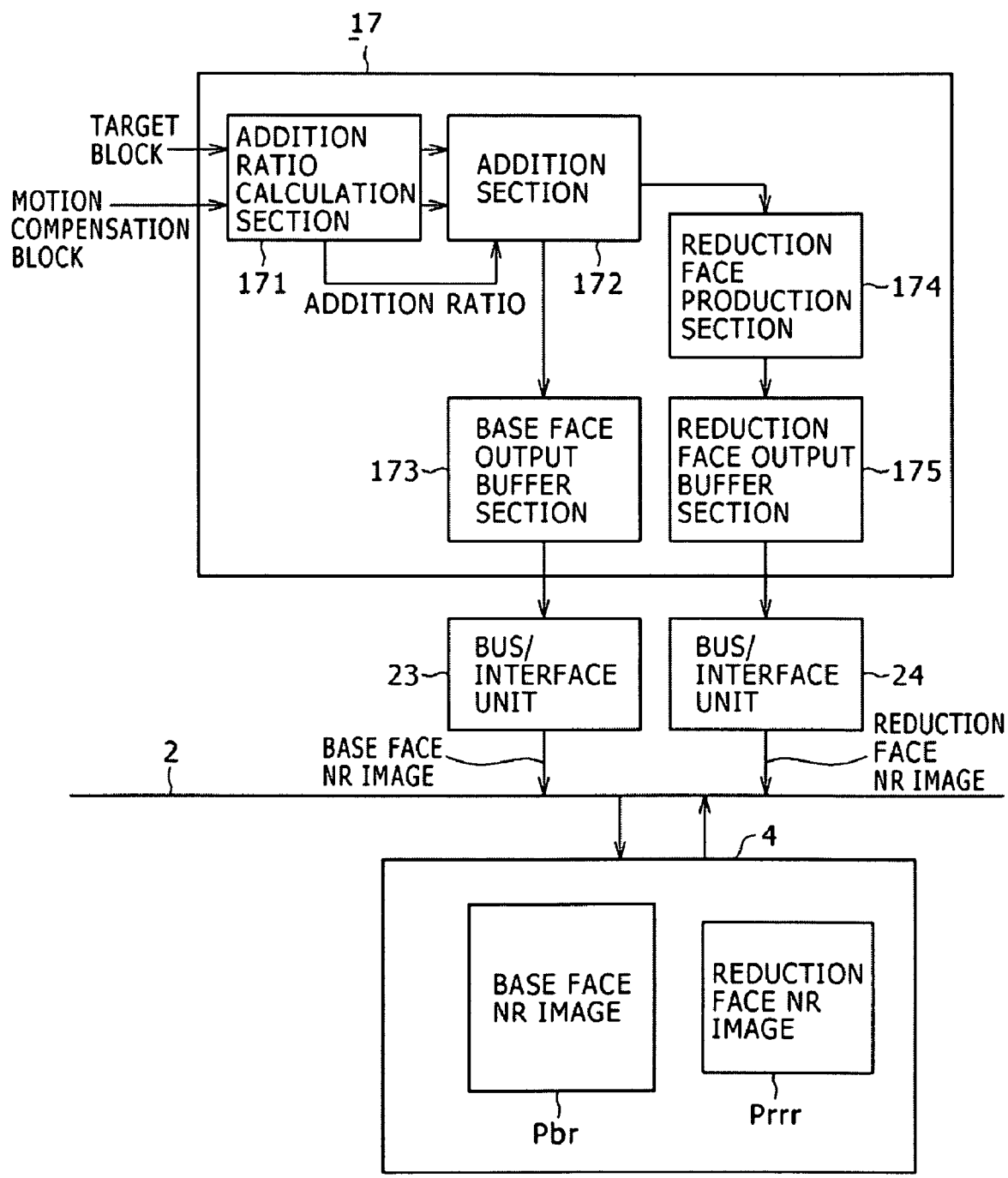
FIG. 22 is a block diagram showing an example of a configuration of an image superposition unit of the image pickup apparatus of FIG. 1.

An example of a configuration of the image superposition unit 17 is shown in FIG. 22. Referring to FIG. 22, the image superposition unit 17 shown includes an addition ratio calculation section 171, an addition section 172, a base face output buffer section 173, a reduction face production section 174, and a reduction face output buffer section 175.

The image superposition unit 17 and the image memory unit 4 are connected to each other by the system bus 2. In particular, in the example shown in FIG. 22, a bus interface unit 23 and another bus interface unit 24 are connected between the system bus 2 and the base face output buffer section 173 and reference block buffer section 162, respectively.

The addition ratio calculation section 171 receives a target block and a motion compensation block from the motion detection and motion compensation unit 16 to determine the addition ratio of the two blocks in response to whether the addition method to be adopted is a simple addition method or an average addition method. Then, the addition ratio calculation section 171 supplies the determined addition ratio to the addition section 172 together with the target block and the motion compensation block.

When a plurality of images are superposed, if the images are superposed at a luminance ratio of 1:1, then the dynamic range is doubled. Accordingly, when it is intended to superpose images of a low illuminance in order to apply both the noise reduction and supersensitizing, it is desired to adopt a method wherein they are added at a luminance ratio of 1:1. This is the simple addition method.

On the other hand, where a noise reduction process is applied to images picked up in a condition that the illuminance can be assured, it is desirable to adopt another method wherein the images are added such that the total luminance becomes 1 without increasing the dynamic range. This is the average addition method.

A base face reduced noise image of a result of addition by the addition section 172 is written into the image memory unit 4 through the base face output buffer section 173 and the bus interface unit 23. Further, the base face reduced noise image of the result of addition by the addition section 172 is converted into a reduction face reduced noise image by the reduction face production section 174. Thus, the reduction face reduced noise image from the reduction face production section 174 is written into the image memory unit 4 through the reduction face output buffer section 175 and the bus interface unit 24.

[Examples of a Hardware Configuration of the Motion Vector Calculation Section 164]

Now, several examples of a hardware configuration of the motion vector calculation section 164 and operation of them are described. Further, a first example which uses an SAD table similarly as in the related art is described as an example of a hardware configuration of the motion vector calculation section 164 in the embodiment.

<First Example>

Figure 23:
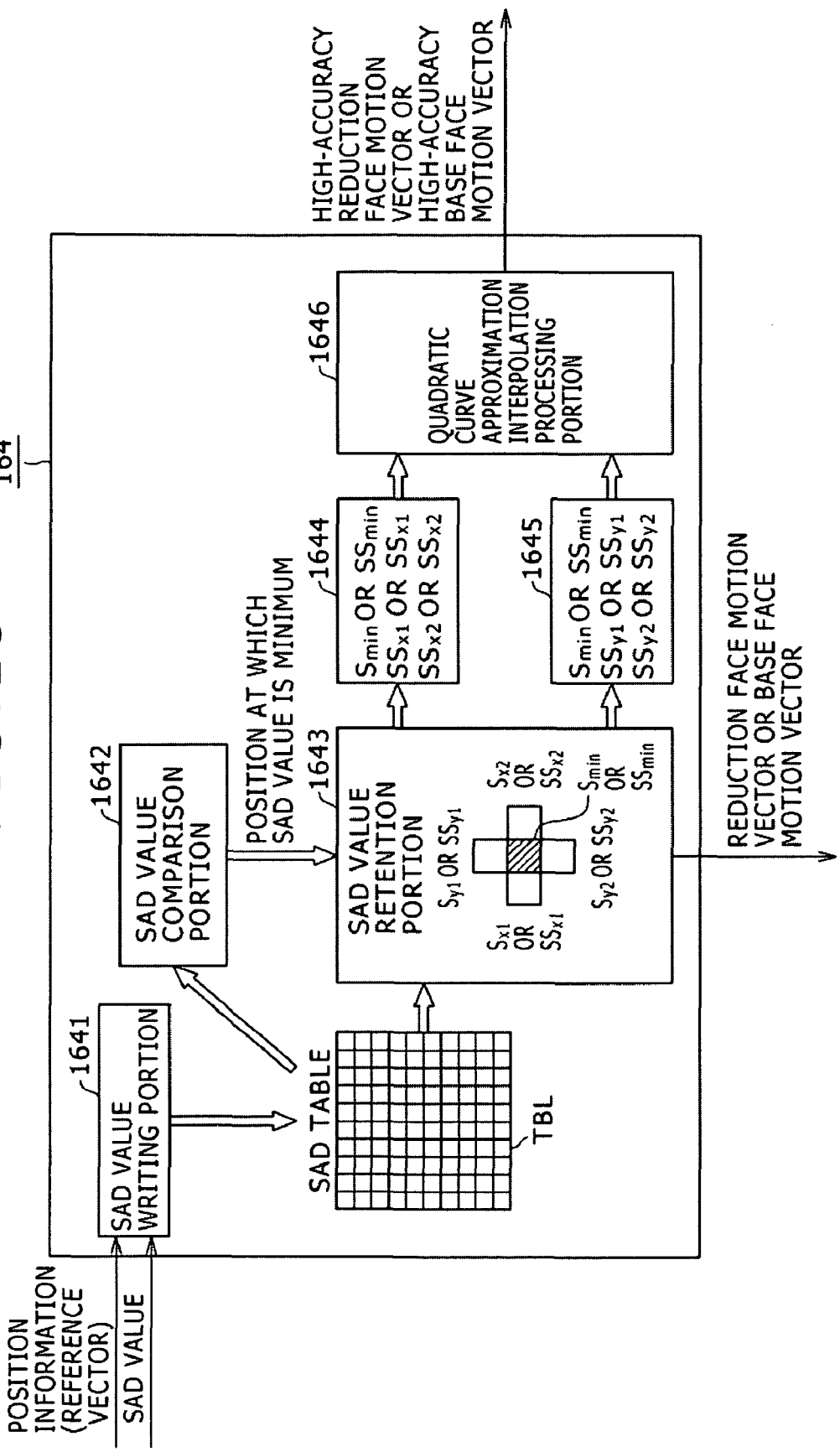
FIG. 23 is a block diagram showing a first example of a motion vector calculation section of the motion detection and motion compensation unit shown in FIG. 1.

FIG. 23 shows a first example of a configuration of the motion vector calculation section 164. Referring to FIG. 23, the motion vector calculation section 164 of the first example includes an SAD value writing portion 1641, an SAD table TBL, an SAD value comparison portion 1642, and an SAD value retention portion 1643. The motion vector calculation section 164 further includes an X direction (horizontal direction) neighboring value extraction portion 1644, a Y direction (vertical direction) neighboring value extraction portion 1645, and a quadratic curve approximation interpolation processing portion 1646.

In the motion vector calculation section 164 of the present first example, the SAD value writing portion 1641 receives and stores position information of a reduction face reference block or a base face reference block, that is, a reduction face reference vector or a base face reference vector, and an SAD value of the reduced image reference block or base face reference block, transmitted thereto from the matching processing section 163 into the SAD table TBL. After the matching process for the entire search range by the matching processing section 163 is completed, the SAD value comparison portion 1642 carries out a comparison process of all of the SAD values of the SAD table TBL to search for a minimum SAD value. Then, the SAD value comparison portion 1642 retains the detected minimum SAD value and position information of the reduction face reference block or base face reference block which exhibits the minimum SAD value, that is, the reduction face reference vector or base face reference vector, into the SAD value retention portion 1643.

In this instance, if the image pickup apparatus is in the reduction face matching processing mode described hereinabove, then information of the reference vector corresponding to the minimum SAD value Smin retained in the SAD value retention portion 1643 after the reduction face matching process, that is, information of the reduction face motion vector, is supplied from the motion vector calculation section 164 to the control section 165. The information supplied is used to read out the motion compensation block from the reference block buffer section 162 by the control section 165.

On the other hand, in the hierarchical matching processing mode 1 described hereinabove, information of the reference vector corresponding to the minimum SAD value Smin retained in the SAD value retention portion 1643 after the reduction face matching process, that is, information of the reduction face motion vector, is supplied from the motion vector calculation section 164 to the control section 165. The information supplied is used in the control section 165 to set a search range for block matching on the base face.

On the other hand, in the hierarchical matching processing mode 2 described hereinabove, information of the reference vector corresponding to the minimum SAD value Smin retained in the SAD value retention portion 1643 after the base face matching process, that is, information of the base face motion vector, is supplied from the motion vector calculation section 164 to the control section 165. The information supplied is used to read out the motion compensation block from the reference block buffer section 162 by the control section 165.

If only it is necessary to detect a reduction face motion vector or a base face motion vector in the block matching process, then it is necessary to retain only the minimum SAD value Smin or SSmin and position information of the reduction face reference block or the base face reference block which exhibits the minimum SAD value Smin or SSmin, that is, a reduction face reference vector or a base face reference vector in the SAD value retention portion 1643.

However, in the present embodiment, it is necessary to configure the image pickup apparatus such that not only the reduction face matching processing mode but also the reduction face matching+interpolation processing mode, and hierarchical matching+interpolation processing modes 1 and 2 can be executed. Thus, it is necessary to configure the motion vector calculation section 164 such that it not only calculates a motion vector as a result of a block matching process but also an interpolation process as described hereinabove.

In particular, in the present embodiment, it is necessary for the motion vector calculation section 164 to use, after the block matching process on the reduction face or the base face, a plurality of SAD values in the proximity of a position of a reference block which exhibits a minimum SAD value to carry out an interpolation process for calculating a high-accuracy reduction face motion vector and a high-accuracy base face motion vector.

Therefore, in the present embodiment, the motion vector calculation section 164 has also a function for carrying out an interpolation process. In particular, the SAD value retention portion 1643, X direction (horizontal direction) neighboring value extraction portion 1644, Y direction (vertical direction) neighboring value extraction portion 1645 and quadratic curve approximation interpolation processing portion 1646 are components of the motion vector calculation section 164 for carrying out an interpolation process.

The motion vector calculation section 164 is configured such that it reads out a plurality of SAD values, in the present example, four neighboring SAD values in the proximity of a detected minimum SAD value Smin or SSmin and position information or reference vectors of reference blocks which exhibit the SAD values from the SAD table TBL and stores the read out SAD values and position information into the SAD value retention portion 1643.

Then, the X direction (horizontal direction) neighboring value extraction portion 1644 reads out the detected minimum SAD value and the neighboring values in the X or horizontal direction, stored in the SAD value retention portion 1643, together with the position information or reference vectors of the reference blocks, and sends the read out SAD values to the quadratic curve approximation interpolation processing portion 1646. The quadratic curve approximation interpolation processing portion 1646 executes an interpolation process for the X or horizontal direction based on a quadratic curve in such a manner as described above.

Thereafter, the Y direction (vertical direction) neighboring value extraction portion 1645 reads out the detected minimum SAD value and the neighboring values in the Y or vertical direction, stored in the SAD value retention portion 1643, together with the position information or reference vectors of the reference blocks, and sends the read out SAD values to the quadratic curve approximation interpolation processing portion 1646. The quadratic curve approximation interpolation processing portion 1646 executes an interpolation process for the Y or vertical direction based on a quadratic curve in such a manner as described above.

Thus, the quadratic curve approximation interpolation processing portion 1646 carries out an interpolation process based on a quadratic curve twice in the X direction and the Y direction. Then, the quadratic curve approximation interpolation processing portion 1646 calculates, for the reduction face, a high-accuracy reduction face motion vector of the pixel accuracy, but calculates, for the base face, a high-accuracy base face motion vector of a sub-pixel accuracy.

The quadratic curve approximation interpolation processing portion 1646 operates under the control of the control section 165 when the image pickup apparatus is in the reduction face matching+interpolation processing mode, the hierarchical matching processing mode 2, the hierarchical matching+interpolation processing mode 1 and the hierarchical matching+interpolation processing mode 2. The quadratic curve approximation interpolation processing portion 1646 supplies the calculated reduction face motion vector or base face motion vector to the control section 165.

When the image pickup apparatus is in the reduction face matching+interpolation processing mode, the control section 165 uses a high-accuracy reduction face motion vector received from the motion vector calculation section 164 to read out a motion vector block from the reference block buffer section 162.

When the image pickup apparatus is in the hierarchical matching processing mode 2, the control section 165 uses a high-accuracy reduction face motion vector received from the motion vector calculation section 164 to set a search range for block matching on the base face.

When the image pickup apparatus is in the hierarchical matching processing mode 2, the control section 165 uses a high-accuracy base face motion vector received from the motion vector calculation section 164 to read out a motion compensation block from the reference block buffer section 162.

When the image pickup apparatus is in the hierarchical matching+interpolation processing mode 1, the control section 165 uses a high-accuracy base image motion vector received from the motion vector calculation section 164 to read out a motion compensation block from the reference block buffer section 162.

When the image pickup apparatus is in the hierarchical matching+interpolation processing mode 2, the control section 165 uses a high-accuracy reduction face motion vector received from the motion vector calculation section 164 to set a search range for block matching on the base face.

When the image pickup apparatus is in the hierarchical matching+interpolation processing mode 2, the control section 165 uses a high-accuracy base face motion vector received from the motion vector calculation section 164 to read out a motion compensation block from the reference block buffer section 162.

Figure 24:
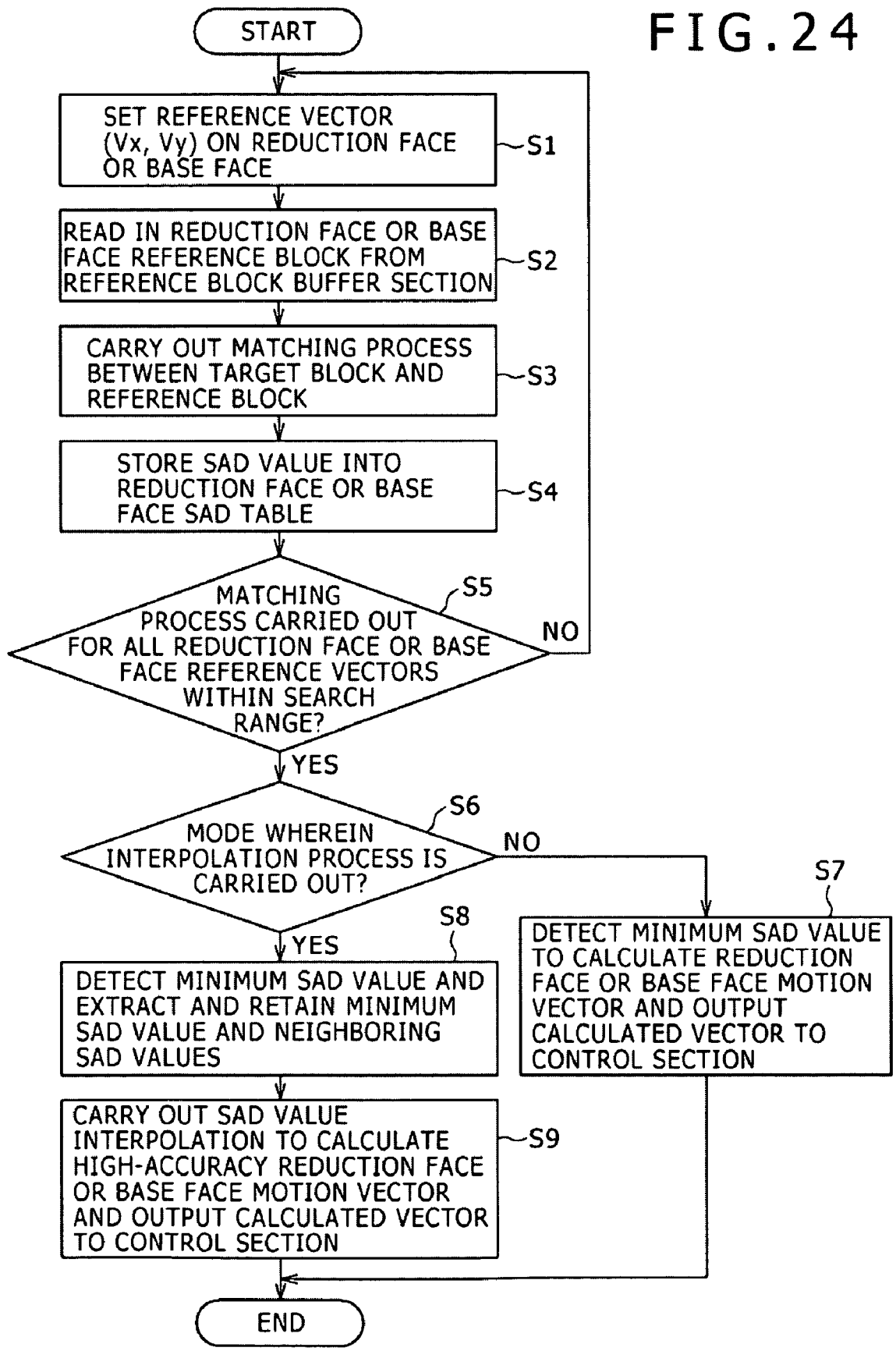
FIG. 24 is a flow chart illustrating an example of processing operation of the motion vector calculation section of FIG. 23.

An example of a flow of operations in the block matching process on the reduction face or the base face in the first example is shown in FIG. 24. Steps of the flow chart of the first example are carried out by the matching processing section 163 and the motion vector calculation section 164 under the control of the control section 165.

Referring to FIG. 24, the matching processing section 163 first sets a reference vector (Vx, Vy) on a reduction face or a base face to set a reduction face or base face reference block position for calculation of an SAD value (step S1). Then, the matching processing section 163 reads in pixel data of the set reduction face or base face reference block from the reference block buffer section 162 (step S2). Thereafter, the matching processing section 163 reads in pixel data of the reduction face or base face target block of the target block buffer section 161 and determines a sum total of absolute values of differences of the pixel data of the reduction face or base face target block and the reduction face or base face reference block, that is, an SAD value (step S3). Then, the matching processing section 163 signals the determined SAD value to the motion vector calculation section 164. In the motion vector calculation section 164, the SAD value writing portion 1641 stores the received SAD value into a position of a corresponding reduction face or base face reference block, that is, a position corresponding to the reduction face or base face reference vector (step S4).

Then, the matching processing section 163 decides whether or not the matching process is completed at all of the reduction face or base face reference blocks, that is, all of the reduction face or base face reference vectors, in the search range (step S5). If it is decided that a reduction face or base face reference block which is not processed as yet still remains in the search range, then the processing returns to step S1 to repeat the processes at the steps beginning with step S1.

On the other hand, if the matching processing section 163 decides at step S5 that the matching process is completed at all of the reduction face or base face reference blocks, that is, at all of the reduction face or base face reference vectors, in the search range, then it informs the motion vector calculation section 164 of the fact.

The motion vector calculation section 164 decides based on the information from the control section 165 whether or not the image pickup apparatus is in a mode in which an interpolation process should be carried out (step S6). If it is decided that the image pickup apparatus is in a mode in which an interpolation process should not be carried out, then the SAD value comparison portion 1642 compares the SAD values of the SAD table TBL to detect a minimum SAD value Smin or SSmin in the SAD table TBL. Then, the SAD value comparison portion 1642 signals information of the position of the reduction face or base face reference block corresponding to the detected minimum SAD value Smin or SSmin, that is, information of the reduction face or base face motion vector, to the control section 165 (step S7). The program matching process in the first embodiment where the image pickup apparatus is in a mode in which an interpolation process should not be carried out is completed therewith.

On the other hand, if it is decided at step S6 that the image pickup apparatus is in a mode in which an interpolation process should be carried out, then the SAD value comparison portion 1642 compares the SAD values of the SAD table TBL to detect a minimum SAD value Smin or SSmin which is minimum in the SAD table TBL. Then, the SAD value comparison portion 1642 stores the detected minimum SAD value Smin or SSmin into a minimum value storage portion of the SAD value retention portion 1643 together with information of the position of the corresponding reduction face or base face reference block. Then, the SAD value retention portion 1643 acquires the reduction face neighboring SAD values Sx1, Sx2 and Sy1, Sy2 or base face neighboring SAD values SSx1, SSx2 and SSy1, SSy2 at positions in the proximity of the position of the detected minimum SAD value Smin or SSmin from the SAD table TBL and stores them into respective storage portions (step S8).

Then, the X direction (horizontal direction) neighboring value extraction portion 1644 and the Y direction (vertical direction) neighboring value extraction portion 1645 read out the detected minimum SAD value Smin or SSmin and the neighboring SAD values Sx1, Sx2 and Sy1, Sy2 or base face neighboring SAD values SSx1, SSx2 and SSy1, SSy2 as well as the position information of them, all retained in the SAD value retention portion 1643, and send the acquired values and information to the quadratic curve approximation interpolation processing portion 1646. The quadratic curve approximation interpolation processing portion 1646 receives the values and information sent from the X direction (horizontal direction) neighboring value extraction portion 1644 and the Y direction (vertical direction) neighboring value extraction portion 1645 and carries out interpolation based on a quadratic curve twice in the X direction and the Y direction to calculate a high-accuracy reduction face motion vector or base face motion vector in such a manner as described above (step S9). The block matching process in the first example is completed therewith.

The first example described above produces an SAD table TBL for storing all of calculated SAD values and extracts a minimum SAD value and neighboring four SAD values for quadratic curve approximation interpolation from the produced SAD table TBL. Consequently, a large-ratio memory for the SAD table TBL is required.

In the other examples described below, the SAD table TBL for storing all of calculated SAD values is not produced, and consequently, the circuit ratio is reduced and also the processing time can be reduced.

<Second Example of a Hardware Configuration of the Motion Vector Calculation Section 164>

As described above, the block matching process sets a position indicated by a reference vector as a position of a reference block, calculates an SAD value of each of pixels of the reference blocks of the target block, and carries out the calculation process for the reference blocks at positions indicated by all of the reference vectors in the search range.

Here, when the position of a reference block is changed in the search range to search for a motion compensation block, the search can be carried out by various methods such that it is carried out in order from an end of the screen image or in order from the center of the screen image or frame toward the outer side. In the present embodiment, the search direction is set in such a manner as indicated by arrow marks 120 in FIG. 25A. In particular, the search is started in a horizontal direction from the left upper corner of the search range, and after the search for one line is completed, another line underlying the first line in the vertical direction is searched in the horizontal direction from the left end. Then, the procedure described is repeated for all of the other lines.

Figure 25A:
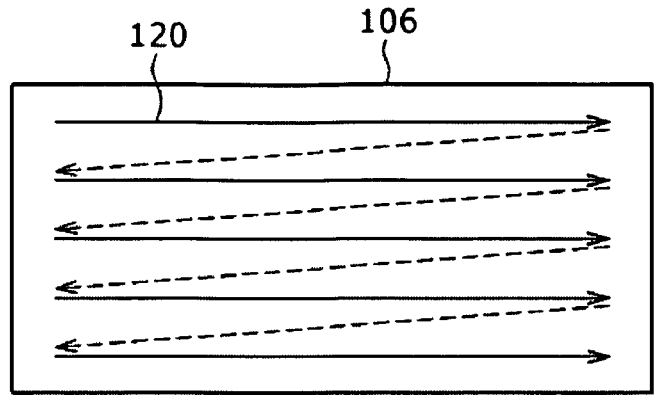
FIGS. 25A to 25C and 26A to 26C are diagrammatic views illustrating operation of a second example of the motion vector calculation section of the motion detection and motion compensation unit.
Figure 25B:
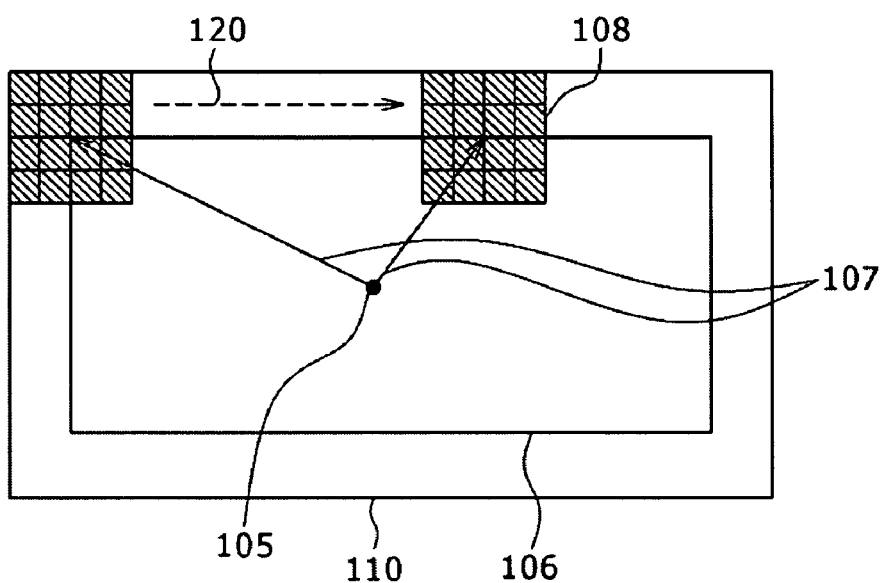
Figure 25C:
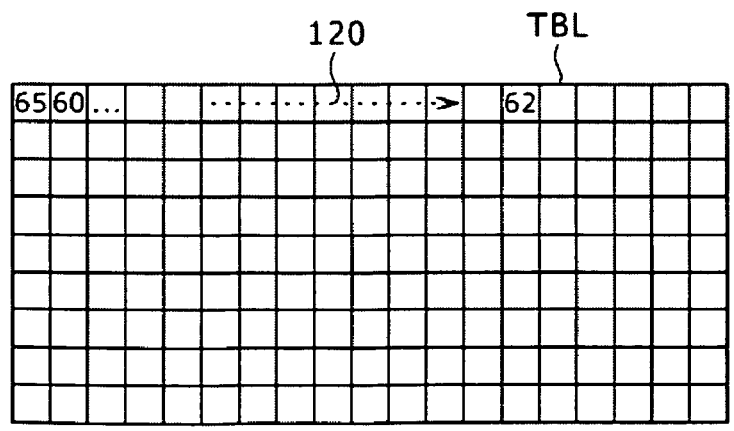

In particular, referring to FIG. 25B, in the search range 106, reference blocks 108 are successively set and searched in the horizontal direction from the left upper portion of the search range 106 to carry out calculation of the SAD value of the reference blocks 108. Consequently, as seen in FIG. 25C, also corresponding storage cells of the SAD table TBL are successively filled in the horizontal direction from the left upper corner. At this time, the range of pixel data used actually for the matching process becomes a matching processing range 110 in accordance with the size of the reference blocks 108 as described hereinabove.

As seen in FIGS. 11 and 18, in order to carry out a quadratic curve approximation interpolation process of the pixel accuracy or the sub pixel accuracy in the present embodiment, only it is necessary to determine the minimum SAD value Smin or SSmin and the neighboring SAD values Sx1, Sx2 and Sy1, Sy2 or the base face neighboring SAD values SSx1, SSx2 and SSy1, SSy2 in the proximity of the reduction face.

When the SAD value is calculated for each reference block, if the calculated SAD value is compared with a minimum value of the SAD value till the point of time and it is decided that the calculated SAD value is lower than the minimum value of the SAD value till then, then if the calculated SAD value is stored as a minimum value and then the SAD value and the reference vector at the point of time are retained, then the minimum value of the SAD value and the position information of the reference block which assumes the minimum value, that is, information of the reference vector, can be determined without producing an SAD table.

Then, if the detected minimum value of the SAD value is retained and the SAD values of reference blocks in the proximity of the reference block position at which the minimum SAD value is exhibited are retained as neighboring SAD values, then also the SAD values can be retained without producing an SAD table.

Figure 26A:
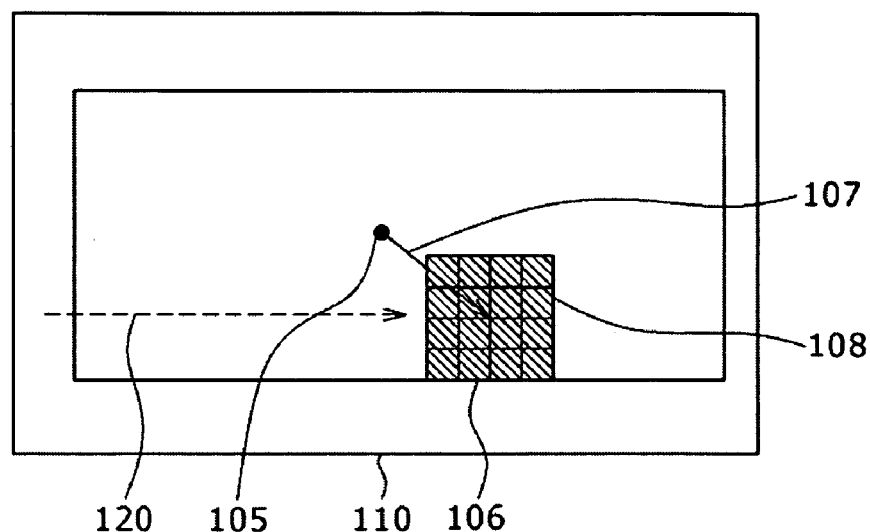
Figure 26B:
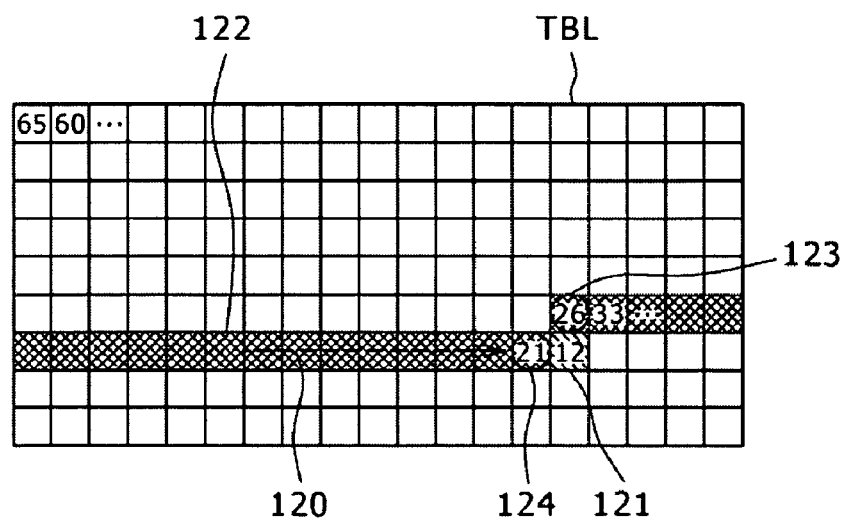

At this time, in the present example, since such a method as described hereinabove with reference to FIG. 25A is adopted, if a memory (hereinafter referred to as line memory) of a capacity sufficient to store SAD values for one line in the horizontal direction is provided in a related-art SAD table as seen in FIG. 26A, then when SAD values of a reference block are calculated newly, SAD values of a plurality of reference blocks for one line of the SAD table TBL calculated formerly are stored as storage data 122 in the line memory with regard to SAD values 121 calculated newly as indicated by slanting lines in FIG. 26B.

Therefore, if the SAD value 121 of a reference block calculated newly is detected as a minimum SAD value, then an SAD value 123 of a reference block at a position above by one line with respect to the reference block which exhibits the SAD value 121, that is, the neighboring SAD value Sy1 or SSy1, on the SAD table TBL and an SAD value 124 of a reference block at a position on the left side with respect to the reference block which exhibits the SAD value 121, that is, the neighboring SAD value Sx1 or SSx1, can be acquired from the line memory.

Figure 26C:
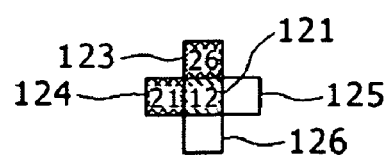

Then, the neighboring SAD value Sx2 or SSx2 (refer to reference numeral 125 in FIG. 26C) which is the SAD value of a reference block at a position on the right side with respect to the reference block of the minimum SAD value 121 on the SAD table TBL may retain an SAD value calculated at the reference block position later. Simultaneously, also the neighboring SAD value Sy2 or SSy2 (refer to reference numeral 126 in FIG. 26C) which is the SAD value of a reference block at a position below by one line with respect to the position of the reference block of the newly calculated minimum SAD value 121 may retain an SAD value calculated at the position of the reference block later.

Figure 27:
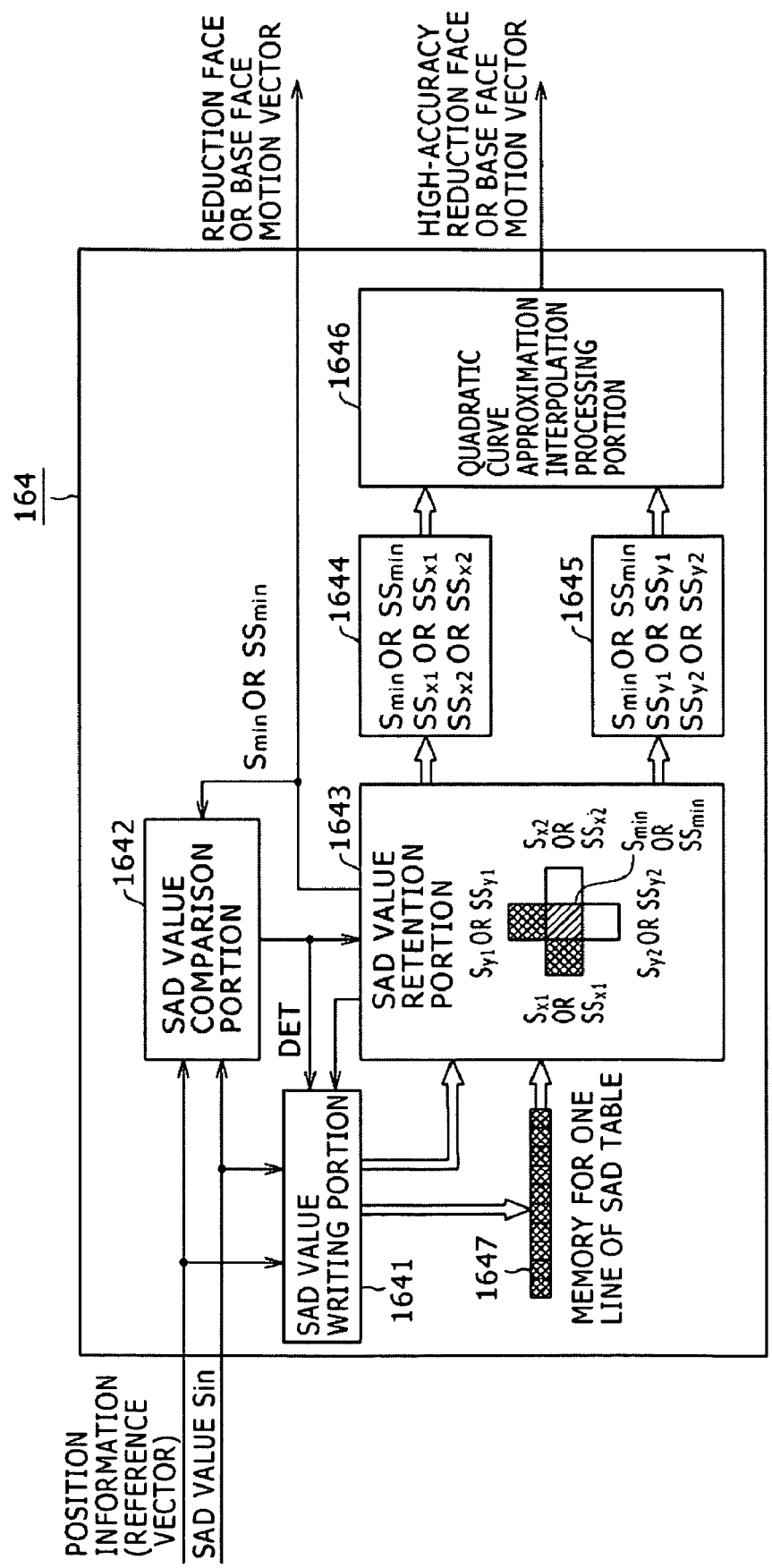
FIG. 27 is a block diagram showing a configuration of the first example of the motion vector calculation section of the motion detection and motion compensation unit.

Taking the foregoing into consideration, the second example of the motion vector calculation section 164 has such a hardware configuration as shown in FIG. 27.

Referring to FIG. 27, the second example of the motion vector calculation section 164 does not include such an SAD table TBL for retaining all of calculated SAD values as in the first example described hereinabove with reference to FIG. 23. In particular, the second example of the motion vector calculation section 164 includes an SAD value writing portion 1641, an SAD value comparison portion 1642, an SAD value retention portion 1643, an X direction (horizontal direction) neighboring value extraction portion 1644, a Y direction (vertical direction) neighboring value extraction portion 1645, a quadratic curve approximation interpolation processing portion 1646, and a memory (hereinafter referred to as line memory) 1647 having a storage capacity for one line of the SAD table TBL.

While the X direction (horizontal direction) neighboring value extraction portion 1644 and Y direction (vertical direction) neighboring value extraction portion 1645 and the quadratic curve approximation interpolation processing portion 1646 operate similarly as in the first embodiment described hereinabove, the SAD value writing portion 1641, SAD value comparison portion 1642, SAD value retention portion 1643 and line memory 1647 operate differently from those in the first example described hereinabove.

The SAD value retention portion 1643 includes retention portions or memory portions for the minimum SAD value Smin or SSmin and the reduction face neighboring SAD values Sx1, Sx2 and Sy1, Sy2 or base face neighboring SAD values SSx1, SSx2 and SSy1, SSy2 similarly as in the first example described hereinabove with reference to FIG. 23. In the present second example, the SAD value retention portion 1643 supplies a minimum SAD value Smin or SSmin from the minimum SAD value retaining portion to the SAD value comparison portion 1642, and supplies position information of a reference block, that is, a reference vector of the neighboring SAD value Sx2 or SSx2 on the right side of the minimum SAD value Smin or SSmin from among the neighboring SAD values retained therein and position information of the reference block, that is, a reference vector, of the minimum SAD value Sy2 or SSy2 on the lower side of the minimum SAD value Smin or SSmin to the SAD value writing portion 1641.

The SAD value comparison portion 1642 in the second example receives position information or a reference vector of a reference block and an SAD value Sin of the reference block from the matching processing section 163 and further receives the minimum SAD value Smin or SSmin from the minimum SAD value retaining portion of the SAD value retention portion 1643.

The SAD value comparison portion 1642 compares the SAD value Sin calculated at the current point of time from the matching processing section 163 with the minimum SAD value Smin or SSmin from the minimum SAD value retaining portion of the SAD value retention portion 1643. Then, if the SAD value Sin calculated at the current point of time from the matching processing section 163 is lower, then the SAD value comparison portion 1642 detects the SAD value as a minimum SAD value. On the other hand, if the SAD value Sin is higher, then the SAD value comparison portion 1642 detects that the minimum SAD value Smin or SSmin retained in the SAD value retention portion 1643 is the minimum SAD value at the current point of time. Then, the SAD value comparison portion 1642 supplies information DET of a result of the detection to the SAD value writing portion 1641 and the SAD value retention portion 1643.

The SAD value writing portion 1641 includes a buffer memory for one pixel for temporarily retaining the SAD value Sin and position information or a reference vector of the SAD value Sin from the matching processing section 163. In the present second example, the SAD value writing portion 1641 writes the position information or reference vector of the reference block from the matching processing section 163 and the SAD value Sin of the reference block into the line memory 1647. In this instance, the line memory 1647 operates similarly to a shift register such that, if new position information and SAD value are stored into the line memory 1647 when the line memory 1647 does not have a free space, then the oldest position information and SAD value in the line memory 1647 are abandoned.

Further, in the present second example, the SAD value writing portion 1641 carries out such a process as described below before it writes the calculated SAD value Sin and position information of the SAD value Sin into the line memory 1647.

In particular, if the information DET of a result of comparison detection from the SAD value comparison portion 1642 indicates that the SAD value Sin is a minimum value, then the SAD value writing portion 1641 sends the position information or reference vector of the reference block from the matching processing section 163 and the SAD value Sin of the new block to the SAD value retention portion 1643.

The SAD value retention portion 1643 detects from the information DET of a result of comparison detection from the SAD value comparison portion 1642 that the SAD value Sin is a minimum value, and stores the position information or reference vector of the reference block and the SAD value Sin of the reference block from the SAD value writing portion 1641 into the minimum SAD value retaining portion.

In the present second example, also when the position information or reference vector of the reference block from the matching processing section 163 coincides with the position information of the neighboring SAD value Sx2 or SSx2 or the neighboring SAD value Sy2 or SSy2 received from the SAD value retention portion 1643, the SAD value writing portion 1641 sends the position information or reference vector of the reference block from the matching processing section 163 and the SAD value Sin of the reference block to the SAD value retention portion 1643.

The SAD value retention portion 1643 recognizes, from the received position information or reference vector of the reference block, to which neighboring SAD value the received position information relates, and stores the position information into a corresponding neighboring SAD value retaining portion.

If the process described above is completed for all of the reference blocks in the search range, then the minimum SAD value and the position information of the same as well as the four neighboring SAD values and position information of the same are retained in the SAD value retention portion 1643 as described hereinabove.

Thus, similarly as in the first example described hereinabove, the X direction (horizontal direction) neighboring value extraction portion 1644 and the Y direction (vertical direction) neighboring value extraction portion 1645 read out the detected minimum SAD value Smin or SSmin and the neighboring SAD values Sx1, Sx2 and Sy1, Sy2 or SSx1, SSx2, SSy1 and SSy2 and position information of them stored in the SAD value retention portion 1643 and send the read out values and information to the quadratic curve approximation interpolation processing portion 1646. The quadratic curve approximation interpolation processing portion 1646 receives the thus sent values and information and carries out interpolation based on a quadratic curve twice in the X direction and the Y direction to calculate a high-accuracy motion vector of the sub pixel accuracy.

In the second example, by using a line memory for one line of the SAD table TBL in place of the SAD table TBL in such a manner as described above, a motion vector of the sub pixel accuracy can be detected.

Figure 28:
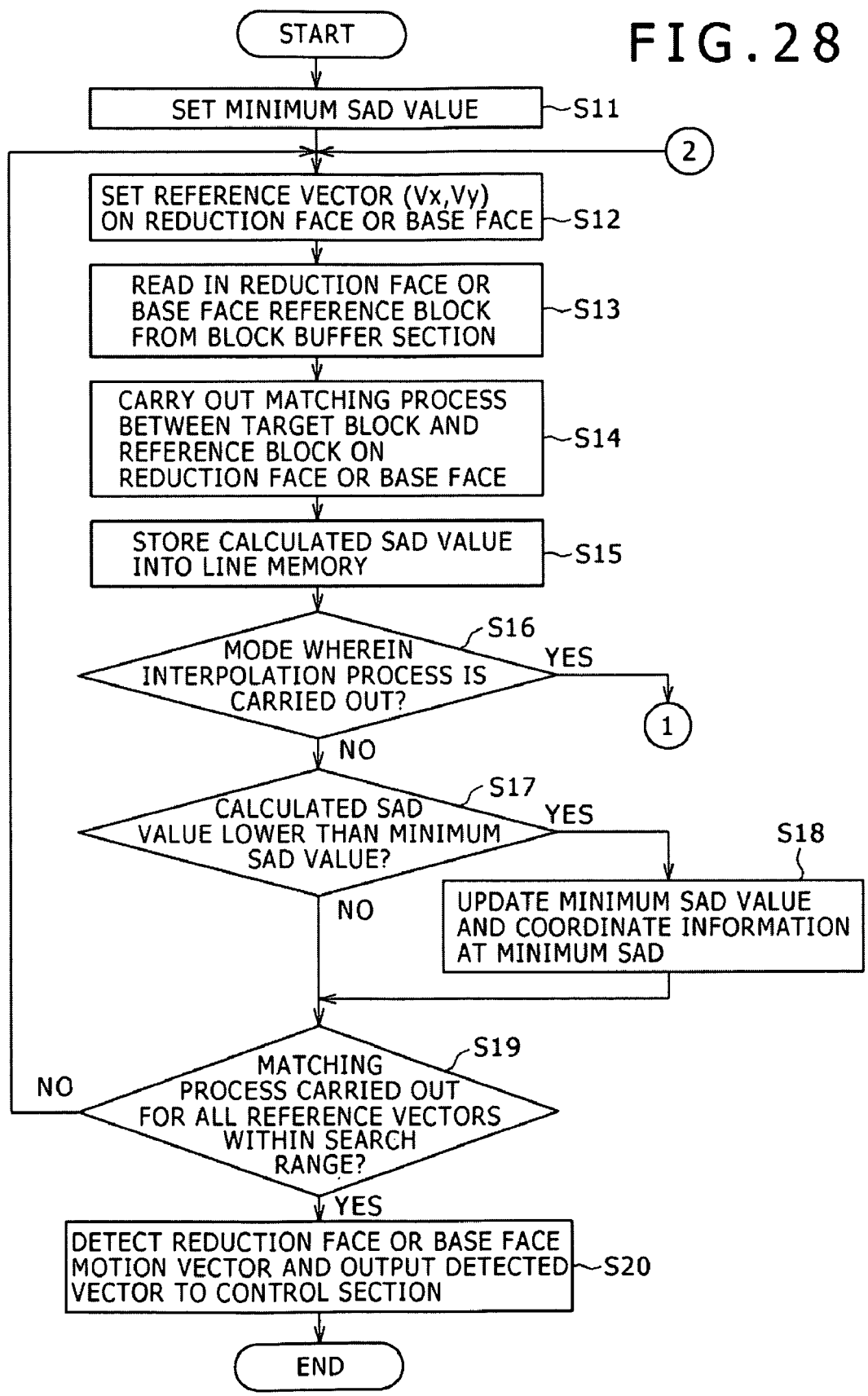
FIGS. 28 and 29 are flow charts illustrating an example of processing operation of the motion vector calculation section of FIG. 27.
Figure 29:
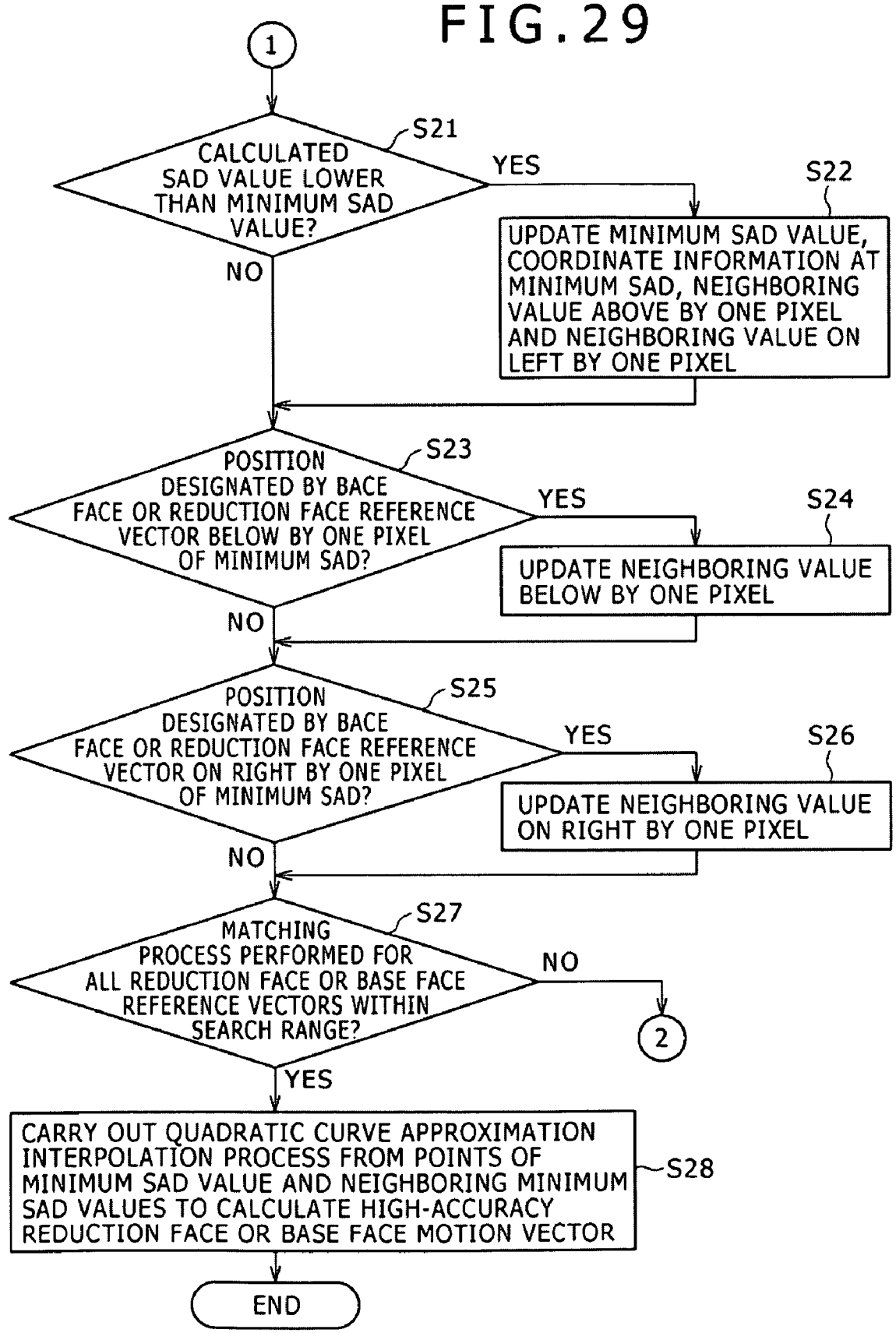

An example of a flow of operations in the block matching process on the reduction face in the second example is shown in FIGS. 28 and 29. Also steps of the flow chart of the second example are carried out by the matching processing section 163 and the motion vector calculation section 164 under the control of the control section 165.

First, an initial value for the minimum SAD value Smin or SSmin of the SAD value retention portion 1643 of the motion vector calculation section 164 is set (step S11). For the initial value for the minimum SAD value Smin or SSmin, for example, a maximum value of the difference between pixels is set.

Then, the matching processing section 163 sets a reference vector (Vx, Vy) of the reduction face or base face to set the reduction face or base face reference block position with regard to which the SAD value is to be calculated (step S12). Then, the matching processing section 163 reads in pixel data of the thus set reduction face or base face reference block from the reference block buffer section 162 (step S13).

Then, the matching processing section 163 reads in pixel data of the reduction face or base face target block from the target block buffer section 161 to determine the sum total of absolute values of differences of the pixel data of the reduction face or base face target block and a reduction face or base face reference block, that is, to determine the SAD value. Then, the matching processing section 163 signals the determined SAD value to the motion vector calculation section 164 (step S14).

The motion vector calculation section 164 writes the SAD value into the line memory 1647 by means of the SAD value writing portion 1641 thereof (step S15).

Then, the motion vector calculation section 164 decides based on the information from the control section 165 whether or not the image pickup apparatus is in a mode in which an interpolation process should be carried out (step S16). If it is decided that the image pickup apparatus is in a mode in which interpolation should not be carried out, then the SAD value comparison portion 1642 compares the SAD value Sin calculated by the matching processing section 163 with the minimum SAD value Smin or SSmin retained in the SAD value retention portion 1643 to decide whether or not the calculated SAD value Sin is lower than the minimum SAD value Smin or SSmin retained till then (step S17).

If it is decided at step S17 that the calculated SAD value Sin is lower than the minimum SAD value Smin or SSmin, then the processing advances to step S18. At step S18, the information of the minimum SAD value Smin or SSmin and the position information of the same, that is, the reduction face or base face reference vector, stored in the SAD value retention portion 1643, are updated.

On the other hand, if it is decided at step S17 that the calculated SAD value Sin is higher than the minimum SAD value Smin or SSmin, then the processing advances to step S19 without carrying out the updating process of the retained information at step S18. At step S19, the matching processing section 163 decides whether or not the matching process is ended for all of the positions or reduction face or base face reference vectors of the reduction face or base face reference blocks in the search range. If it is decided that a reference block which is not processed as yet still remains in the search range, then the processing returns to step S12 to repeat the processes at the steps beginning with step S12 described hereinabove.

On the other hand, if it is decided at step S19 that the matching process is ended for all of the positions or reduction face or base face reference vectors of the reduction face or base face reference blocks in the search range, then the matching processing section 163 informs the motion vector calculation section 164 of the decision. The motion vector calculation section 164 receives the decision and outputs the position information or reduction face or base face motion vector of the minimum SAD value Smin or SSmin retained in the SAD value retention portion 1643 to the control section 165 (step S20).

The block matching process in the mode in which no interpolation process should be carried out in the present second example is completed therewith.

On the other hand, if it is decided at step S16 that the image pickup apparatus is in a mode in which an interpolation process should be carried out, then the SAD value comparison portion 1642 in the motion vector calculation section 164 compares the SAD value Sin calculated by the matching processing section 163 with the minimum SAD value Smin or SSmin retained in the SAD value retention portion 1643 to decide whether or not the calculated Sin is lower than the retained minimum SAD value Smin or SSmin (step S21).

Referring now to FIG. 29, if it is decided at step S21 that the calculated SAD value Sin is lower than the minimum SAD value Smin or SSmin, then the processing advances to step S22. At step S22, the information of the minimum SAD value Smin or SSmin and the SAD value and the position information or reduction face or base face reference vectors of the reference blocks at a position above by one pixel and at another position on the left side by one pixel with respect to the reference block position at which the minimum SAD value Smin or SSmin is exhibited, all retained in the SAD value retention portion 1643, are updated.

In particular, the SAD value comparison portion 1642 sends the information DET of a result of the comparison that the calculated SAD value Sin is lower than the minimum SAD value Smin or SSmin to the SAD value writing portion 1641. Consequently, the SAD value writing portion 1641 sends the calculated SAD value Sin and the position information or base face reference vector of the SAD value Sin as information of the new minimum SAD value Smin or SSmin to the SAD value retention portion 1643. Further, as can be recognized from FIG. 26B, the SAD value comparison portion 1642 sends the oldest SAD value and the position information or reduction face or base face reference vector of the oldest SAD value and the newest SAD value and the position information or reduction face or base face reference vector of the newest SAD value retained in the line memory 1647 as information of the SAD value Sy1 or SSy1 of the base face reference block at a position above by one pixel with respect to the position of the minimum SAD value and information of the SAD value Sx1 or SSx1 of the base face reference block at a position on the left side by one pixel with respect to the position of the minimum SAD value, respectively, to the SAD value retention portion 1643. The SAD value retention portion 1643 receives the information of the new minimum SAD value Smin or SSmin, information of the SAD value Sy1 or SSy1 of the base face reference block at the position above by one pixel and information of the SAD value Sx1 or SSx1 at the position on the left side by one pixel and updates the respective retained information with the received information.

Thereafter, the processing advances from step S22 to step S23. On the other hand, if it is decided at step S21 that the calculated SAD value Sin is higher than the minimum SAD value Smin or SSmin, then the processing advances directly to step S23 without carrying out the updating process of the retained in formation at step S22.

At step S23, the SAD value writing portion 1641 decides whether or not the position indicated by the position information or reference vector of the calculated SAD value Sin is the position of a reduction face or base face reference block below by one pixel with respect to the position of the reduction face or base face reference block retained as the minimum SAD value Smin or SSmin. If it is decided that the position indicated by the position information is the position of the reduction face or base face reference block below by one pixel, then the SAD value writing portion 1641 sends the calculated SAD value Sin and the position information or reference vector of the SAD value Sin to the SAD value retention portion 1643. The SAD value retention portion 1643 receives the SAD value and the position information of the same and updates the retained information of the neighboring SAD value Sy2 or SSy2 of the reduction face or base face reference block at the position below by one pixel with the received SAD value and position information (step S24).

If it is decided at step S23 that the position indicated by the position information or base face reference vector of the calculated SAD value Sin is not the position of a reduction face or base face reference block below by one pixel with respect to the position of the reduction face or base face reference block retained as the minimum SAD value Smin or SSmin, then the SAD value writing portion 1641 decides whether or not the position indicated by the position information or reduction face or base face reference vector of the calculated SAD value Sin is the position of a reduction face or base face reference block on the right by one pixel with respect to the position of the reduction face or base face reference block retained as the minimum SAD value Smin or SSmin (step S25).

If it is decided at step S25 that the position indicated by the position information or reduction face or base face reference vector of the calculated SAD value Sin is the position of a reduction face or base face reference block on the right by one pixel with respect to the position of the reduction face or base face reference block retained as the minimum SAD value Smin or SSmin, then the SAD value writing portion 1641 sends the calculated SAD value Sin and the position information or reduction face or base face reference vector of the SAD value Sin to the SAD value retention portion 1643. The SAD value retention portion 1643 updates the retained information of the neighboring SAD value Sx2 or SSx2 around the reduction face or base face reference block at the position on the right by one pixel with the received SAD value and position information (step S26).

On the other hand, if it is decided at step S25 that the position indicated by the position information or reduction face or base face reference vector of the calculated SAD value Sin is not the position of a reduction face or base face reference block on the right by one pixel with respect to the position of the reduction face or base face reference block retained as the minimum SAD value Smin or SSmin, then the SAD value writing portion 1641 writes the calculated SAD value Sin and the position information or reduction face or base face reference vector of the SAD value Sin only into the line memory 1647 (step S27) but does not send them to the SAD value retention portion 1643.

Then, the matching processing section 163 decides whether or not the matching process is completed for all of the reduction face or base face reference blocks within the search range, that is, for all of the reduction face or base face reference vectors (step S27). If the matching processing section 163 decides that a base face reference block which is not processed as yet still remains in the search range, then the processing returns to step S12 of FIG. 28 to repeat the processes at the steps beginning with step S12.

If the matching processing section 163 decides that the matching process is completed for all of the reduction face or base face reference blocks within the search range, that is, for all of the reduction face or base face reference vectors at step S27, then it notifies the motion vector calculation section 164 of the decision.

The motion vector calculation section 164 receives the notification, and the X direction (horizontal direction) neighboring value extraction portion 1644 and the Y direction (vertical direction) neighboring value extraction portion 1645 thereof read out the detected minimum SAD value Smin or SSmin and the neighboring SAD values Sx1, Sx2 and Sy1, Sy2 or SSx1, SSx2, SSy1 and SSy2 and position information of them stored in the SAD value retention portion 1643 and send the read out values and information to the quadratic curve approximation interpolation processing portion 1646. The quadratic curve approximation interpolation processing portion 1646 receives the information sent from the X direction (horizontal direction) neighboring value extraction portion 1644 and the Y direction (vertical direction) neighboring value extraction portion 1645 and carries out interpolation based on a quadratic curve twice in the X direction and the Y direction to calculate a reduction face or base face motion vector of a high accuracy in such a manner as described hereinabove (step S28). The block matching process of the second example in the mode in which an interpolation process is carried out is completed therewith.

As described above, in the present second example, only by providing a storage portion for one line of an SAD table without retaining an SAD table for retaining all of calculated SAD values and retaining an SAD value for one pixel in the SAD value writing portion 1641, motion vector detection of a high accuracy by an interpolation process can be carried out.

Where the method of the second example is compared with the method of the first example described hereinabove wherein an SAD table is provided, since the number of times of block matching is same, there is an advantage that the processing time is equal and the hardware ratio can be reduced.

It is to be noted that, while, in the foregoing description of the second example, the SAD value comparison portion 1642 compares the calculated SAD value Sin from the matching processing section 163 and the minimum SAD value Smin or SSmin retained in the SAD value retention portion 1643 with each other, the following configuration may otherwise be adopted. In particular, the SAD value comparison portion 1642 includes a retaining portion for a minimum SAD value, and the retained minimum SAD value is compared with the calculated SAD value Sin. Then, when the calculated SAD value Sin is lower, the retained minimum SAD value is updated with the SAD value Sin, and is sent to the SAD value retention portion 1643 through the SAD value writing portion 1641 together with the position information of the SAD value Sin so that it may be retained into the minimum SAD value retaining portion of the SAD value retention portion 1643.

<Third Example of a Hardware Configuration of the Motion Vector Calculation Section 164>

In the present third example of the hardware configuration of the motion vector calculation section 164, also the line memory 1647 in the motion vector calculation section 164 of the second example described hereinabove is omitted so as to achieve further reduction of the hardware ratio.

In the present third example, detection and retention of a minimum SAD value Smin or SSmin of reference blocks within a search range and position information or a reference vector of the minimum value are carried out quite similarly as in the second example described hereinabove. However, as regards acquisition and retention of neighboring SAD values and position information of them, they are not carried out simultaneously with detection of the minimum SAD value Smin or SSmin as in the second example, but the position information of the detected minimum SAD value Smin or SSmin is returned to the matching processing section 163. Consequently, the matching processing section 163 calculates the SAD values of reference blocks at four point positions in the proximity of the minimum SAD value Smin or SSmin again and supplies the calculated SAD values to the motion vector calculation section 164.

The motion vector calculation section 164 receives the SAD values of the neighboring four point positions calculated by the block matching process for the second time from the matching processing section 163 and the position information or reference vectors of the SAD values and stores the received SAD values and position information into respective retaining portions of the SAD value retention portion 1643.

Figure 30:
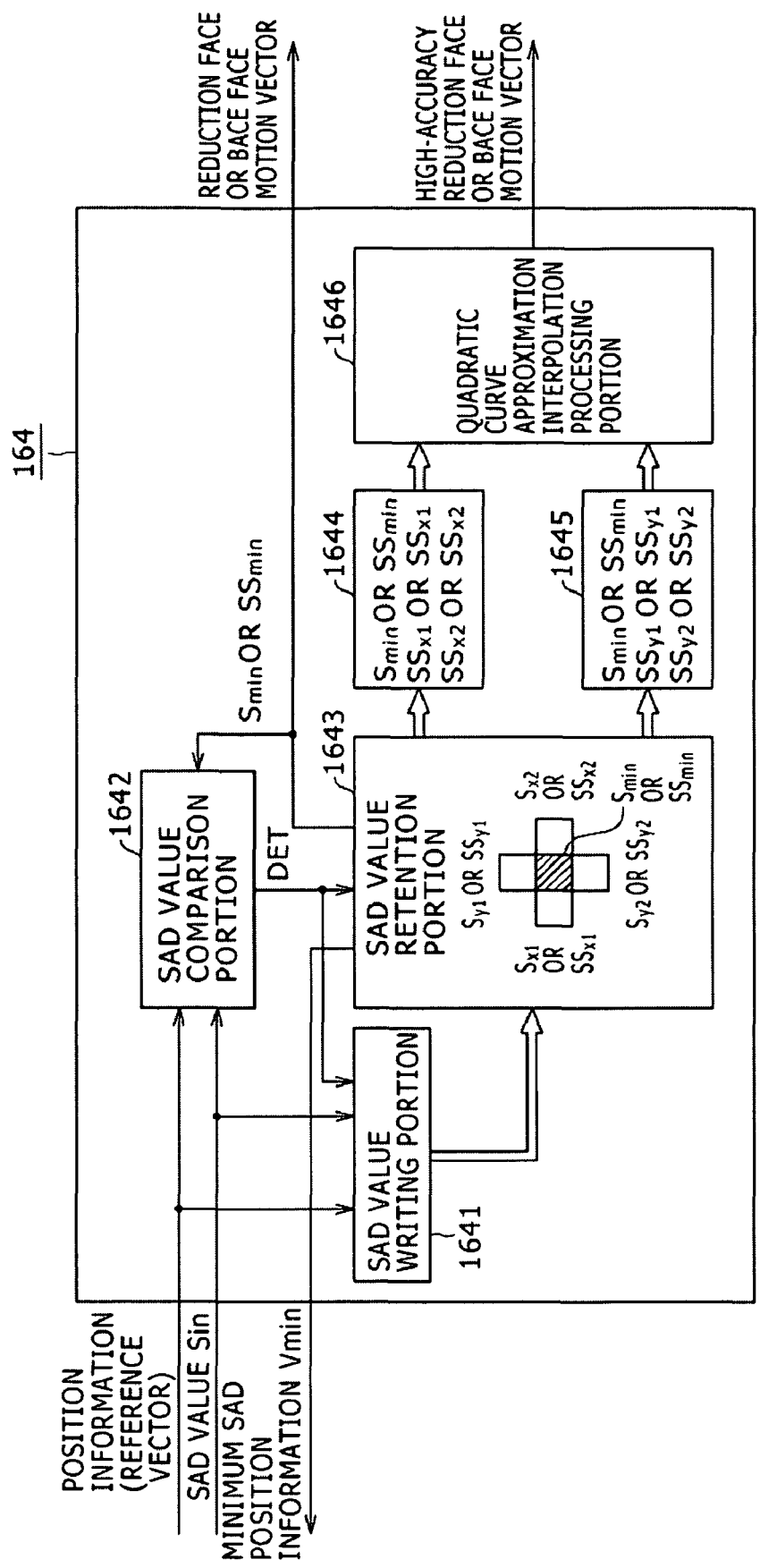
FIG. 30 is a block diagram showing a third example of the motion vector calculation section of the motion detection and motion compensation unit.

The hardware configuration of the third example of the motion vector calculation section 164 is shown in FIG. 30. Referring to FIG. 30, the motion vector calculation section 164 of the third example includes none of the SAD table TBL in the first example and the line memory 1647 in the second example. In particular, the motion vector calculation section 164 includes an SAD value writing portion 1641, an SAD value comparison portion 1642, an SAD value retention portion 1643, an X direction (horizontal direction) neighboring value extraction portion 1644, a Y direction (vertical direction) neighboring value extraction portion 1645 and a quadratic curve approximation interpolation processing portion 1646.

Also in the present third example, the X direction (horizontal direction) neighboring value extraction portion 1644 and Y direction (vertical direction) neighboring value extraction portion 1645 and the quadratic curve approximation interpolation processing portion 1646 operate similarly as in the first example and the second example described hereinabove. However, the SAD value writing portion 1641, SAD value comparison portion 1642 and SAD value retention portion 1643 operate differently from those in the first example and the second example described hereinabove.

The SAD value retention portion 1643 includes retention portions or memory portions for the minimum SAD value Smin or SSmin and the neighboring SAD values Sx1, Sx2 and Sy1, Sy2 or SSx1, SSx2 and SSy1, SSy2 similarly as in the second example. Further, also in the present third example, the SAD value retention portion 1643 supplies the minimum SAD value Smin or SSmin from the minimum SAD value retaining portion thereof to the SAD value comparison portion 1642. However, in the present third example, different from the second example, the SAD value retention portion 1643 does not supply the position information of neighboring SAD values to the SAD value writing portion 1641.

Also in the present third example, the SAD value comparison portion 1642 compares the SAD value Sin calculated at the current point of time from the matching processing section 163 with the minimum SAD value Smin or SSmin from the minimum SAD value retaining portion of the SAD value retention portion 1643. Then, if the SAD value Sin calculated at the current point of time from the matching processing section 163 is lower, then the SAD value comparison portion 1642 detects the SAD value Sin as a minimum SAD value. On the other hand, if the minimum SAD value Smin is lower, then the SAD value comparison portion 1642 detects that the minimum SAD value Smin or SSmin retained in the retaining portion for a minimum SAD value of the SAD value retention portion 1643 is still the minimum SAD value at the current point of time. Then, the SAD value comparison portion 1642 supplies information DET of a result of the detection to the SAD value writing portion 1641 and the SAD value retention portion 1643.

Similarly as in the examples described hereinabove, the SAD value writing portion 1641 includes a buffer memory for one pixel for temporarily retaining the calculated SAD value Sin and position information or a reference vector of the SAD value Sin from the matching processing section 163. Further, in the present third example, when the information DET of a result of comparison detection from the SAD value comparison portion 1642 indicates that the SAD value Sin is a minimum value, the SAD value writing portion 1641 sends the position information or reference vector of the reference block from the matching processing section 163 and the SAD value Sin of the reference block to the SAD value retention portion 1643.

The SAD value retention portion 1643 determines from the information DET of a result of comparison detection from the SAD value comparison portion 1642 that the SAD value Sin is a minimum value, and stores position information or a reference vector of the reference block sent thereto from the SAD value writing portion 1641 and the SAD value Sin of the reference block into the minimum SAD value retaining portion.

The foregoing processes are executed for SAD values calculated by the matching processing section 163 for all of the reference blocks in the search range. Then, in the present third example, when the calculation of the SAD value is completed for all of the reference blocks in the search range, the SAD value retention portion 1643 supplies the position information or reference vector Vmin of the minimum SAD value Smin or SSmin retained therein to the matching processing section 163 and requests the matching processing section 163 to carry out re-calculation of the SAD value for four reference blocks in the proximity of the position of the position information.

When the matching processing section 163 receives the request for re-calculation of the SAD value for the neighboring reference blocks including the position information or reference vector Vmin of the minimum SAD value Smin or SSmin from the SAD value retention portion 1643, it detects the positions of the neighboring reference blocks at the neighboring four points from the position information or reference vector Vmin of the minimum SAD value Smin or SSmin. Then, the matching processing section 163 carries out calculation of the SAD value of the reference blocks at the detected positions. Then, the matching processing section 163 successively supplies the calculated SAD values to the SAD value writing portion 1641 together with the position information or reference vectors.

In this instance, since the matching processing section 163 carries out a block matching process in order in the search direction, the neighboring SAD values are carried out in order of the SAD values Sy1, Sx1, Sx2 and Sy2 or SSy1, SSx1, SSx2 and SSy2. The SAD value writing portion 1641 successively supplies the received re-calculated SAD values and the position information or reference vectors of them to the SAD value retention portion 1643.

The SAD value retention portion 1643 successively writes and retains the re-calculated SAD values and the position information or reference vectors of them successively into corresponding storage portions.

After the re-calculation of the SAD value for all of the neighboring reference blocks is completed in this manner, similarly as in the second example described hereinabove, the X direction (horizontal direction) neighboring value extraction portion 1644 and the Y direction (vertical direction) neighboring value extraction portion 1645 read out the detected minimum SAD value Smin or SSmin and the neighboring SAD values Sx1, Sx2 and Sy1, Sy2 or SSx1, SSx2 and SSy1, SSy2 as well as the position information of them, all retained in the SAD value retention portion 1643, and send the acquired values and information to the quadratic curve approximation interpolation processing portion 1646. The quadratic curve approximation interpolation processing portion 1646 receives the values and information sent from the X direction (horizontal direction) neighboring value extraction portion 1644 and the Y direction (vertical direction) neighboring value extraction portion 1645 and carries out interpolation based on a quadratic curve twice in the X direction and the Y direction to calculate a high-accuracy motion vector of the sub pixel accuracy in such a manner as described above.

In this manner, in the present third example, detection of a high-accuracy reduction face or base face motion vector can be carried out without using the SAD table TBL or the line memory.

Figure 31:
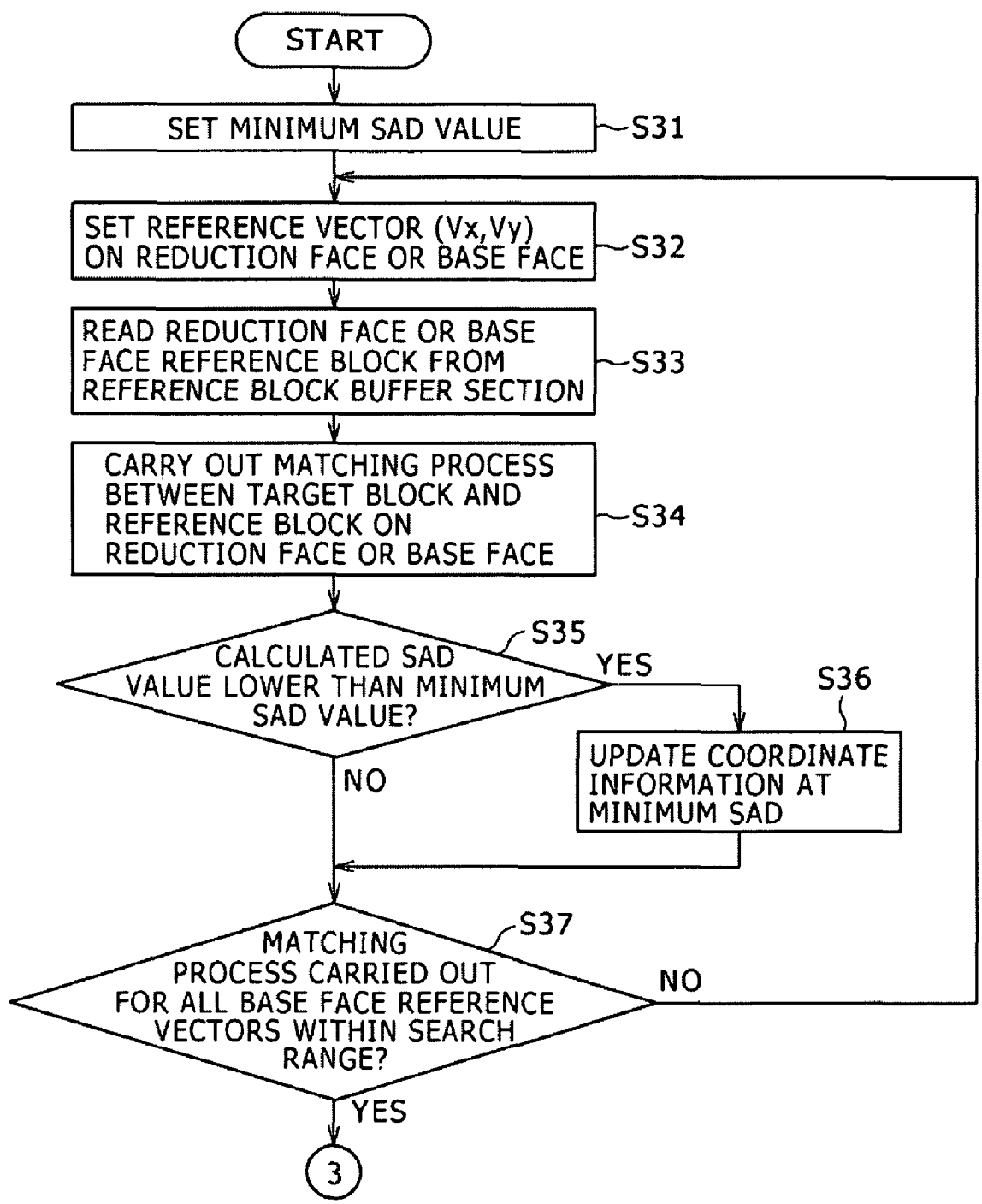
FIGS. 31 and 32 are flow charts illustrating an example of processing operation of the motion vector calculation section of FIG. 30.

An example of a flow of operations in the block matching process in the present third example is described with reference to FIGS. 31 and 32.

First, an initial value for the minimum SAD value Smin or SSmin of the SAD value retention portion 1643 of the motion vector calculation section 164 is set (step S31). As the initial value for the minimum SAD value Smin or SSmin, for example, a maximum value of the difference of the pixels is set.

Then, the matching processing section 163 sets a reference vector (Vx, Vy) on a reduction face or a base face and sets a reduction face or base face reference block position for calculating an SAD value (step S32). Then, the matching processing section 163 reads in pixel data of the set reduction face or base face reference block from the reference block buffer section 162 (step S33). Then, the matching processing section 163 reads in pixel data of the reduction face or base face target block from the target block buffer section 161 and determines the sum total of absolute values of differences of the pixel data of the target block and the reference block on the reduction face or base face, that is, determines an SAD value. Then, the matching processing section 163 signals the determined SAD value to the motion vector calculation section 164 (step S34).

In the motion vector calculation section 164, the SAD value comparison portion 1642 compares the SAD value Sin calculated by the matching processing section 163 with the minimum SAD value Smin or SSmin retained in the SAD value retention portion 1643 to decide whether or not the calculated SAD value Sin is lower than the minimum SAD value Smin or SSmin retained till then (step S35).

If it is decided at step S35 that the calculated SAD value Sin is lower than the minimum SAD value Smin or SSmin, then the processing advances to step S36. At step S36, the minimum SAD value Smin or SSmin and the position information of the same retained in the SAD value retention portion 1643 are updated.

In particular, the SAD value comparison portion 1642 sends information DET of a result of the comparison that the calculated SAD value Sin is lower than the minimum SAD value Smin or SSmin to the SAD value writing portion 1641. Consequently, the SAD value writing portion 1641 sends the calculated SAD value Sin and the position information or base face reference vector of the same as information of the new minimum SAD value Smin or SSmin to the SAD value retention portion 1643. The SAD value retention portion 1643 updates the minimum SAD value Smin or SSmin and the position information of the same retained therein with the received new SAD value Sin and position information of the new SAD value Sin.

Then, the processing advances from step S36 to step S37. On the other hand, if it is decided at step S35 that the calculated SAD value Sin is equal to or higher than the minimum SAD value Smin or SSmin, then the processing advances to step S37 without carrying out the updating process of the retained information at step S36.

At step S37, the matching processing section 163 decides whether or not the matching process is completed for all of the positions of the reduction face or base face reference blocks, that is, of the reduction face or base face reference vectors, in the search range. If it is decided that a reduction face or base face reference block which is not processed as yet still remains in the search range, then the processing returns to step S32 to repeat the processes at the steps beginning with step S32 described hereinabove.

Figure 32:
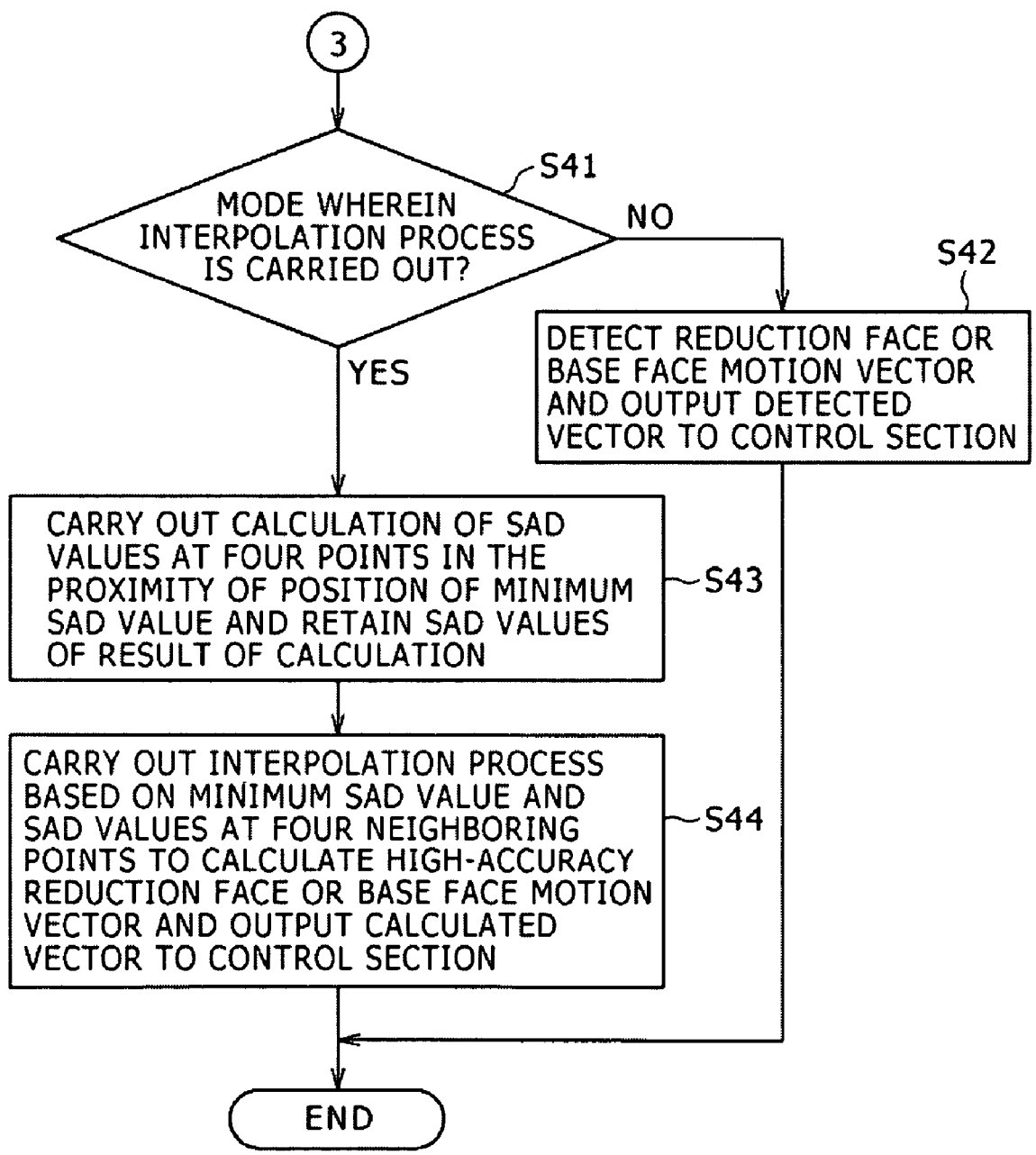

On the other hand, if it is decided at step S37 that the matching process is completed for all of the positions of the reduction face or base face reference blocks, that is, for all of the reference vectors, then the motion vector calculation section 164 decides from the information from the control section 165 whether or not the image pickup apparatus is in a mode in which an interpolation process should be carried out (step S41 in FIG. 32).

If it is decided at step S41 that the image pickup apparatus is in a mode in which an interpolation process should not be carried out, then the motion vector calculation section 164 outputs the position information, that is, the reduction face or base face motion vector, of the minimum SAD value Smin or SSmin retained in the SAD value retention portion 1643 to the control section 165 (step S42).

The block matching process in the mode in which an interpolation process is not carried out in the present third example is ended therewith.

On the other hand, if it is decided at step S41 that the image pickup apparatus is in a mode in which an interpolation process should be carried out, then the motion vector calculation section 164 receives the position information of the minimum SAD value Smin or SSmin from the SAD value retention portion 1643 and carries out re-calculation of the SAD value with regard to the reduction face or base face reference blocks at the positions of the neighboring four points. Then, the motion vector calculation section 164 supplies the re-calculated neighboring SAD values to the SAD value retention portion 1643 through the SAD value writing portion 1641 so as to be retained into the SAD value retention portion 1643 (step S43).

Then, in the motion vector calculation section 164, the X direction (horizontal direction) neighboring value extraction portion 1644 and the Y direction (vertical direction) neighboring value extraction portion 1645 read out the detected minimum SAD value Smin or SSmin and the neighboring SAD values Sx1, Sx2 and Sy1, Sy2 or SSx1, SSx2, SSy1 and SSy2 and the position information of them retained in the SAD value retention portion 1643, and send the read out SAD values and position information to the quadratic curve approximation interpolation processing portion 1646. The quadratic curve approximation interpolation processing portion 1646 receives the SAD values and position information and carries out interpolation based on a quadratic curve twice in the X direction and the Y direction to calculate a high-accuracy reduction face or base face motion vector in such a manner as described hereinabove. Then, the quadratic curve approximation interpolation processing portion 1646 outputs the calculated reduction face or base face motion vector to the control section 165 (step S44). The block matching process in the mode in which an interpolation process is carried out in the third example is ended therewith.

In the present third example, although the processing time increases by a period of time required for re-calculation of the SAD values, since no line memory is required, the circuit ratio can be reduced from that in the second example. Besides, since the re-calculation is carried out only for the neighboring SAD values, and since, in the example described above, the re-calculation process is carried out at most four times, the increase of the processing time is small.

It is to be noted that, while, in the description above of the third example, a minimum SAD value is retained into the SAD value retention portion 1643 while it is detected, the SAD value comparison portion 1642 may otherwise be configured so as to detect and retain position information or a reference vector of a reference block which exhibits a minimum SAD value such that, after first time block matching comes to an end, the position information of the minimum SAD value is supplied from the SAD value comparison portion 1642 to the matching processing section 163.

In this instance, in the re-calculation of the SAD values by the matching processing section 163, also the minimum SAD value is re-calculated in addition to the SAD values of the neighboring four points. In this instance, although the number of times of a re-calculation operation becomes five times and exhibits increase of one time, in the first-time block matching, only it is necessary for the SAD value comparison portion 1642 to operate while the SAD value writing portion 1641 and the SAD value retention portion 1643 may operate so as to retain re-calculated SAD values Therefore, there is a merit that the processing operation is simplified.

Further, the motion detection and the processing by the motion detection and motion compensation unit 16 can be executed parallelly and concurrently for a plurality of target blocks set on a target frame. In this instance, it is necessary to provide a number of hardware systems for the motion detection and motion compensation unit 16 equal to the number of target blocks to be used for the parallel and concurrent processes.

Further, where an SAD table is produced as in the first example, it is necessary to produce a number of SAD tables equal to the number of target blocks, and a memory of a very great storage capacity is required. However, in the second example, only a storage capacity corresponding to one line of an SAD table is required for one target block, and therefore, the memory capacity can be reduced significantly. Furthermore, in the case of the third example, no line memory is required, and therefore, significant reduction of the memory capacity can be achieved.

[Functional Blocks of the Motion Detection and Motion Compensation Unit 16 for Plural Operation Modes]

As described hereinabove, in the present embodiment, the motion detection and motion compensation unit 16 having such a hardware configuration as described above can execute all of such a plurality of operation modes of the block matching process as described above. A functional block configuration for implementing the plural operation modes of the motion detection and motion compensation unit 16 in the present embodiment is shown in FIG. 33.

Figure 33:
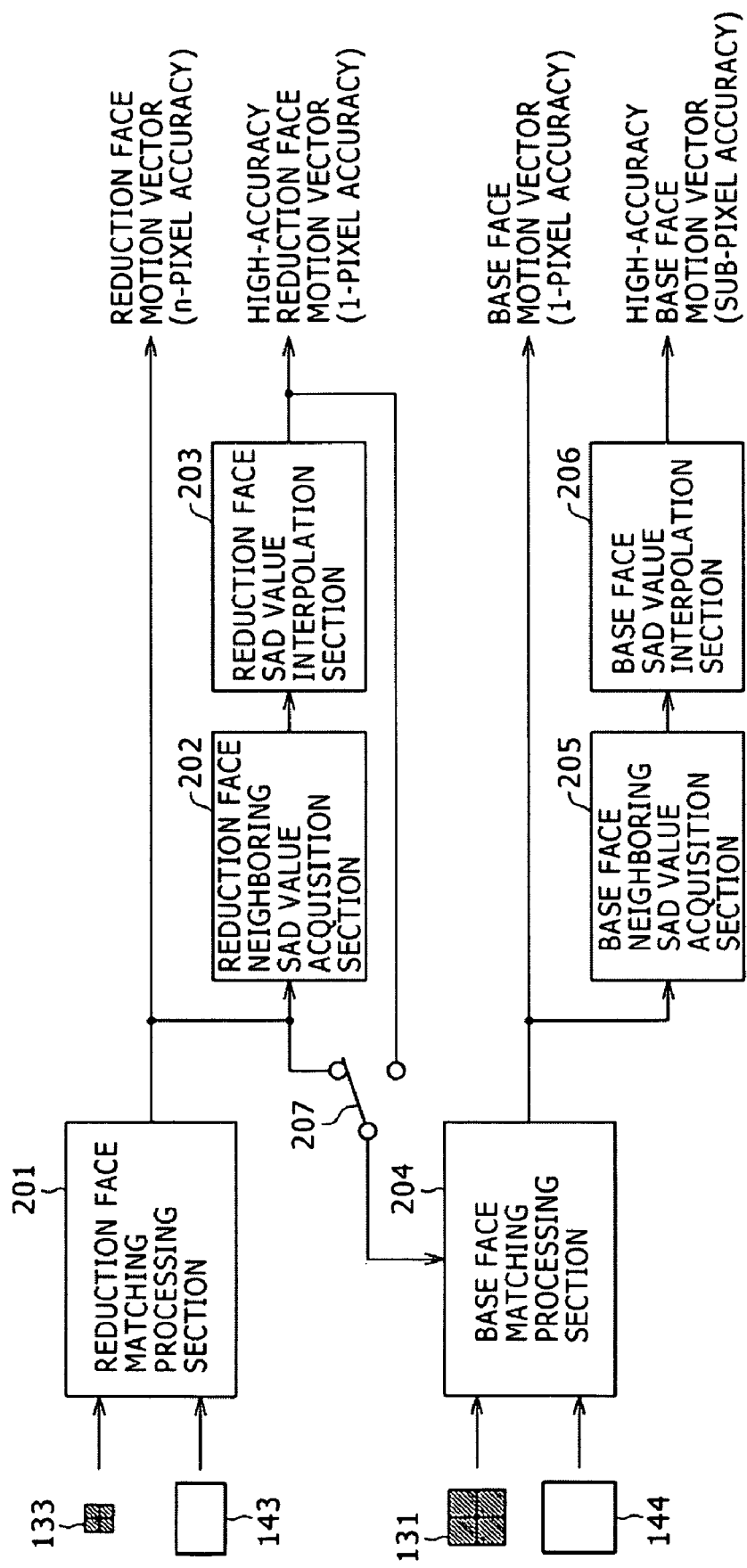
FIG. 33 is a block diagram showing a functional block configuration of part of the image processing apparatus.

Referring to FIG. 33, the motion detection and motion compensation unit 16 includes, as functional blocks thereof, a reduction face matching processing section 201, a reduction face neighboring SAD value acquisition section 202, a reduction face SAD value interpolation section 203, a base face matching processing section 204, a base face neighboring SAD value acquisition section 205 and a base face SAD value interpolation section 206.

The reduction face matching processing section 201 calculates a reduction face SAD value between a reduction face target block 133 and all of reduction face reference blocks 139 in a reduction face matching processing range 143 to determine a reduction face minimum SAD value Smin. Then, the reduction face matching processing section 201 detects a reduction face motion vector from the determined reduction face minimum SAD value Smin and outputs the reduction face motion vector to the control section 165.

The control section 165 controls so that only the reduction face matching processing section 201 operates in the reduction face matching processing mode.

The reduction face neighboring SAD value acquisition section 202 acquires reduction face neighboring SAD values Sx1, Sx2 and Sy1, Sy2 at four points in the neighborhood of the reduction face minimum SAD value Smin determined by the reduction face matching processing section 201 as described above.

The reduction face SAD value interpolation section 203 uses the reduction face minimum SAD value Smin and the reduction face neighboring SAD values Sx1, Sx2 and Sy1, Sy2 to carry out the quadratic curve approximation interpolation process of the sub pixel accuracy described hereinabove to determine a high-accuracy reduction face minimum SAD value. Then, the reduction face SAD value interpolation section 203 detects a high-accuracy reduction face motion vector from the high-accuracy reduction face minimum SAD value and outputs the high-accuracy reduction face motion vector to the control section 165.

On the other hand, in the reduction face matching+interpolation processing mode, the control section 165 controls so that the reduction face matching processing section 201, reduction face neighboring SAD value acquisition section 202 and reduction face SAD value interpolation section 203 operate.

The base face matching processing section 204 calculates a base face SAD value between a base face target block 131 and all base face reference blocks 142 in a base face matching processing range 144 to determine a base face minimum SAD value SSmin, detects a base face motion vector from the determined base face minimum SAD value SSmin and outputs the base face motion vector to the control section 165.

Further, in the hierarchical matching processing mode 1, the control section 165 controls such that the reduction face matching processing section 201 and the base face matching processing section 204 operate. At this time, the base face matching processing section 204 determines a base face search range and a base face matching processing range based on a reduction face motion vector determined by the reduction face matching processing section 201.

Furthermore, in the hierarchical matching processing mode 2, the control section 165 controls such that the reduction face matching processing section 201, reduction face neighboring SAD value acquisition section 202, reduction face SAD value interpolation section 203 and base face matching processing section 204 operate. At this time, the base face matching processing section 204 determines a base face search range and a base face matching processing range based on a high-accuracy reduction face motion vector determined by the reduction face SAD value interpolation section 203.

As seen in FIG. 33, the control section 165 changes over the changeover section 207 serving as a functional section to carry out selective changeover control between the hierarchical matching processing mode 1 and the hierarchical matching processing mode 2.

The base face neighboring SAD value acquisition section 205 acquires base face neighboring SAD values SSx1, SSx2 and SSy1, SSy2 at the four points in the neighborhood of the base face minimum SAD value SSmin determined by the base face matching processing section 204 as described above.

The base face SAD value interpolation section 206 uses the base face minimum SAD value SSmin and the base face neighboring SAD values SSx1, SSx2 and SSy1, SSy2 to carry out the quadratic curve approximation interpolation process of the sub pixel accuracy described hereinabove to determine a high-accuracy base face minimum SAD value. Then, the base face SAD value interpolation section 206 detects a high-accuracy base face motion vector from the high-accuracy base face minimum SAD value and sends the high-accuracy base face motion vector to the control section 165.

In the hierarchical matching+interpolation processing mode 1, the control section 165 controls such that the reduction face matching processing section 201, base face matching processing section 204, base face neighboring SAD value acquisition section 205 and base face SAD value interpolation section 206 operate. At this time, the base face matching processing section 204 determines a base face search range and a base face matching processing range based on the reduction face motion vector determined by the reduction face matching processing section 201.

On the other hand, in the hierarchical matching+interpolation processing mode 2, the control section 165 controls such that the reduction face matching processing section 201, reduction face neighboring SAD value acquisition section 202, reduction face SAD value interpolation section 203, base face matching processing section 204, base face neighboring SAD value acquisition section 205 and base face SAD value interpolation section 206 operate. At this time, the base face matching processing section 204 determines a base face search range and a base face matching processing rage based on the high-accuracy reduction face motion vector determined by the reduction face SAD value interpolation section 203.

As seen in FIG. 33, the control section 165 changes over the changeover section 207 serving as a functional section to carry out selective changeover control between the hierarchical matching+interpolation processing mode 1 and the hierarchical matching+interpolation processing mode 2.

[Examples of Selection of the Plural Operation Modes of the Block Matching Process]

Now, several examples of selection of the plural operation modes of the block matching process in the present embodiment are described.

<First Example of Selection>

Figure 34:
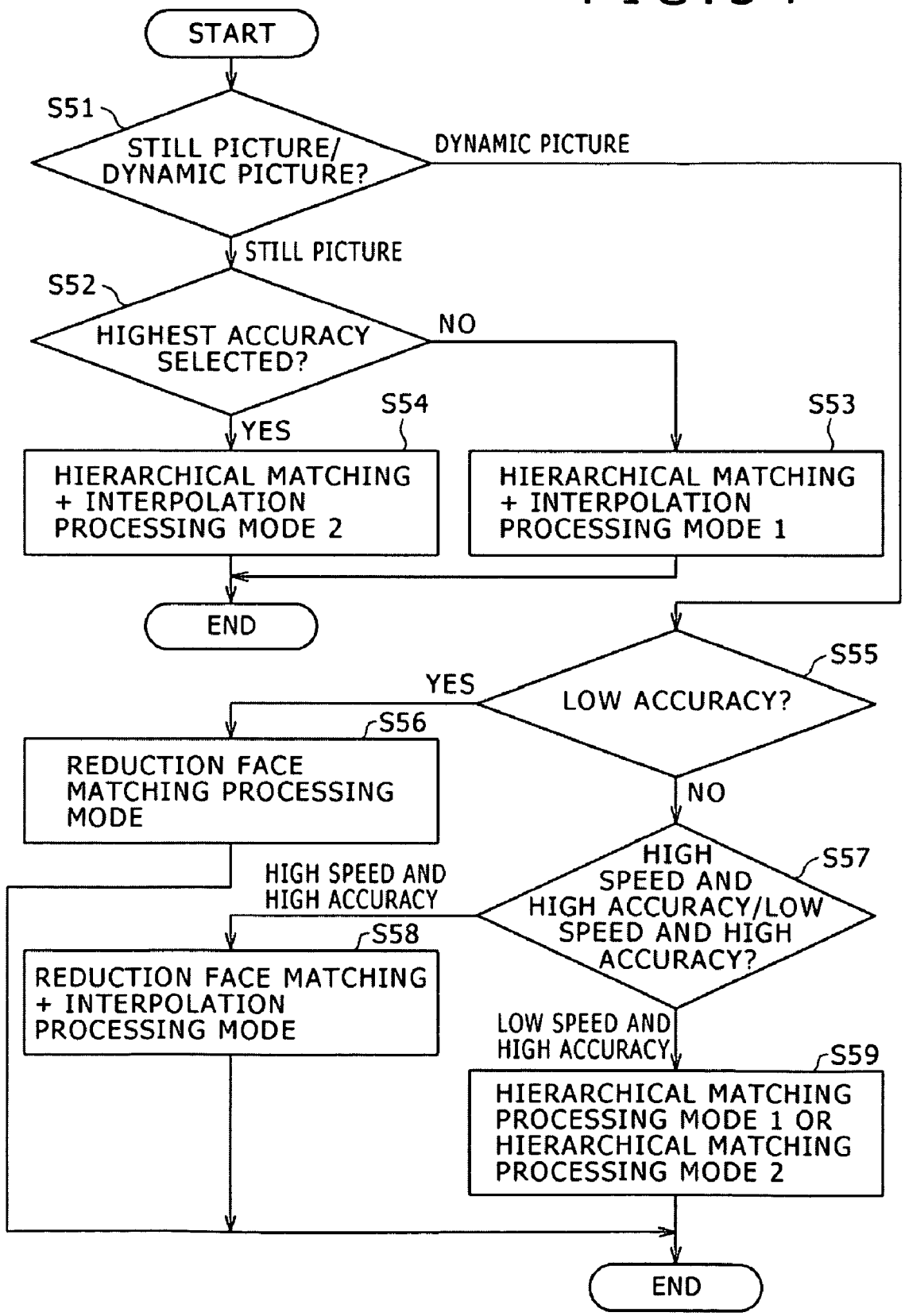
FIG. 34 is a flow chart illustrating an example of a process of selecting one of a plurality of block matching modes used in an image processing method according to an embodiment and which is incorporated in the image pickup apparatus of FIG. 1.

FIG. 34 illustrates an example of selection of the plural operation modes of the block matching process in response to selection between the still picture pickup mode and the dynamic picture pickup mode and selection of a detection accuracy or a processing speed of a motion vector. Processing steps of FIG. 34 are executed by the CPU 1.

First, the CPU 1 supervises a user operation input from the user operation inputting unit 3 to decide whether the still picture pickup mode is selected or the dynamic picture pickup mode is selected (step S51). If it is decided at step S51 that the still picture pickup mode is selected, then the CPU 1 decides whether or not the highest accuracy is selectively inputted as the motion detection accuracy through the user operation inputting unit 3 (step S52). If it is decided that the highest accuracy is not selectively inputted, then the CPU 1 issues an instruction to the control section 165 of the motion detection and motion compensation unit 16 to execute the hierarchical matching+interpolation processing mode 1 (step S53). On the other hand, if it is decided at step S52 that the highest accuracy is selectively inputted, then the CPU 1 issues an instruction to the control section 165 of the motion detection and motion compensation unit 16 to execute the hierarchical matching+interpolation processing mode 2 (step S54).

On the other hand, if it is decided at step S51 that the dynamic picture pickup mode is selected, then the CPU 1 decides whether or not a low accuracy is selectively inputted as the motion vector detection accuracy through the user operation inputting unit 3 (step S55). If it is decided that a low accuracy is selectively inputted, then the CPU 1 issues an instruction to the control section 165 of the motion detection and motion compensation unit 16 to execute the reduction face matching processing mode (step S56).

On the other hand, if it is decided at step S55 that a low accuracy is not selectively inputted, then the CPU 1 decides whether a high processing speed-high accuracy state is selected through the user operation inputting unit 3 or a high accuracy state in which the processing speed may be a low speed is selected (step S57).

Then, if it is decided that a high processing speed-high accuracy state is selected, then the CPU 1 issues an instruction to the control section 165 of the motion detection and motion compensation unit 16 to execute the reduction face matching+interpolation processing mode (step S58).

On the other hand, if it is decided at step S57 that a high accuracy state in which the processing speed may be a low speed is selected, then the CPU 1 issues an instruction to the control section 165 of the motion detection and motion compensation unit 16 to execute the hierarchical matching processing mode 1 or the hierarchical matching processing mode 2 (step S59). Also the selection of the hierarchical matching processing mode 1 or the hierarchical matching processing mode 2 at step S59 may be carried out similarly in response to a selection input of a detection accuracy of a motion vector by the user such that, when a high accuracy is selected, the hierarchical matching processing mode 2 is selected, but in any other case, the hierarchical matching processing mode 1 is selected.

It is to be noted that, while, in the example described above, when the user selects through the user operation inputting unit 3 such that a motion vector of a high accuracy is detected in the dynamic picture pickup mode, it is decided at step S57 that one of the reduction face matching+interpolation processing mode and the hierarchical matching+interpolation processing mode 1 or hierarchical matching+interpolation processing mode 2 is selected in response to a selective setting input of the processing speed by the user, such determination may be carried out otherwise in the following manner. In particular, the CPU 1 detects a frame rate of picked up image data inputted thereto, and when the frame rate is low, the reduction face matching+interpolation processing mode is selected, but when the frame rate is high, the hierarchical matching+interpolation processing mode 1 or the hierarchical matching+interpolation processing mode 2 is selected.

It is to be noted that, where a frame rate is inputted and set by the user, the setting input is included in a selective setting input of a processing speed by the user.

<Second Example of Selection>

In the image pickup apparatus of the present embodiment, when it is in an image pickup recording execution mode or a camera EE (Electro Eye) picture mode before execution of image pickup recording, the operation mode can be selected from between two modes including a power saving mode and a normal mode in which no power saving is carried out.

The camera EE picture mode is in most cases executed continuously before an image recording state, that is, a picture recording state, is entered, and connects directly to power saving of the entire image pickup apparatus. On the other hand, the picture quality in the camera EE picture mode is low in priority because the image is merely displayed on a liquid crystal display section or an electronic viewfinder but is not recorded. Accordingly, in the camera EE picture mode, the power consumption is suppressed as low as possible, and after the image pickup recording execution mode is entered, preferably the picture quality is raised.

Then, among the plural operation modes of block matching described above, an operation mode in which the detection accuracy of a motion vector is low requires less frequent bus accessing to the system bus 2 and less power consumption.

Further, the interpolation process in the present embodiment has less influence on the power consumption and the processing speed.

From the foregoing, when the image pickup apparatus is in the image pickup recording execution mode or the camera EE (Electro Eye) picture mode before execution of image pickup recording, the required processing speed and the power consumption depends upon an applied one of the two operation modes including the power saving mode and the normal mode which does not involve power saving as shown in FIG. 35. The CPU 1 determines an optimum detection accuracy of the motion vector in response to the processing speed and the power consumption, and changes over the operation mode of block matching to be applied based on the determination.

In particular, as seen in FIG. 35, when the image pickup apparatus is in the power saving mode in the camera EE picture mode, since the operation vector may be a reduction face motion vector of the n-pixel accuracy, the reduction face matching processing mode is selected as the operation mode for block matching.

On the other hand, when the image pickup apparatus is in the normal mode in the camera EE picture mode, it may be set so as to detect a high-accuracy reduction face motion vector of the pixel accuracy, and the reduction face matching+interpolation processing mode is selected as the operation mode for block matching.

However, when the image pickup apparatus is in the power saving mode in the image pickup recording execution mode, since the motion vector may be a base face motion vector of the one-pixel accuracy, the hierarchical matching processing mode 1 or 2 is selected as the operation mode for block matching.

On the other hand, when the image pickup apparatus is in the normal mode in the image pickup recording execution mode, preferably a high-accuracy base face motion vector of the sub pixel accuracy is detected. Therefore, the hierarchical matching+interpolation processing mode 1 or 2 is selected as the operation mode for block matching.

It is to be noted that, although the operation modes of the power saving mode and the normal mode described above are set by the user, the camera EE picture mode and the image pickup recording execution mode are changed over in response to turning on/off of an image pickup recording start button. Thus, the CPU 1 refers to the turning on/off of the image pickup recording start button and the operation mode of the power saving mode or the normal mode to determine the detection accuracy of a motion vector and then determine the processing operation mode for block matching.

It is to be noted that the power consumption and the processing speed may not be detected based on the operation mode of the power saving mode or the normal mode inputted and set by the user, but the CPU 1 may detect the power consumption and the processing speed depending upon whether bus accessing to the system bus 2 is carried out more frequently than a preset level and excessively frequently or less frequently than the preset level, and then determine a detection accuracy of a motion vector to determine a processing operation mode for block matching.

<Other Examples of Selection>

As the parameters for selection from among a plurality of operation modes for block matching, not only the still/dynamic picture, motion vector detection accuracy and processing speed described above, but also the bus band to be used for the system bus, the pixel size, the size of the search range, the frame rate and so forth may be used, or a suitable combination of such parameters may be used.

[Flow of an Outline of a Noise Reduction Process of a Picked Up Image]

<Still Picture Pickup Mode>

A noise reduction process by superposition of images in the still picture image pickup mode by the image pickup apparatus of the present embodiment having the configuration described above is illustrated in flow charts of FIGS. 36 and 37. Steps of the flow charts of FIGS. 36 and 37 are executed by the image superposition unit 17 under the control of the CPU 1 and the control section 165 of the motion detection and motion compensation unit 16 which is controlled by the CPU 1.

Figure 36:
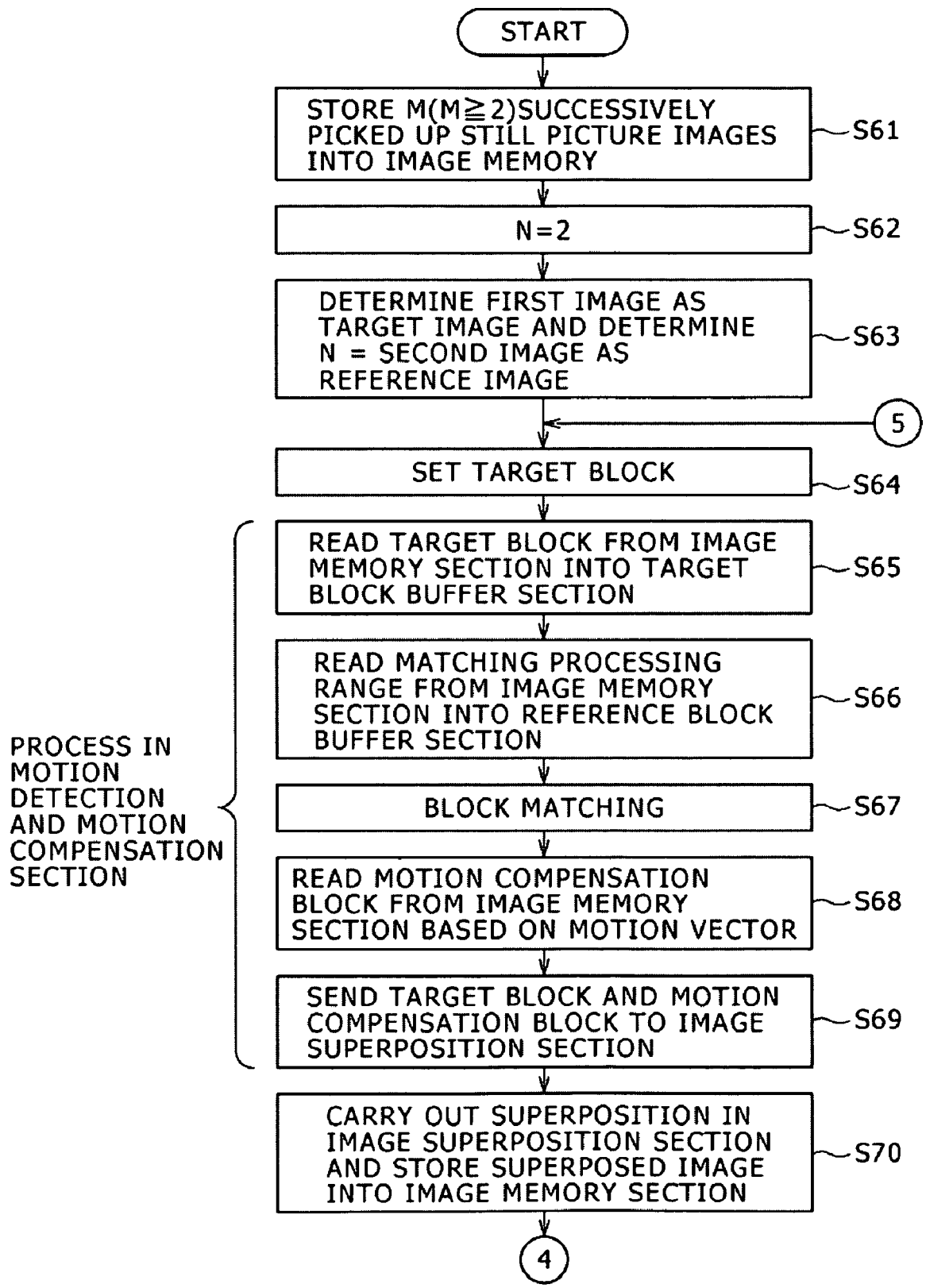
FIGS. 36 and 37 are flow charts illustrating an example of a still picture noise reduction process used in the image processing method according to an embodiment.
Figure 37:
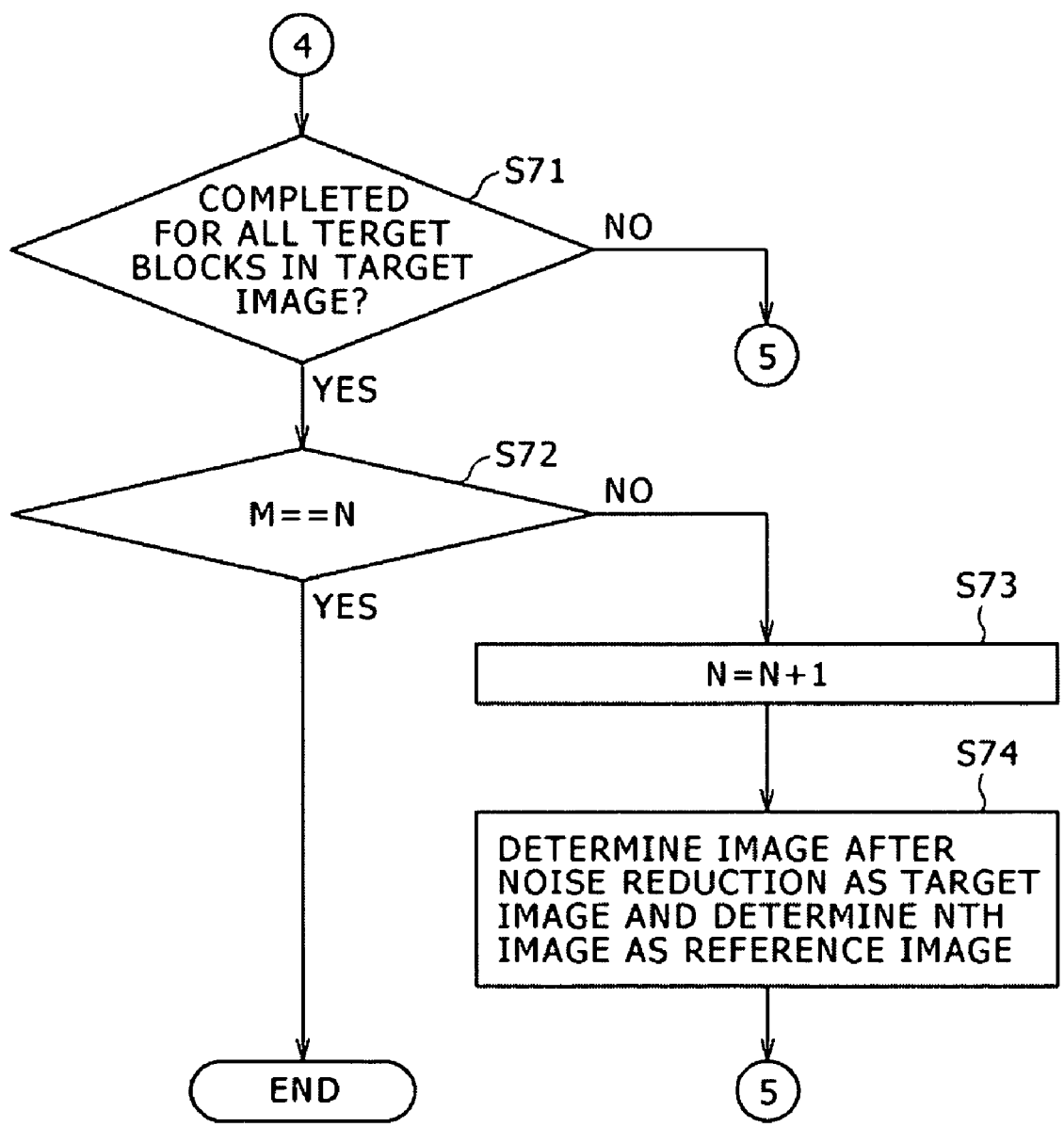

Referring first to FIG. 36, if the shutter button is depressed first, then in the image pickup apparatus of the present embodiment, high-speed image pickup of a plurality of images is carried out at a high speed under the control of the CPU 1. In the present example, the CPU 1 fetches picked up image data of M images or frames (M is an integer equal to or higher than 2) to be superposed in the still picture pickup mode and stores them into the image memory unit 4 (step S61).

Then, although the reference frame is set to an Nth (N is an integer equal to or greater than 2 but equal to or smaller than M) one in time from among the M image frames stored in the image memory unit 4, the control section 165 sets the initial value for the value N to N=2 (step S62). Then, the control section 165 sets the first image frame as a target image or target frame and sets the N=2nd image as a reference image or reference frame (step S63).

Thereafter, the control section 165 sets a target block in the target frame (step S64), and the motion detection and motion compensation unit 16 reads the target block from the image memory unit 4 into the target block buffer section 161 (step S65). Then, the control section 165 reads pixel data in the matching processing range into the reference block buffer section 162 (step S66).

Then, the control section 165 reads out a reference block in the search range from the reference block buffer section 162, and the matching processing section 163 carries out a block matching process of the operation mode selected from among a plurality of block matching processing modes in such a manner as described above (step S67).

Then, the control section 165 reads out a motion compensation block from the reference block buffer section 162 in accordance with the motion vector detected by the block matching process (step S68) and sends the motion compensation block to the image superposition unit 17 at the succeeding stage in synchronism with the target block (step S69).

Then, the image superposition unit 17 carries out superposition of the target block and the motion compensation block and stores reduced noise image data of the superposed block into the image memory unit 4. In other words, the image superposition unit 17 writes the reduced noise image data of the superposed block into the image memory unit 4 (step S70).

Then, the control section 165 decides whether or not the block matching is completed for all of the target blocks in the target frame (step S71). Then, if it is decided that the block matching process is not completed for all of the target blocks, then the processing returns to step S64, at which a next target block in the target frame is set so that the processes at steps S64 to S71 are repeated.

On the other hand, if it is decided that the block matching process is completed for all of the target blocks in the target frame, then the control section 165 decides whether or not the processing is completed for all of the reference frames to be superposed, that is, whether or not M=N (step S72).

If it is decided at step S72 that M=N is not satisfied, then the value N is incremented to N=N+1 (step S73). Then, the reduced noise image produced by the superposition at step S70 is set as a target image or target frame, and the N=N+1th image is set as a reference image or reference frame (step S74). Thereafter, the processing returns to step S64 so that the processes at the steps beginning with step S64 are repeated. In particular, where M is equal to or greater than 3, an image for all target blocks of which superposition is carried out is determined as a next target image, and the third or succeeding image is determined as a reference frame. Then, the processes described above are repeated. This is repeated until after the superposition of the Mth image is completed. Then, when M=N is decided at step S72, the processing routine is ended.

It is to be noted that image data of a reduced noise image of a result of the superposition of the M picked up images are compression coded by the still picture codec unit 18 and supplied to the recording and reproduction apparatus unit 5, by which they are recorded on the recording medium thereof.

It is to be noted that, while the noise reduction processing method of a still picture described above involves storage of image data of M images into the image memory unit 4, superposition may otherwise be carried out every time an image is picked up. In this instance, since the number of image frames to be stored into the image memory unit 4 may be only one, the memory cost can be minimized when compared with the noise reduction processing method of the processing routine of FIGS. 36 and 37 although the image pickup interval becomes longer.

<Dynamic Picture Pickup Mode>

Figure 38:
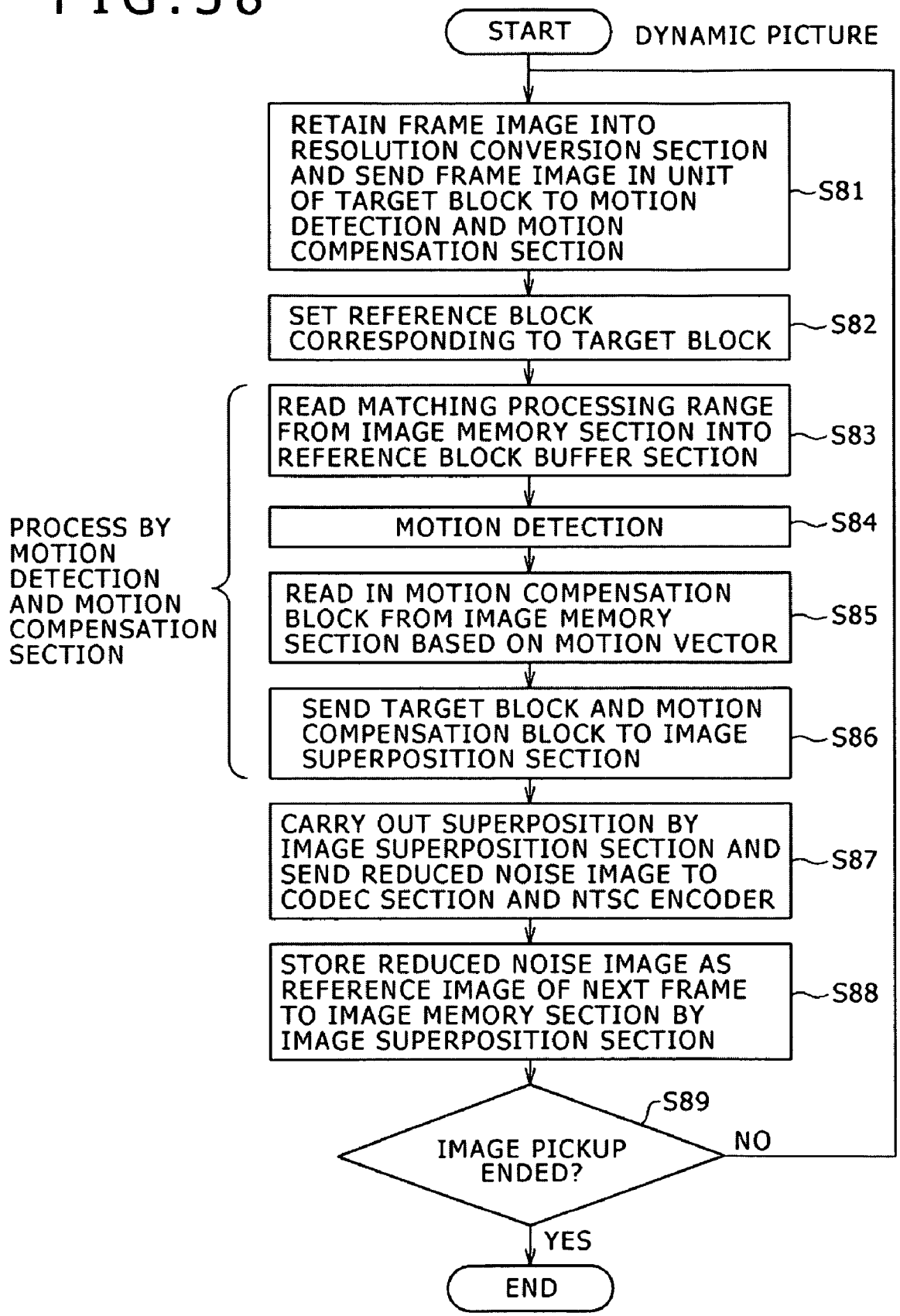
FIG. 38 is a flow chart illustrating an example of a dynamic picture noise reduction process used in the image processing method according to an embodiment.

Now, a noise reduction process by superposition of images in the dynamic picture pickup mode by the image pickup apparatus of the present embodiment is illustrated in a flow chart of FIG. 38. Also steps of the flow chart of FIG. 38 are executed under the control of the CPU 1 and the control section 165 of the motion detection and motion compensation unit 16 which is controlled by the CPU 1. If the dynamic picture recording button is depressed by the user, then the CPU 1 issues an instruction to start the process of FIG. 38 from the beginning.

In the present embodiment, the motion detection and motion compensation unit 16 has a configuration suitable to carry out a matching process in a unit of a target block. Therefore, the image correction and resolution conversion unit 15 retains a frame image and sends image data in a unit of a target block to the motion detection and motion compensation unit 16 under the control of the CPU 1 (step S81).

The image data of the target block sent to the motion detection and motion compensation unit 16 are stored into the target block buffer section 161. Then, the control section 165 sets a reference block corresponding to the target block (step S82) and reads image data within a matching processing range from the image memory unit 4 into the reference block buffer section 162 (step S83).

Then, the matching processing section 163 and the motion vector calculation section 164 carry out a block matching process of an operation mode selected from among the plural different block matching processing modes in such a manner as described hereinabove (step S84).

Then, the control section 165 reads out image data of the motion compensation block from the reference block buffer section 162 in accordance with the motion vector calculated at step S84 (step S85) and sends the read out image data to the image superposition unit 17 at the succeeding stage in synchronism with the target block (step S86).

The image superposition unit 17 carries out superposition of the target block and the motion compensation block. Then, the image superposition unit 17 outputs image data of a reduced noise image of an object of the superposition to the monitor display 6 through the NTSC encoder 20 to carry out dynamic picture recording monitoring and sends the image data to the monitor display 6 through the dynamic picture codec unit 19 so that the image data are recorded on the recording medium (step S87).

The image superposed by the image superposition unit 17 is stored into the image memory unit 4 so that it becomes a reference frame with respect to a next frame (target frame) (step S88).

Then, the CPU 1 decides whether or not a dynamic picture recording stopping operation is carried out by the user (step S89). If it is decided that a dynamic picture recording stopping operation is not carried out by the user, then the CPU 1 issues an instruction to return the processing to step S81 so as to repeat the processes at the steps beginning with step S81. On the other hand, if it is decided at step S89 that a dynamic picture recording stopping operation is carried out by the user, then the CPU 1 ends the processing routine.

While, in the processing routine of the dynamic picture noise reduction process described above, an immediately preceding image is used as a reference frame, an image of a further preceding frame may be used as a reference frame. Or, images of an immediately preceding frame and a second preceding frame may be stored into the image memory unit 4 such that one of the image frames is selectively determined as a reference frame based on contents of the image information of the two image frames.

By using such means, procedure and system configuration as described above, a still picture noise reduction process and a dynamic picture noise reduction process can be carried out by one common piece of hardware for a block matching process.

As described above, in the still picture noise reduction process, a plurality of images are picked up at a high speed, and image data of the plural images are stored into the image memory unit 4. Then, the motion detection and motion compensation unit 16 uses the images stored in the image memory unit 4 to carry out a block matching process. Flows of image data upon addition during image pickup when the still picture noise reduction process is carried out are indicated by broken lines in FIGS. 39 to 42.

Figure 39:
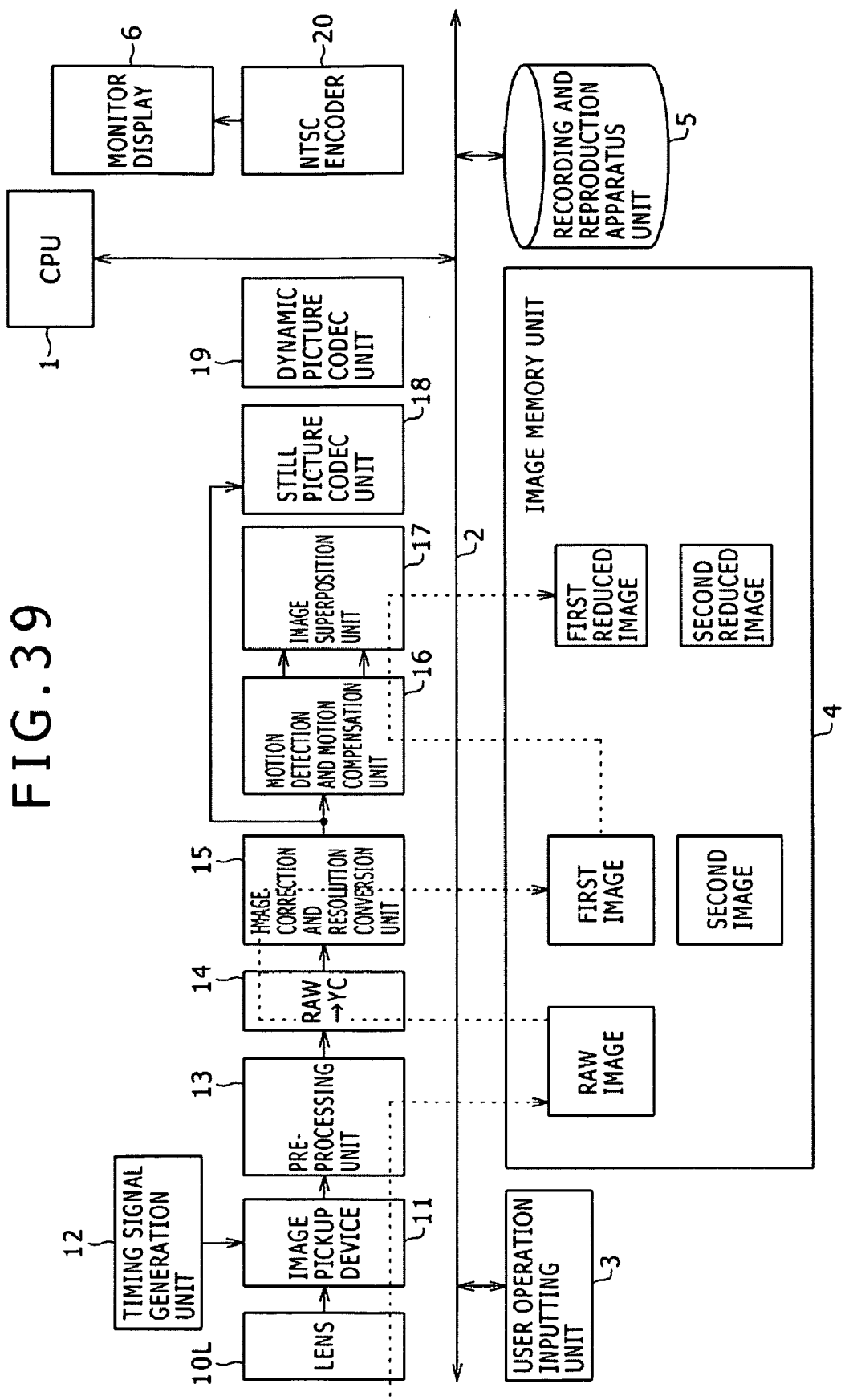
FIGS. 39 to 42 are block diagrams illustrating flows of image data in the still picture noise reduction process used in the image processing method according to an embodiment.

In particular, as seen in FIG. 39, a picked up image from the image pickup device 11 is subjected first to pre-processing such as sensor correction by the pre-processing unit 13 and then stored in a raw signal form, which is a data form before a cameral signal process is carried out, into the image memory unit 4.

Thereafter, the picked up image is read out from the image memory unit 4 and converted from a raw signal into YC image data of a YC image format by the data conversion unit 14. The YC image data are subjected to image correction, resolution conversion and so forth by the image correction and resolution conversion unit 15 and are then written in the YC image format into the image memory unit 4. Upon high-speed consecutive shooting, the procedure described is carried out repetitively by a plural number of times corresponding the number of images, and picked up image data of the number of images are stored and retained in the YC image format into and in the image memory unit 4.

The image data of the YC image format written in the image memory unit 4 are supplied through the motion detection and motion compensation unit 16 to the image superposition unit 17, in which they are reduced by the reduction face production section 174 shown in FIG. 22.

Figure 40:
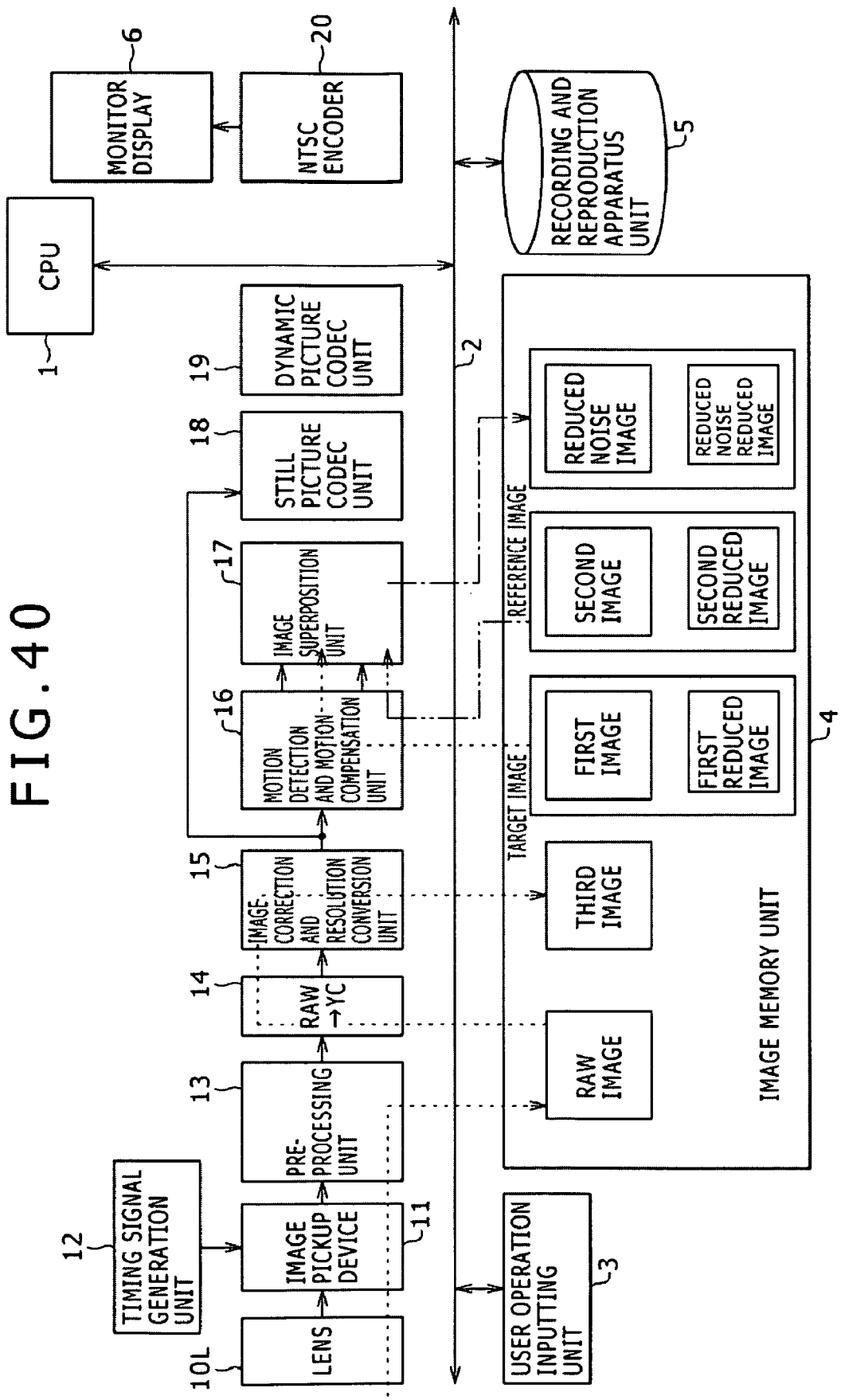
Figure 41:
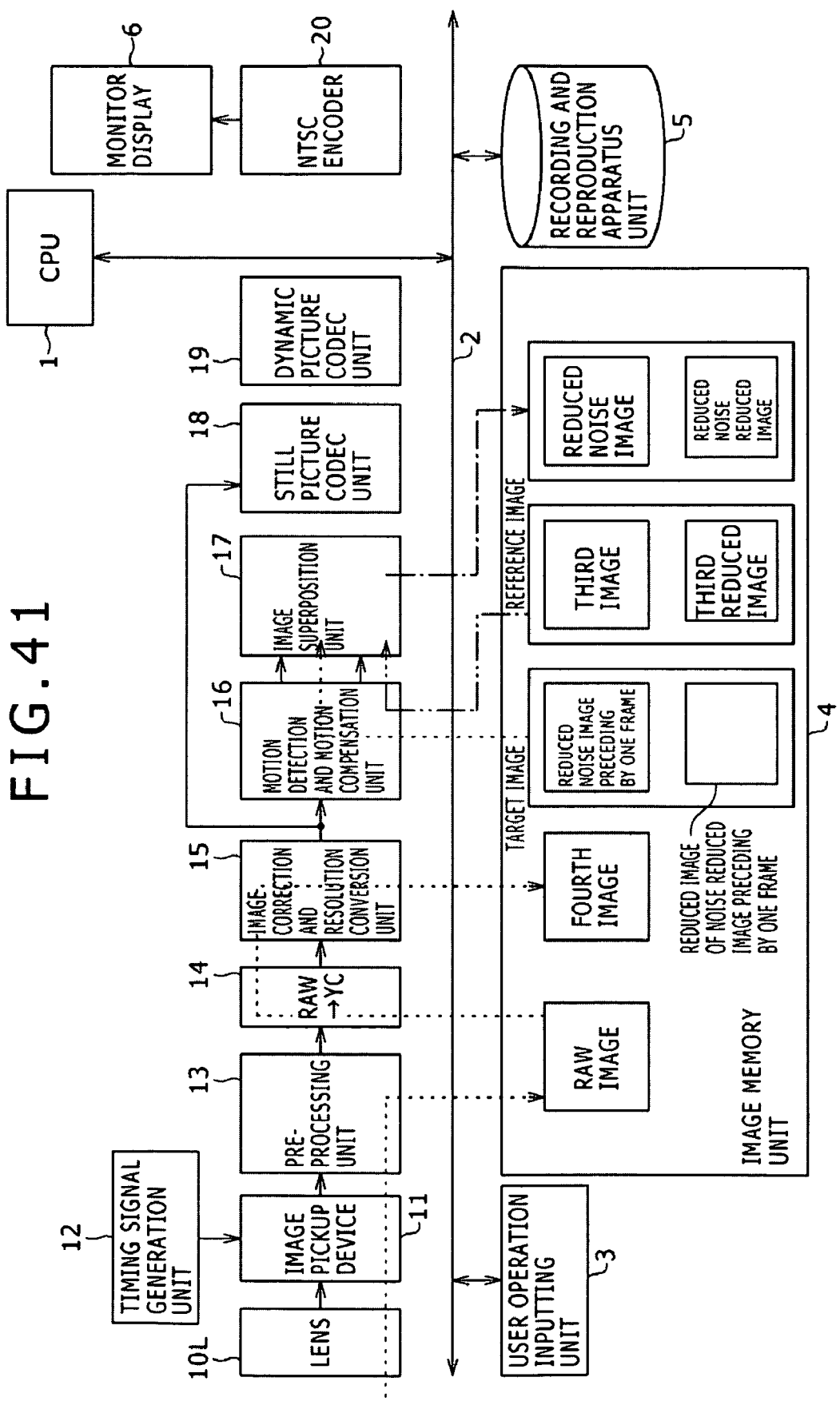

Thereafter, as seen in FIG. 40, in parallel to a fetching process of a third image from the image pickup device 11, detection of a motion vector and production of a motion compensation block by hierarchical block matching are carried out by the motion detection and motion compensation unit 16 using the first image as a target image and using the second image as a reference image. Then, the thus produced motion compensation block is used to carry out an image superposition process by the image superposition unit 17.

Figure 42:
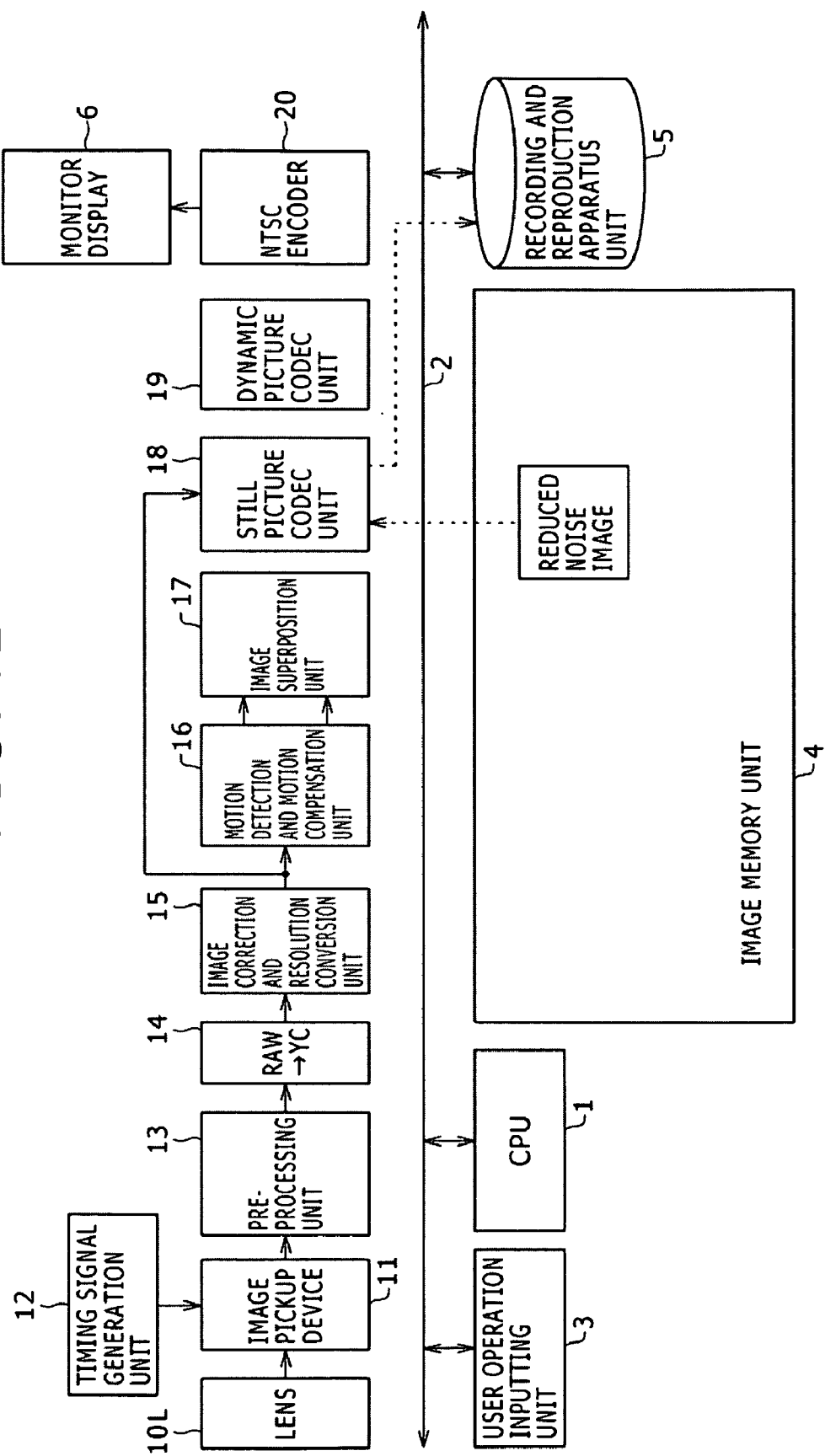

Then, when the superposition of the first and second picked up images is completed, next motion vector detection and image superposition are carried out using the superposed image or reduced noise image as a next target image and using the third image as a reference image. The processes described are repeated for the plural number of picked up images picked up successively to obtain one still picture reduced noise image. The resulting image data of the still picture reduced noise image are compressed, in the present example, in accordance with the JPEG system by the still picture codec unit 18 as seen in FIG. 42 and stored into the recording medium of the recording and reproduction apparatus unit 5.

Figure 43:
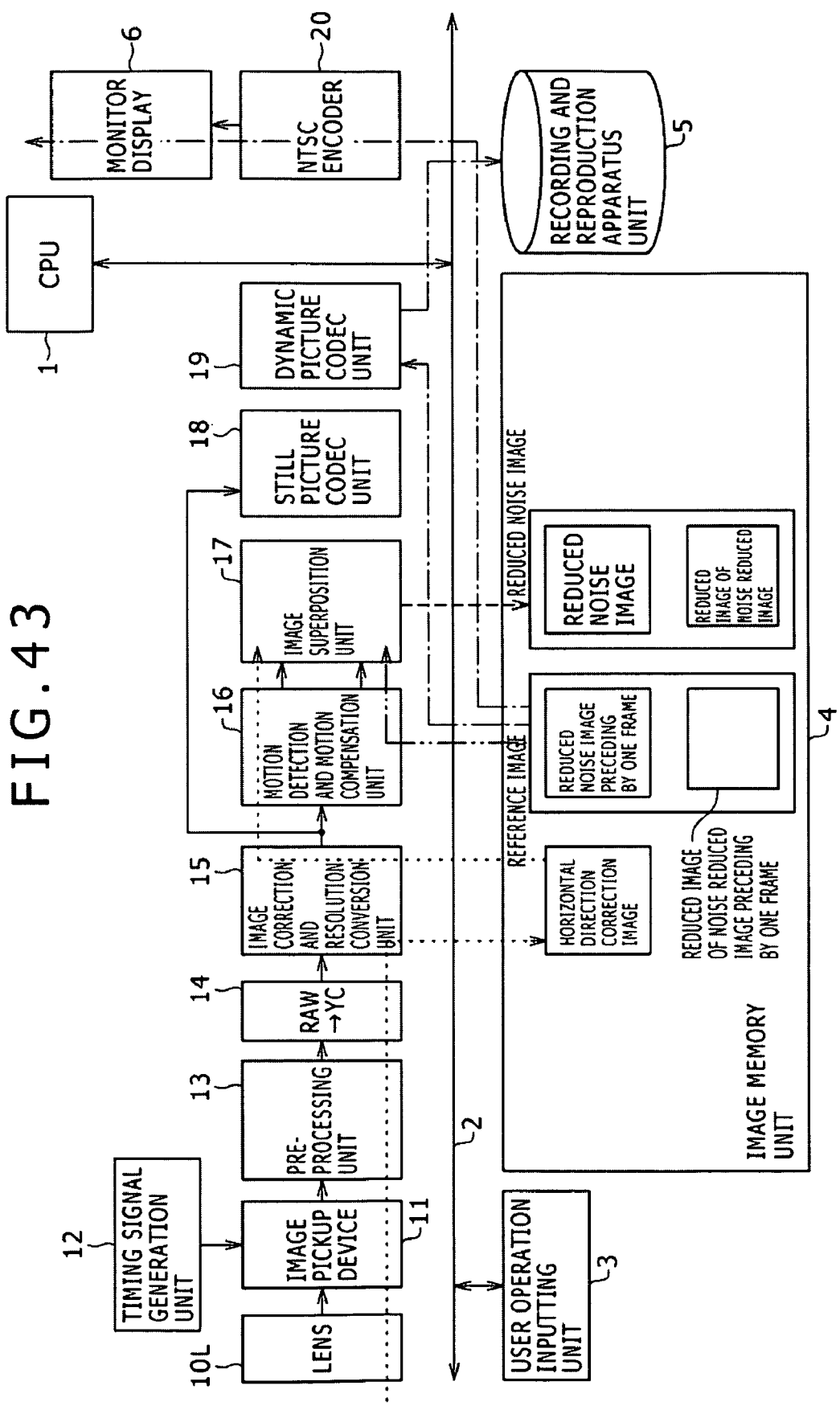
FIGS. 43 and 44 are block diagrams illustrating flows of image data in the dynamic picture noise reduction process used in the image processing method according to an embodiment.

Now, flows of image data in the dynamic picture noise reduction process are described with reference to FIGS. 43 and 44.

In the dynamic picture noise reduction process, a target block is sent on the real time basis from the image correction and resolution conversion unit 15 to the motion detection and motion compensation unit 16. As seen in FIG. 43, the motion detection and motion compensation unit 16 stores the target block sent thereto from the image correction and resolution conversion unit 15 into the target block buffer section 161, reads out a block matching processing range corresponding to the target block from the image memory unit 4 and stores the block matching processing range into the reference block buffer section 162.

Then, the motion detection and motion compensation unit 16 reads out the target block from the target block buffer section 161 and reference blocks from the block matching processing range, and carries out the block matching process described above to carry out motion vector detection and production of a motion compensation block. Then, the motion detection and motion compensation unit 16 supplies the motion compensation block and the target block to the image superposition unit 17.

The image superposition unit 17 successively superposes the received target block and motion compensation blocks. Then, the image superposition unit 17 places a reduced noise image obtained by the image superposition into the image memory unit 4 as seen in FIG. 43.

Figure 44:
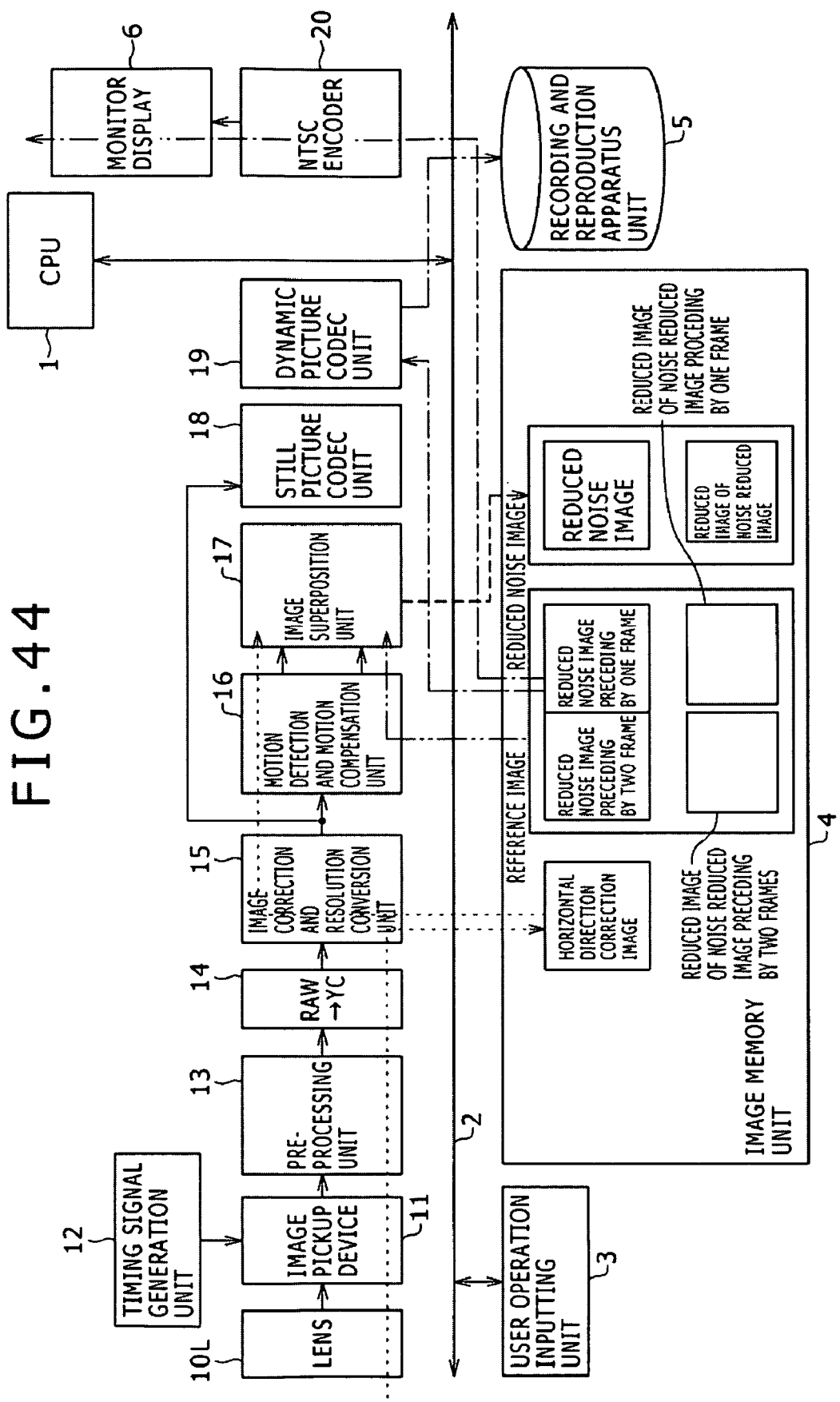

As seen in FIG. 44, the reduced noise image placed in the image memory unit 4 is read into the dynamic picture codec unit 19 in the next frame (reduced noise frame in the immediately preceding frame), and compressed and stored into the recording medium of the recording and reproduction apparatus unit 5. Further, the reduced noise image placed in the image memory unit 4 (reduced noise image in the immediately preceding frame) is simultaneously read in also from the NTSC encoder 20, and also monitor outputting to the monitor display 6 is carried out.

In the dynamic picture noise reduction process, the processes described above are repeated for each picked up image.

It is to be noted here that, while reference images for one frame are used, it is otherwise possible to retain reference images for a plurality of frames as seen in FIG. 44 such that images having a higher correlation are used.

Further, in the dynamic picture noise reduction process, since importance is attached to the real-time property, such production and storage of a reduction face target image into the image memory unit 4 as in the still picture noise reduction process is not carried out, but a reduction face target block is produced by the reduction processing portion 1613 in the target block buffer section 161 shown in FIG. 20 and stored as it is into the reduction face buffer 1612.

[Example of a Flow of the Block Matching Process]

Now, a flow of processes in the plural operation modes of block matching described above is described. As regards the reduction face matching processing mode and the reduction face matching+interpolation processing mode, the flow of processes is described above in regard to the flows of processes in the description of the three examples of the motion vector calculation section 164. Therefore, examples of operation in the hierarchical matching+interpolation processing mode 1 and the hierarchical matching+interpolation processing mode 2 are described below. It is to be noted that the hierarchical matching processing mode 1 and the hierarchical matching processing mode 2 correspond to processing operations which do not involve an interpolation process in the hierarchical matching+interpolation processing mode 1 and the hierarchical matching+interpolation processing mode 2, respectively.

Figure 45:
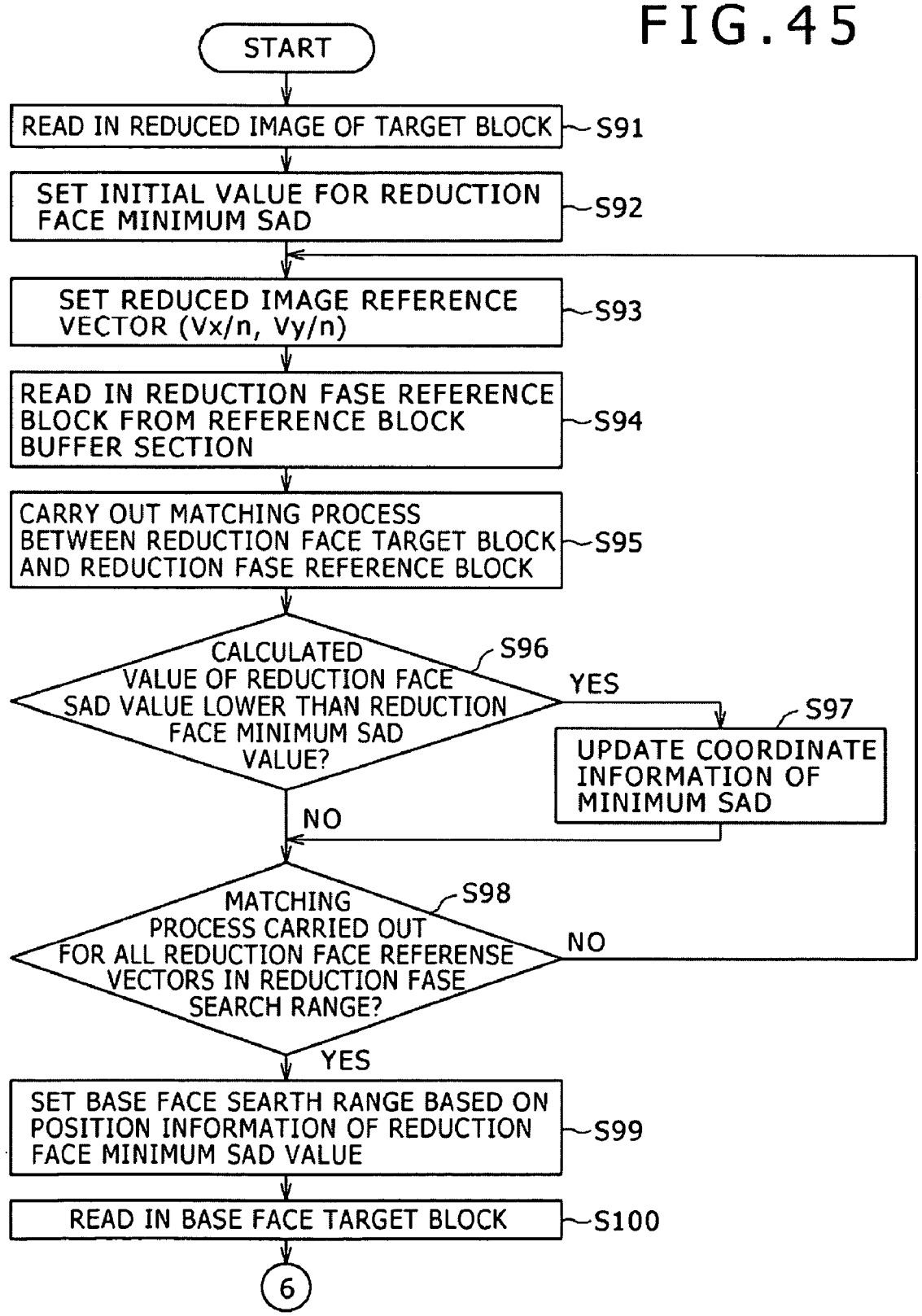
FIGS. 45 and 46 are flow charts illustrating an example of a hierarchical block matching processing mode used in the image processing method according to an embodiment.
Figure 46:
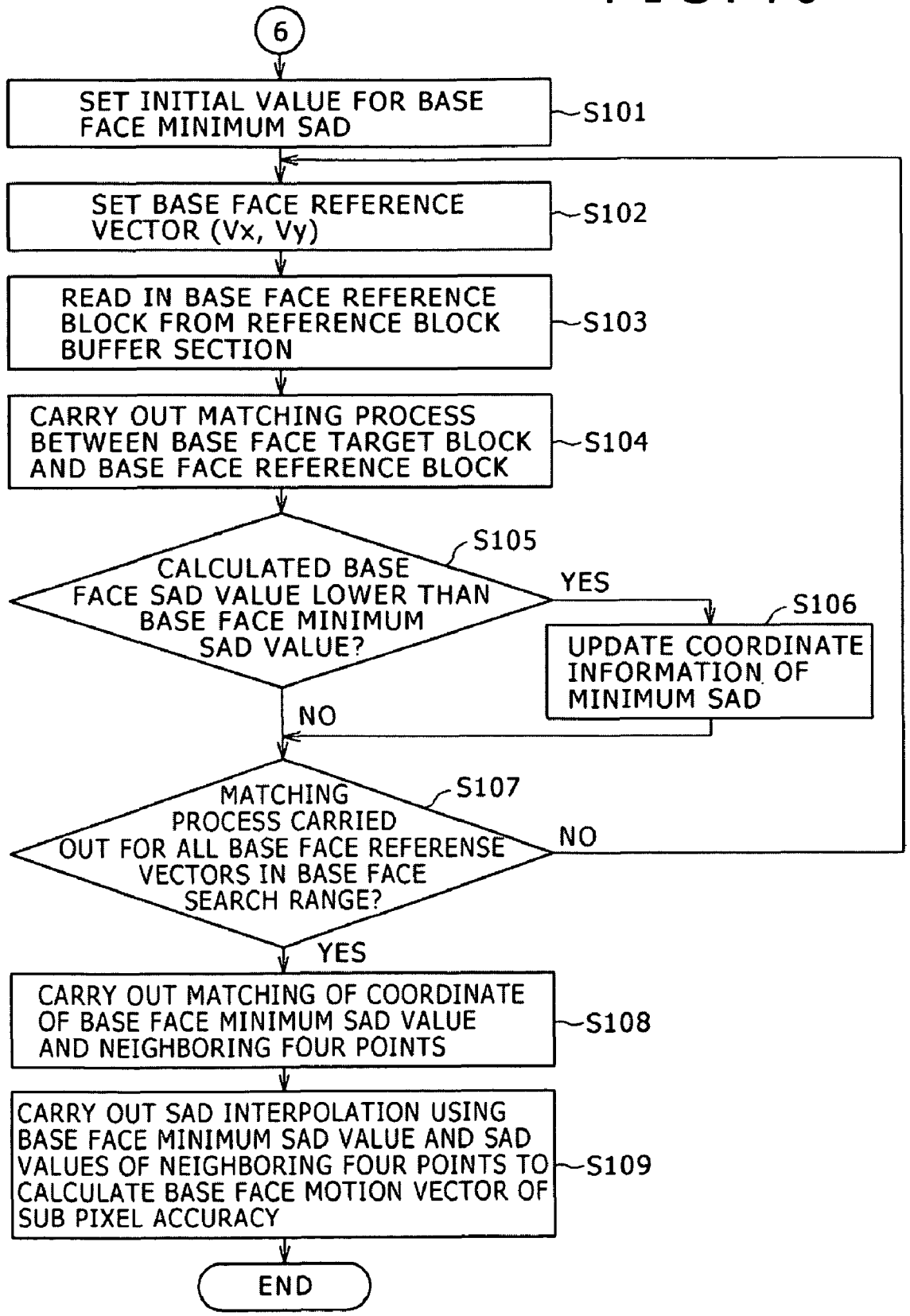

FIGS. 45 and 46 illustrate an example of operation in the hierarchical matching+interpolation processing mode 1 by the motion detection and motion compensation unit 16 in the present embodiment.

It is to be noted that, although the flow of processes illustrated in FIGS. 45 and 46 partly overlaps with the flows of the examples of processes of the matching processing section 163 and motion vector calculation section 164 described hereinabove, description of the flow is given in order to facilitate understanding of operation of the image pickup apparatus of the present embodiment. Further, the example of the flow of processes described corresponds to a case wherein the third example of the hardware configuration of the motion detection and motion compensation unit 16 described hereinabove is used.

Referring first to FIG. 45, the motion detection and motion compensation unit 16 reads in a reduced image of a target block, that is, a reduction face target block (step S91). Then, the motion detection and motion compensation unit 16 sets the initial value for the reduction face minimum SAD value as the initial value for the minimum SAD value Smin of the SAD value retention portion 1643 of the motion vector calculation section 164 (step S92). As the initial value for the reduction face minimum SAD value Smin, for example, a maximum value of the difference of the pixels is set.

Next, the matching processing section 163 sets a reduction face search range and sets a reduction face reference vector (Vx/n, Vy/n: 1/n is a reduction ratio) in the thus set reduction search range to set a reduction face reference block position for calculation of an SAD value (step S93). Then, the matching processing section 163 reads in pixel data of the thus set reduction face reference block from the reference block buffer section 162 (step S94). Thereafter, the matching processing section 163 determines the sum total of absolute values of differences of the pixel data of the reduction face target block and the reduction face reference block, that is, a reduction face SAD value. Then, the matching processing section 163 signals the determined reduction face SAD value to the motion vector calculation section 164 (step S95).

In the motion vector calculation section 164, the SAD value comparison portion 1642 compares the reduction face SAD value Sin calculated by the matching processing section 163 and the reduction face minimum SAD value Smin retained in the SAD value retention portion 1643 with each other to decide whether or not the calculated reduction face SAD value Sin is lower than the reduction face minimum SAD value Smin retained in the SAD value retention portion 1643 till then (step S96).

If it is decided at step S96 that the calculated reduction face SAD value Sin is lower than the reduction face minimum SAD value Smin, then the processing advances to step S97, at which the reduction face minimum SAD value Smin and the position information of the same retained in the SAD value retention portion 1643 are updated.

In particular, the SAD value comparison portion 1642 sends information DET of a result of the comparison that the calculated reduction face SAD value Sin is lower than the reduction face minimum SAD value Smin to the SAD value writing portion 1641. Consequently, the SAD value writing portion 1641 sends the calculated reduction face SAD value Sin and the position information or reduction face reference vector of the same as new information of the reduction face minimum SAD value Smin to the SAD value retention portion 1643. The SAD value retention portion 1643 updates the reduction face minimum SAD value Smin and the position information retained therein with the received new reduction face SAD value Sin and position information of the reduction face SAD value Sin.

The processing advances from step S97 to step S98. On the other hand, if it is decided at step S96 that the calculated reduction face SAD value Sin is higher than the reduction face minimum SAD value Smin, then the processing advances directly to step S98 without carrying out the updating process of the retained information at step S97.

At step S98, the matching processing section 163 decides whether or not the matching process is completed for all of the positions or reduction face reference vectors of the reduction face reference blocks in the reduction face search range. If it is decided that a reduction face reference block which has not been processed as yet still remains in the reduction face search range, then the processing returns to step S93 to repeat the processes at the steps beginning with step S93.

On the other hand, if it is decided at step S98 that the matching process is completed for all of the positions or reduction face reference vectors of the reduction face reference blocks in the reduction face search range, then the matching processing section 163 receives the position information or reduction face motion vector of the reduction face minimum SAD value Smin from the SAD value retention portion 1643. Then, the matching processing section 163 sets a base face target block to a position centered at position coordinates indicated in the base face target frame by a vector obtained by multiplying the received reduction face motion vector by a reciprocal number to the reduction ratio, that is, by n. Further, the matching processing section 163 sets a base face search range as a comparatively small range centered at the position coordinates indicated by the n-multiplied vector in the base face target frame (step S99). Thereafter, the matching processing section 163 reads in image data of the base face target block from the target block buffer section 161 (step S100).

Then, the matching processing section 163 sets an initial value for the base face minimum SAD value SSmin as an initial value for the minimum SAD value of the SAD value retention portion 1643 of the motion vector calculation section 164 (step S101 in FIG. 46). The initial value for the base face minimum SAD value SSmin may be, for example, a maximum value of the difference between pixels.

Then, the matching processing section 163 sets a base face reference vector (Vx, Vy) in the base face search range set at step S99 to set a base face reference block position for calculation of the SAD value (step S102). Then, the matching processing section 163 reads in pixel data of the set base face reference block from the reference block buffer section 162 (step S103). Then, the matching processing section 163 determines the sum total of absolute values of differences of the pixel data between the base face target block and the base face reference block, that is, a base face SAD value, and signals the determined base face SAD value to the motion vector calculation section 164 (step S104).

In the motion vector calculation section 164, the SAD value comparison portion 1642 compares the base face SAD value Sin calculated by the matching processing section 163 and the base face minimum SAD value SSmin retained in the SAD value retention portion 1643 with each other to decide whether or not the calculated base face SAD value Sin is lower than the base face minimum SAD value SSmin retained till then (step S105).

If it is decided at step S105 that the calculated base face SAD value Sin is lower than the base face minimum SAD value SSmin, then the processing advances to step S106, at which the base face minimum SAD value SSmin and the position information of the same retained in the SAD value retention portion 1643 are updated.

In particular, the SAD value comparison portion 1642 sends information DET of a result of the comparison that the calculated base face SAD value Sin is lower than the base face minimum SAD value SSmin to the SAD value writing portion 1641. Consequently, the SAD value writing portion 1641 sends the calculated base face SAD value Sin and the position information or reference vector of the same as new information of the base face minimum SAD value SSmin to the SAD value retention portion 1643. The SAD value retention portion 1643 updates the base face minimum SAD value SSmin and the position information of the same retained therein with the received new base face SAD value Sin and position information of the same.

The processing advances from step S106 to step S107. On the other hand, if it is decided at step S105 that the calculated base face SAD value Sin is higher than the base face minimum SAD value SSmin, then the processing advances directly to step S107 without carrying out the updating process of the retained information at step S106.

At step S107, the matching processing section 163 decides whether or not the matching process is completed for all of the positions or base face reference vectors of the base face reference blocks in the base face search range. If it is decided that a base face reference block which has not been processed as yet still remains in the base face search range, then the processing returns to step S102 to repeat the processes at the steps beginning with step S102.

On the other hand, if it is decided at step S107 that the matching process is completed for all of the positions or base face reference vectors of the base face reference blocks in the base face search range, then the matching processing section 163 receives the position information or base face motion vector of the base face minimum SAD value SSmin from the SAD value retention portion 1643 and carries out re-calculation of the base face SAD value regarding the base face reference blocks at the positions of the neighboring four points. Then, the matching processing section 163 supplies the re-calculated base face neighboring SAD values SSx1, SSx2 and SSy1, SSy2 to the SAD value retention portion 1643 through the SAD value writing portion 1641 so as to be retained into the SAD value retention portion 1643 (step S108).

Then, in the motion vector calculation section 164, the X direction (horizontal direction) neighboring value extraction portion 1644 and the Y direction (vertical direction) neighboring value extraction portion 1645 read out the detected base face minimum SAD value SSmin and the base face neighboring SAD values SSx1, SSx2 and SSy1, SSy2 as well as the position information of them retained in the SAD value retention portion 1643 and send the read out SAD values and position information to the quadratic curve approximation interpolation processing portion 1646. The quadratic curve approximation interpolation processing portion 1646 receives the SAD values and position information sent thereto and carries out interpolation based on a quadratic curve twice in the X direction and the Y direction to calculate a high-accuracy base face motion vector of the sub pixel accuracy in such a manner as described hereinabove (step S109). The block matching process of the example of the hierarchical matching+interpolation processing mode 1 for one reference frame is completed therewith.

It is to be noted that, in the case of the hierarchical matching processing mode 1, when it is decided at step S107 that the matching process is completed for all of the positions or base face reference vectors of all of the base face reference blocks in the base face search range, the processes at steps S108 and S109 are not carried out. Instead, a base face motion vector is detected from within the position information of the base face minimum SAD value SSmin from the SAD value retention portion 1643 and is outputted to the control section 165.

Figure 47:
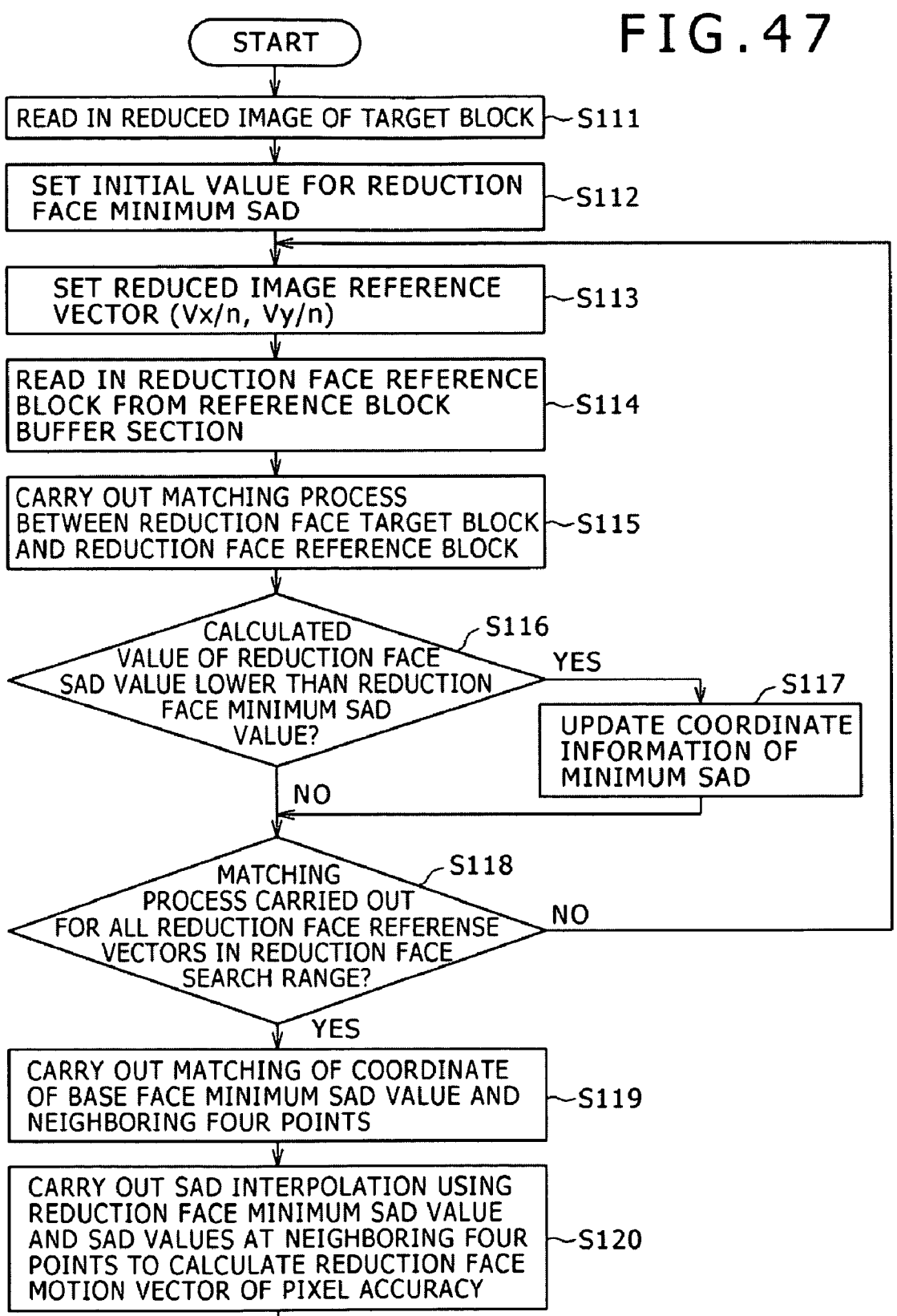
FIGS. 47 and 48 are flow charts illustrating another example of the hierarchical block matching processing mode used in the image processing method according to an embodiment.
Figure 48:
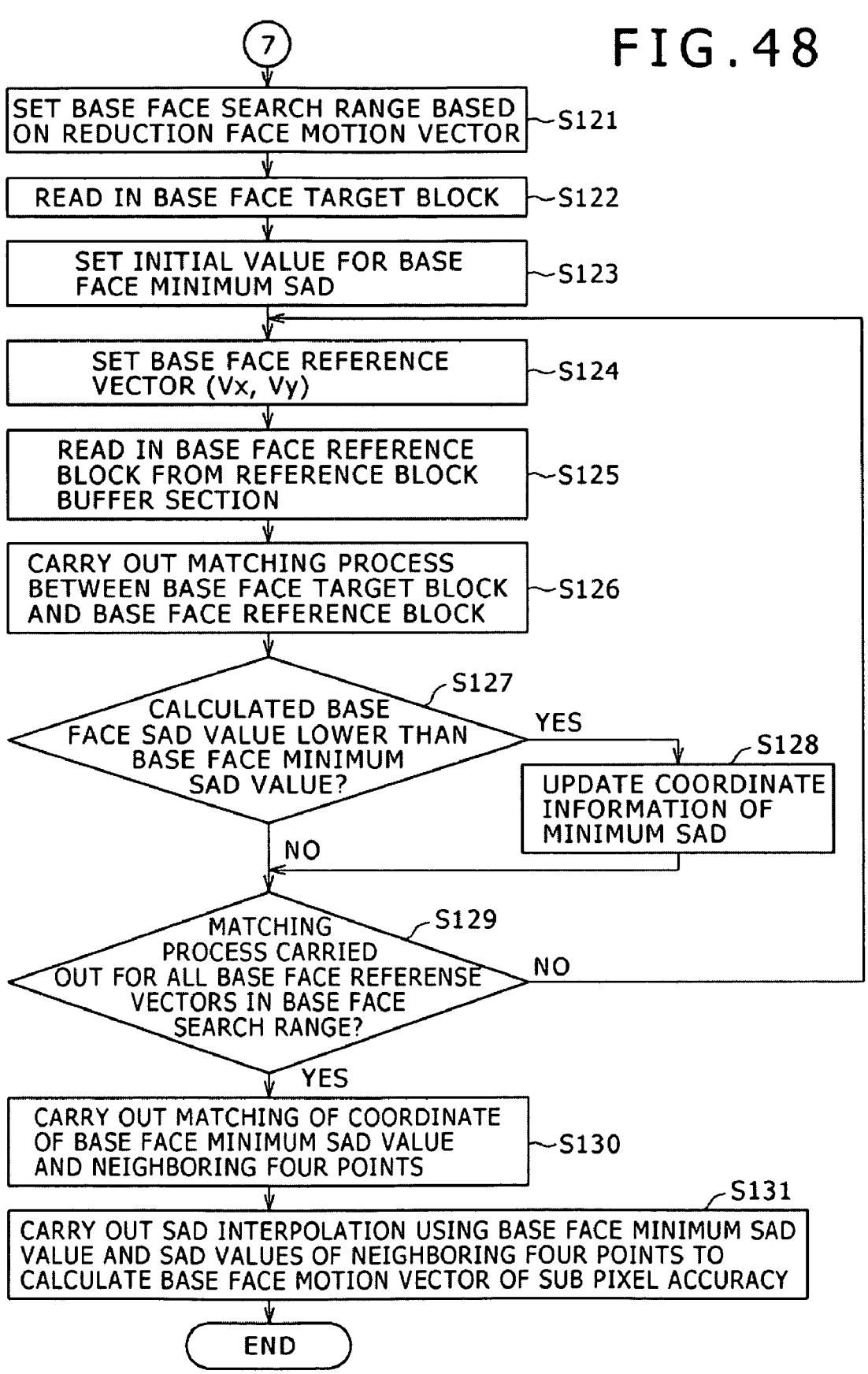
Figure 51A:
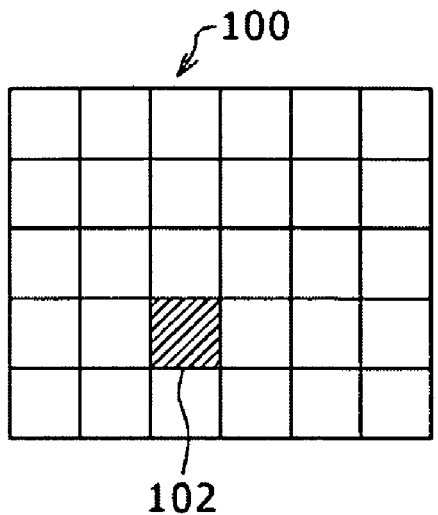
Figure 51B:
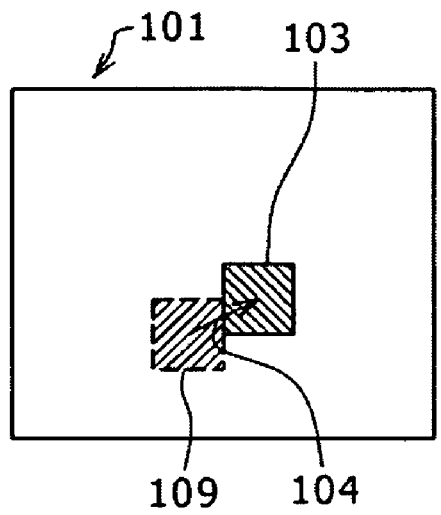
Figure 52:
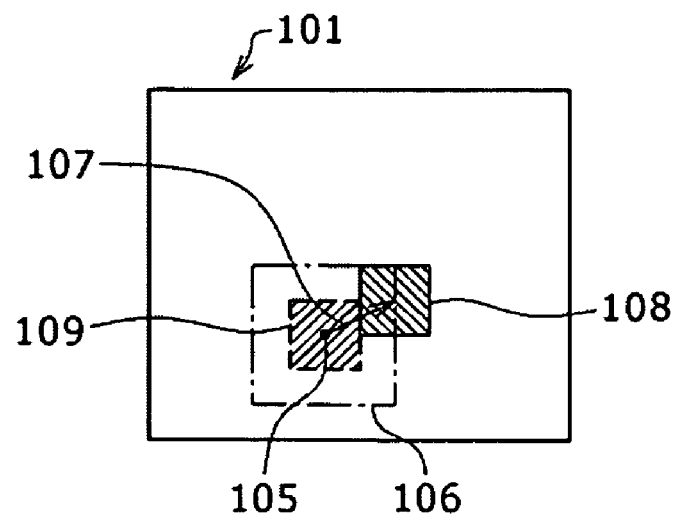
Figure 53:
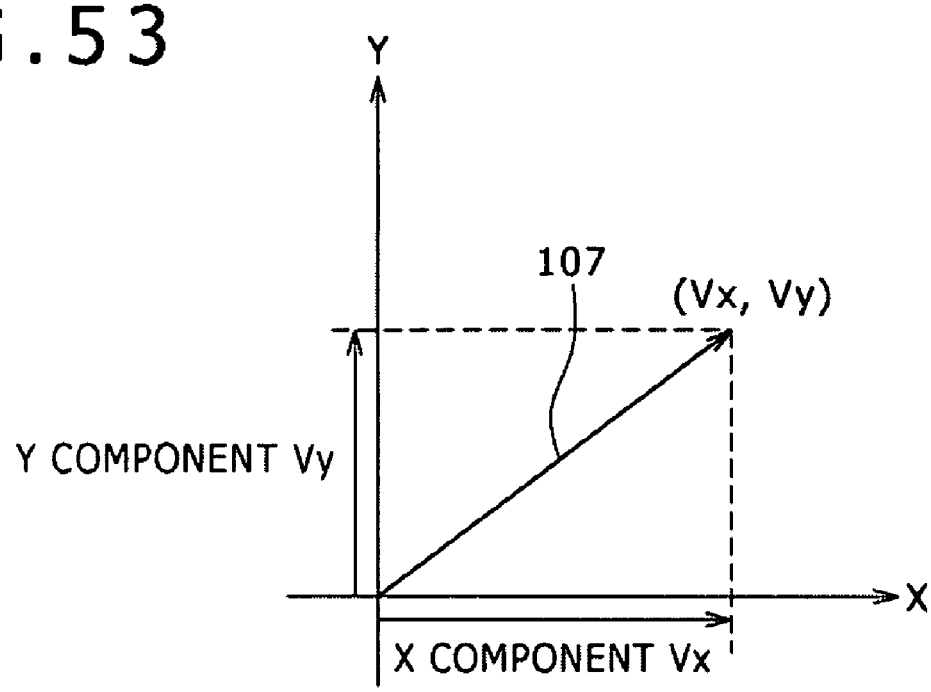
Figure 54:
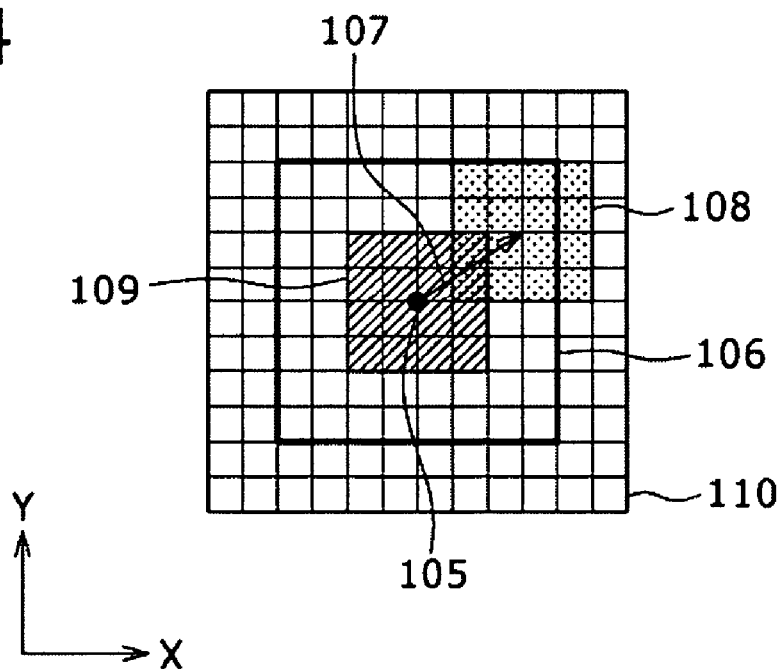
Figure 55:
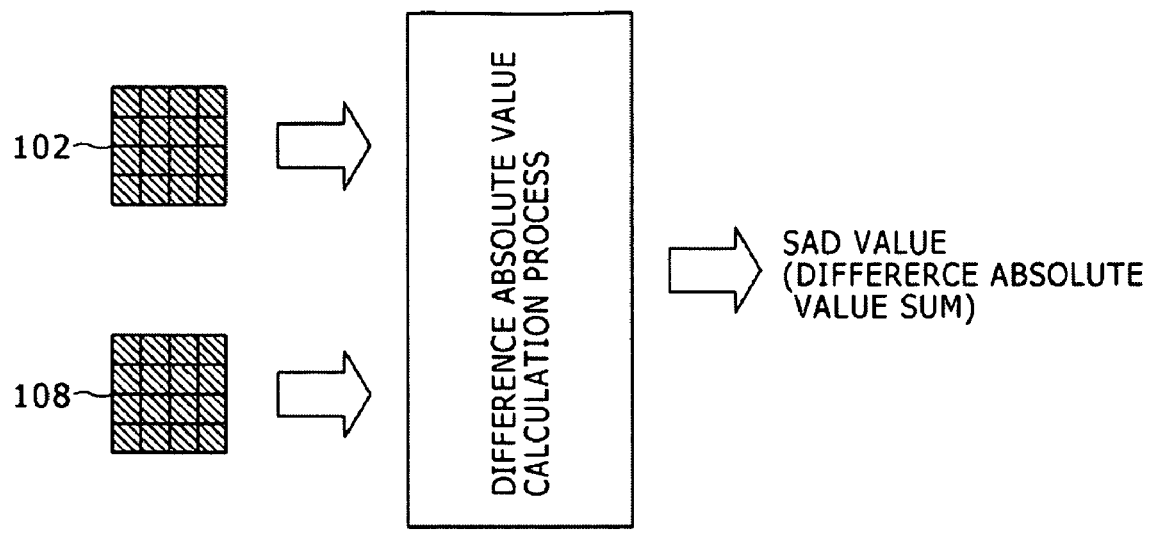
Figure 56:
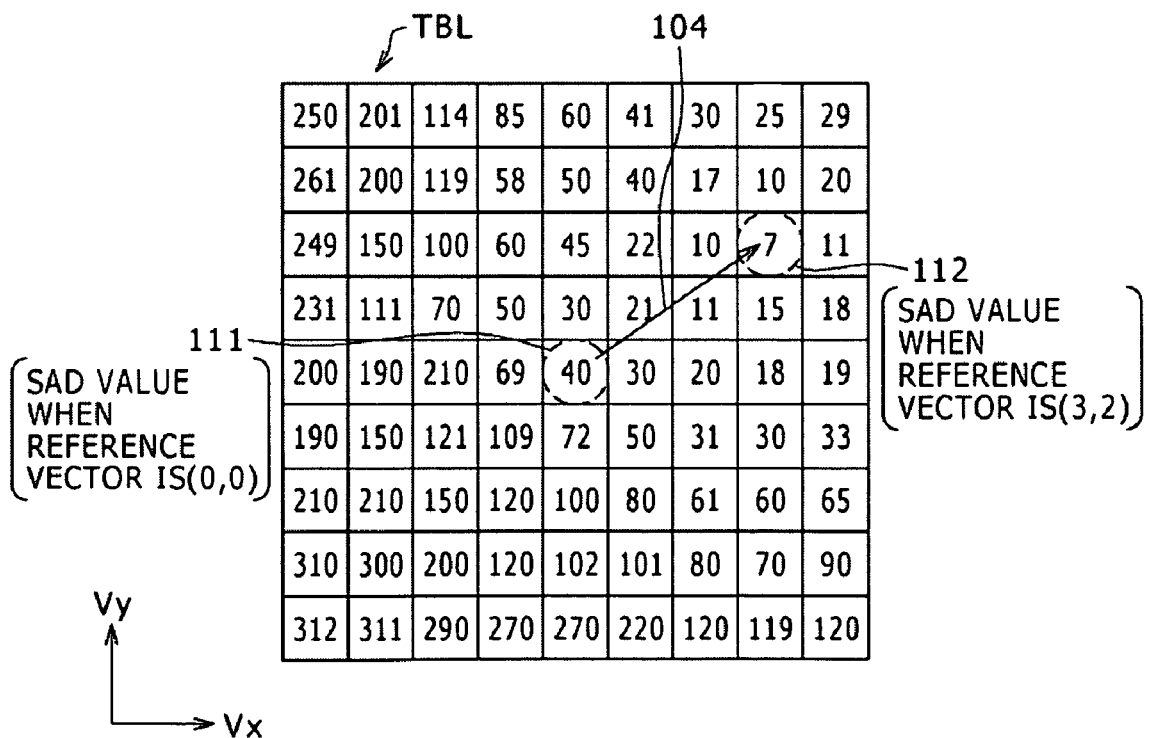

An example of operation in the hierarchical matching+interpolation processing mode 2 is illustrated in FIGS. 47 and 48. Also in the present operation example, the third example is used as an example of a hardware configuration of the motion detection and motion compensation unit 16.

The processing operations at steps S111 to S117 of FIG. 47 are quite same as those at steps S91 to S97 of FIG. 45 described hereinabove, respectively. Then, in the example of FIG. 47, if it is decided at step S118 that the matching is not carried out for all of the reduction face reference vectors in the reduction face search range, then the processing returns to step S113 to repeat the processes at the steps beginning with step S13.

On the other hand, if it is decided at step S118 that the matching is completed for all of the reduction face reference vectors in the reduction face search range, then the position information or reduction face motion vector of the reduction face minimum SAD value Smin from the SAD value retention portion 1643 is received, and re-calculation of the reduction face SAD value is carried out for the reduction face reference blocks at the positions of the neighboring four points. Then, the re-calculated reduction face neighboring SAD values Sx1, Sx2 and Sy1, Sy2 are supplied to the SAD value retention portion 1643 through the SAD value writing portion 1641 so as to be retained into the SAD value retention portion 1643 (step S19).

Then, in the motion vector calculation section 164, the X direction (horizontal direction) neighboring value extraction portion 1644 and the Y direction (vertical direction) neighboring value extraction portion 1645 read out the detected reduction face minimum SAD value Smin and the neighboring reduction face SAD values Sx1, Sx2 and Sy1, Sy2 as well as the position information of them retained in the SAD value retention portion 1643 and send the read out SAD values and position information to the quadratic curve approximation interpolation processing portion 1646. The quadratic curve approximation interpolation processing portion 1646 receives the SAD values and position information sent thereto and carries out interpolation based on a quadratic curve twice in the X direction and the Y direction to calculate a high-accuracy reduction face motion vector of the pixel accuracy in such a manner as described above (step S120).

Then, the quadratic curve approximation interpolation processing portion 1646 sets a base face target block at a position centered at position coordinates indicated in the base face target frame by a vector obtained by multiplying the high-accuracy reduction face motion vector calculated at step S120 by a reciprocal number to the reduction ratio, that is, by n. Further, the quadratic curve approximation interpolation processing portion 1646 sets a base face search range and a base face matching processing range as comparatively small ranges centered at the position coordinates indicated by the n-multiplied vector in the base face target frame (step S121 of FIG. 48). Then, the quadratic curve approximation interpolation processing portion 1646 reads in pixel data of the base face target block from the target block buffer section 161 (step S122).

Then, an initial value for the base face minimum SAD value SSmin is set as an initial value for the minimum SAD value of the SAD value retention portion 1643 of the motion vector calculation section 164 (step S123). The processes at steps S123 to step S131 are quite same at those at steps S101 to S109 of FIG. 46 described hereinabove, respectively.

It is to be noted that, in the case of the hierarchical matching processing mode 2, when it is decided at step S129 that the matching process is completed for all of the positions or base face reference vectors of the base face reference blocks in the base face search range, the processes at steps S130 and S131 are not carried out. Instead, a base face motion vector is detected from within the position information of the base face minimum SAD value SSmin from the SAD value retention portion 1643 and is outputted to the control section 165.

Now, effects of the image processing method which uses the hierarchical block matching method in the present embodiment are described in connection with particular examples.

FIGS. 49A to 49F show a particular example of a reference block, a search range and a matching processing range on a base face and a reduction face used in the description of the embodiment. In the example illustrated in FIGS. 49A to 49F, the value n of the reduction ratio 1/n in the horizontal direction and the vertical direction is set to n=4.

A comparative example is shown in FIGS. 49A and 49B. In the comparative example, for example, a reference block 108 which does not use a reduction image has a size of horizontal×vertical=32×32 pixels, and a search range 106 has a size of horizontal×vertical=144×64 pixels. Further, a matching processing range 110 has a size of horizontal×vertical=176×96 pixels.

Consequently, on a reduction face reduced to 1/n=1/4 in the horizontal direction and the vertical direction in the embodiment described above, as seen in FIGS. 49C and 49D, a reduction face reference block 139 has a size of horizontal×vertical=8×8 pixels. Meanwhile, a reduction face search range 137 has a size of horizontal×vertical=36×16 pixels, and a reduction face matching processing range 143 has a size of horizontal×vertical=44×24 pixels.

Where block matching is carried out on the reduction face reduced to 1/4 in the horizontal direction and the vertical direction, a reduction face motion vector has the 4-pixel accuracy, and if it is simply multiplied by four, then an error appears with respect to a motion vector of the one-pixel accuracy. In particular, where a pixel on the base face is indicated by a circle as seen in FIG. 9, as the matching processing point 148 on the base face, all pixels on the base face become an object, but the matching processing point where block matching is carried out on the reduction face reduced to 1/4 is limited to those matching processing points 147 which appear in a unit of four pixels as indicated by solid circles in FIG. 9.

However, it is estimated that a motion vector of the one-pixel accuracy exists at least within a four-pixel range around a matching processing point on the reduction face indicated by the reduction face motion vector.

Therefore, in the present embodiment, in base face matching wherein a base face search range is determined based on a calculated reduction face motion vector, a base face target block is set at the center provided by a pixel position indicated by a reference block obtained by multiplying the reduction face motion vector by four which is a reciprocal number to the reduction ratio and a search range (base face search range 140) for four pixels is determined to carry out base face block matching to calculate a motion vector again.

Accordingly, as seen in FIGS. 49E and 49F, a base face reference block 142 has a size of horizontal×vertical=32×32 pixels, and a base face search range 140 has a size of horizontal×vertical=4×4 pixels while a base face matching processing range 144 has a size of horizontal×vertical=40×40 pixels.

FIGS. 50A to 50C show the size of an SAD value on a base face and a reduction face where it is assumed that the SAD table is used in a case wherein two hierarchical matching processes of reduction face matching and base face matching are carried out. It is to be noted that the example of FIGS. 50A to 50C corresponds to the particular example of FIGS. 49A to 49F.

The SAD table TBL in the case of the search range of 144×64 pixels before reduction has a size of 145×65 points as seen in FIG. 50A.

In contrast, the reduction face SAD table in the case of a reduction face search range 36×16 (refer to FIG. 49D) has a size of 37×17 points as seen in FIG. 50B.

On the other hand, the base face SAD table in the case of a base face search range of 4×4 (refer to FIG. 49F) has a size of 5×5 points.

Accordingly, while the number of times of matching processing where hierarchical matching is not applied is 145×65=9,425, the number of times of matching where hierarchical matching is applied is 37×17+5×5=654. Consequently, it can be recognized that the processing time can be reduced significantly.

Then, since the line memory in the case of the second example of the motion vector detection method described above may have a capacity for one line of the reduction face SAD table, it may have a capacity for 37 SAD values and position information of them. Meanwhile, the SAD table TBL must have a capacity for 9,425 SAD values and position information of them. Therefore, the line memory may be very small in storage capacity when compared with the SAD table TBL.

Further, in the case of the third configuration example of the motion vector calculation section 164 described hereinabove, since also the reduction face SAD table for storing such 37 SAD values and position information of them is unnecessary, the circuit scale can be further reduced.

Thus, with the image pickup apparatus of the present embodiment, by carrying out an interpolation process on a base face after a hierarchical matching process is carried out, motion vector detection of the sub pixel accuracy can be carried out over a wide search range.

[Other Embodiments and Modifications]

It is to be noted that, while the image pickup apparatus of the embodiment described above uses such six operation modes as described above, it may additionally use a base face matching processing mode and a base face matching+interpolation processing mode which do not involve block matching on a reduction face.

Further, in the second example of the motion vector calculation section 164 of the motion detection and motion compensation unit 16 in the image pickup apparatus of the embodiment described above, the search direction in a search range is set to a horizontal line direction and the reference block is successively shifted, for example, from the left upper corner of the search range to carry out a search, and a memory for one line of an SAD table is provided. However, another search method may be adopted which includes repetitions of a procedure of starting, setting the search direction in the search range to the vertical direction, the search in the vertical direction, for example, from the left upper corner of the search range, shifting, after the search for one column in the vertical direction comes to an end, the position of the reference block horizontally rightwardly by one column distance to a right side column and then carrying out the search in the vertical direction from the upper end of the right side column. Where the reference block is moved in the vertical direction successively from the left upper corner of the search range to carry out a search in this manner, a memory for one vertical column of the SAD table may be provided.

Here, whether the search direction should be set to the horizontal direction or the vertical direction is determined taking the circuit scale of the matching processing section and the motion vector calculation section into consideration. Preferably, the search direction is selected so that the circuit scale is reduced by a comparatively great amount.

It is to be noted that the movement of the reference block may be carried for every one pixel or every one line or else for every plural number of pixels or lines. Accordingly, the memory for one line in the horizontal direction in the former case may have a capacity for movement positions of the reference block in the horizontal direction whereas the memory for one line in the vertical column in the latter case may have a capacity for movement positions of the reference block in the vertical direction. In particular, where the movement of the reference block is carried out for every one pixel or for one line, the memory for one line in the horizontal direction must have a capacity for the number of pixels in one line, and the memory for one column in the vertical direction must have a capacity for the number of lines in the horizontal direction. However, where the reference block is moved for every plural number of pixels or lines, the capacity of the memory for one line and the memory for one column can be reduced from that where the reference block is moved for every one pixel or for every one line.

Further, the method of the interpolation process is not limited to the quadratic curve approximation interpolation process described hereinabove, but an interpolation method which uses a cubic curve or a higher-order curve may be applied.

Further, while, in the embodiment described above, the image processing apparatus is applied to an image pickup apparatus, the present application is not limited to the image pickup apparatus, but the present application can be applied to all apparatus which involve detection of a movement between image frames.

Further, while, in the embodiment described above, the present application is applied to detection of a motion vector in a unit of a block in order to carry out a noise reduction process by superposition of images, the present application is not limited to this, but the present application can naturally be applied also to detection of a motion vector, for example, by a camera shake upon image pickup. A motion vector by a camera shake can be determined, for example, as an average value of a plurality of block motion vectors.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An image processing apparatus for calculating a motion vector between two screen images including a target screen image and a reference screen image, comprising:
   base face motion vector calculation means for detecting a maximum correlation base face reference block having a high correlation with a target block of a predetermined size which is set at a predetermined position on the target screen image from among a plurality of reference blocks which individually have a size same as that of the target block and which are set in a first search range set on the reference screen image and calculating a base face motion vector based on a position displacement amount of the detected maximum correlation base face reference block on the reference screen image with respect to the target block;
   high-accuracy base face motion vector calculation means for carrying out an interpolation process using a correlation value of the maximum correlation base face reference block and correlation values of the plural reference blocks positioned at neighboring positions with the maximum correlation base face reference block to detect a position of a high-accuracy maximum correlation base face reference block and calculating a high-accuracy base face motion vector based on a position displacement amount of the high-accuracy maximum correlation base face reference block on the reference screen image with respect to the target block;
   reduction face motion vector calculation means for reducing the target screen image and the reference screen image by a predetermined reduction ratio to produce a reduction target screen image and a reduction reference screen image, detecting a maximum correlation reduction face reference block having a high correlation with a reduction face target block which has a predetermined size and is set at a predetermined position on the reduction target screen image from among a plurality of reduction face reference blocks which individually have a size same as that of the reduction face target block and which are set in a second search range set on the reduction reference screen image and calculating a reduction face motion vector based on a position displacement amount of the detected maximum correlation reduction face reference block on the reduction reference screen image with respect to the reduction face target block;
   high-accuracy reduction face motion vector calculation means for carrying out an interpolation process using the correlation value of the maximum correlation reduction face reference block and the correlation values of the plural reduction face reference blocks positioned at the neighboring positions with the maximum correlation reduction face reference block to detect a position of a high-accuracy maximum correlation reduction face reference block and calculating a high-accuracy reduction face motion vector based on a position displacement amount of the high-accuracy maximum correlation reduction face reference block on the reduction reference screen image with respect to the reduction face target block;
   first base face search range determination means for determining the first search range based on the reduction face motion vector calculated by said reduction face motion vector calculation means;
   second base face search range determination means for determining the second search range based on the high-accuracy reduction face motion vector calculated by said high-accuracy reduction face motion vector calculation means; and
   selection means for selecting a calculation means to be used from among said base face motion vector calculation means, high-accuracy base face motion vector calculation means, reduction face motion vector calculation means and high-accuracy reduction face motion vector calculation means and selecting whether or not said first or second base face search range determination means should be used and then selecting, where use of any of the determination means is determined, a determination means to be used from between said first and second base face search range determination means.

2. The image processing apparatus according to claim 1, wherein said selection means carries out the means after a selection operation input from the user is received.

3. The image processing apparatus according to claim 1, wherein said selection means automatically carries out the selection at least based on a processing speed and a detection accuracy of the motion vector.

4. The image processing apparatus according to claim 1, wherein said selection means automatically carries out the selection based on whether an object image whose motion vector is to be detected is a static picture image or a dynamic picture image.

5. An image processing method for calculating a motion vector between two screen images including a target screen image and a reference screen image, the image processing method being executed by an image processing apparatus including a base face motion vector calculation means, a high-accuracy base face motion vector calculation means, a reduction face motion vector calculation means, a high-accuracy reduction face motion vector calculation means, a first base face search range determination means and a second base face search range determination means, the image processing method comprising:

a base face motion vector calculation step, carried out by the base face motion vector calculation means, of setting a plurality of reference blocks which individually have a size same as that of a target block which has a predetermined size and is set at a predetermined position on the target screen image in a first search range set on the reference screen image to detect a maximum correlation base face reference block having a high correlation with the target block from among the plural reference blocks and calculating a base face motion vector based on a position displacement amount of the detected maximum correlation base face reference block on the reference screen image with respect to the target block;

a high-accuracy base face motion vector calculation step, carried out by the high-accuracy base face motion vector calculation means, of carrying out an interpolation process using a correlation value of the maximum correlation base face reference block and correlation values of the plural reference blocks positioned at neighboring positions with the maximum correlation base face reference block to detect a position of a high-accuracy maximum correlation base face reference block and calculating a high-accuracy base face motion vector based on a position displacement amount of the high-accuracy maximum correlation base face reference block on the reference screen image with respect to the target block;

a reduction face motion vector calculation step, carried out by the reduction face motion vector calculation means, of reducing the target screen image and the reference screen image by a predetermined reduction ratio to produce a reduction target screen image and a reduction reference screen image, setting a plurality of reduction face reference blocks which individually have a size same as that of a reduction face target block which has a predetermined size and is set at a predetermined position on the reduction target screen image in a second search range set on the reduction reference screen image, detecting a maximum correlation reduction face reference block having a high correlation with the reduction face target block from among the plural reduction face reference blocks and calculating a reduction face motion vector based on a position displacement amount of the detected maximum correlation reduction face reference block on the reduction reference screen image with respect to the reduction face target block;

a high-accuracy reduction face motion vector calculation step, carried out by the high-accuracy reduction face motion vector calculation means, of carrying out an interpolation process using a correlation value of the maximum correlation reduction face reference block and correlation values of the plural reduction face reference blocks positioned at the neighboring positions with the maximum correlation reduction face reference block to detect a position of a high-accuracy maximum correlation reduction face reference block to calculate a high-accuracy reduction face motion vector based on a position displacement amount of the high-accuracy maximum correlation reduction face reference block on the reduction reference screen image with respect to the reduction face target block;

a first base face search range determination step, carried out by the first base face search range determination means, of determining the first search range based on the reduction face motion vector calculated by the reduction face motion vector calculation means;

a second base face search range determination step, carried out by the second base face search range determination means, of determining the second search range based on the high-accuracy reduction face motion vector calculated by the high-accuracy reduction face motion vector calculation means; and a selection step of selecting, when the motion vector between the two screen images is to be calculated, a calculation step to be used from among the reduction face motion vector calculation step, high-accuracy reduction face motion vector calculation step, base face motion vector calculation step and high-accuracy base face motion vector calculation step, selecting whether or not the first or second base face search range determination step should be used and then selecting, where use of any of the determination steps is determined, a determination means to be used from between the first and second base face search range determination steps.

6. The image processing method according to claim 5, wherein, at the selection step, the selection is carried out in response to a selection operation input received from the user.

7. The image processing method according to claim 5, wherein, at the selection step, the selection is automatically carried out at least based on a processing speed and a detection accuracy of the motion vector.

8. The image processing method according to claim 5, wherein, at the selection step, the selection is automatically carried out based on whether a target image whose motion vector is to be detected is a still picture image or a dynamic picture image.

9. An image processing apparatus for calculating a motion vector between two screen images including a target screen image and a reference screen image, comprising:

a base face motion vector calculation section configured to detect a maximum correlation base face reference block having a high correlation with a target block of a predetermined size which is set at a predetermined position on the target screen image from among a plurality of reference blocks which individually have a size same as that of the target block and which are set in a first search range set on the reference screen image and calculate a base face motion vector based on a position displacement amount of the detected maximum correlation base face reference block on the reference screen image with respect to the target block;

a high-accuracy base face motion vector calculation section configured to carry out an interpolation process using a correlation value of the maximum correlation base face reference block and correlation values of the plural reference blocks positioned at neighboring positions with the maximum correlation base face reference block to detect a position of a high-accuracy maximum correlation base face reference block and calculate a high-accuracy base face motion vector based on a position displacement amount of the high-accuracy maximum correlation base face reference block on the reference screen image with respect to the target block;

a reduction face motion vector calculation section configured to reduce the target screen image and the reference screen image by a predetermined reduction ratio to produce a reduction target screen image and a reduction reference screen image, detect a maximum correlation reduction face reference block having a high correlation with a reduction face target block which has a predetermined size and is set at a predetermined position on the reduction target screen image from among a plurality of reduction face reference blocks which individually have a size same as that of the reduction face target block and which are set in a second search range set on the reduction reference screen image and calculate a reduction face motion vector based on a position displacement amount of the detected maximum correlation reduction face reference block on the reduction reference screen image with respect to the reduction face target block;

a high-accuracy reduction face motion vector calculation section configured to carry out an interpolation process using the correlation value of the maximum correlation reduction face reference block and the correlation values of the plural reduction face reference blocks positioned at the neighboring positions with the maximum correlation reduction face reference block to detect a position of a high-accuracy maximum correlation reduction face reference block and calculate a high-accuracy reduction face motion vector based on a position displacement amount of the high-accuracy maximum correlation reduction face reference block on the reduction reference screen image with respect to the reduction face target block;

a first base face search range determination section configured to determine the first search range based on the reduction face motion vector calculated by said reduction face motion vector calculation section;

a second base face search range determination section configured to determine the second search range based on the high-accuracy reduction face motion vector calculated by said high-accuracy reduction face motion vector calculation section; and a selection section configured to select a calculation section to be used from among said base face motion vector calculation section, high-accuracy base face motion vector calculation section, reduction face motion vector calculation section and high-accuracy reduction face motion vector calculation section and select whether or not said first or second base face search range determination section should be used and then select, where use of any of the determination sections is determined, a determination section to be used from between said first and second base face search range determination sections.

* * * * *